United States Patent
Sakurai et al.

(10) Patent No.: US 10,581,108 B2
(45) Date of Patent: *Mar. 3, 2020

(54) ELECTRODE STACKING DEVICE AND ELECTRODE STACKING METHOD

(71) Applicant: KABUSHIKI KAISHA TOYOTA JIDOSHOKKI, Kariya-shi, Aichi (JP)

(72) Inventors: Hayato Sakurai, Kariya (JP); Hiroyasu Nishihara, Kariya (JP); Shinya Asai, Kariya (JP); Yasuyuki Goda, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/072,403

(22) PCT Filed: Jan. 25, 2017

(86) PCT No.: PCT/JP2017/002538
§ 371 (c)(1),
(2) Date: Jul. 24, 2018

(87) PCT Pub. No.: WO2017/131027
PCT Pub. Date: Aug. 3, 2017

(65) Prior Publication Data
US 2019/0036149 A1  Jan. 31, 2019

(30) Foreign Application Priority Data

Jan. 26, 2016 (JP) .................................. 2016-012432
Jun. 13, 2016 (JP) .................................. 2016-117359

(51) Int. Cl.
*H01M 10/04* (2006.01)
*H01G 13/00* (2013.01)
(Continued)

(52) U.S. Cl.
CPC ........ *H01M 10/0404* (2013.01); *H01G 11/86* (2013.01); *H01G 13/00* (2013.01);
(Continued)

(58) Field of Classification Search
None
See application file for complete search history.

(56) References Cited

U.S. PATENT DOCUMENTS

| 4,381,596 A * | 5/1983 | Simonton ............. H01M 10/14 |
| | | 198/449 |
| 2006/0255533 A1 * | 11/2006 | Hopwood ......... H01M 10/0404 |
| | | 271/216 |
| 2011/0259712 A1 | 10/2011 | Kuo et al. |

FOREIGN PATENT DOCUMENTS

| JP | 54-44722 A | 4/1979 |
| JP | 58-35879 A | 3/1983 |

(Continued)

OTHER PUBLICATIONS

International Preliminary Report on Patentability with translation of Written Opinion dated Aug. 9, 2018, in counterpart application No. PCT/JP2017/002538.

*Primary Examiner* — Devina Pillay
(74) *Attorney, Agent, or Firm* — Sughrue Mion, PLLC

(57) ABSTRACT

An electrode stacking device includes a stacking unit that is disposed between a positive electrode conveying unit conveying a separator-equipped positive electrode and a negative electrode conveying unit conveying a negative electrode, and includes a plurality of stages of stacking sections on which the separator-equipped positive electrode and the negative electrode are stacked, a conveying control unit that controls a drive section to hold a plurality of the separator-equipped positive electrodes at height positions corresponding to the plurality of stages of stacking section and controls a drive section to hold a plurality of the negative electrodes (Continued)

at height positions corresponding to the plurality of stages of stacking sections, a push-out unit that simultaneously pushes out the plurality of separator-equipped positive electrodes toward the plurality of stages of stacking sections, and a push-out unit that simultaneously pushes out the plurality of negative electrodes toward the plurality of stages of stacking sections.

12 Claims, 50 Drawing Sheets

(51) Int. Cl.
    *H01G 11/86*     (2013.01)
    *H01M 2/02*     (2006.01)
    *H01M 2/16*     (2006.01)
    *H01M 10/14*     (2006.01)
    *H01M 10/0585*     (2010.01)
    *H01M 10/0525*     (2010.01)

(52) U.S. Cl.
    CPC ......... *H01M 2/021* (2013.01); *H01M 2/1673* (2013.01); *H01M 10/0413* (2013.01); *H01M 10/14* (2013.01); *H01M 10/0525* (2013.01); *H01M 10/0585* (2013.01)

(56) References Cited

FOREIGN PATENT DOCUMENTS

| | | |
|---|---|---|
| JP | 59-39653 A | 3/1984 |
| JP | 2006-315866 A | 11/2006 |
| JP | 2009-158406 A | 7/2009 |
| JP | 2011-34903 A | 2/2011 |
| JP | 2011-258418 A | 12/2011 |
| JP | 2012-91372 A | 5/2012 |
| JP | 2013-20859 A | 1/2013 |
| JP | 2017-33752 A | 2/2017 |
| KR | 10-2015-0064467 A | 6/2015 |

\* cited by examiner

Fig.6
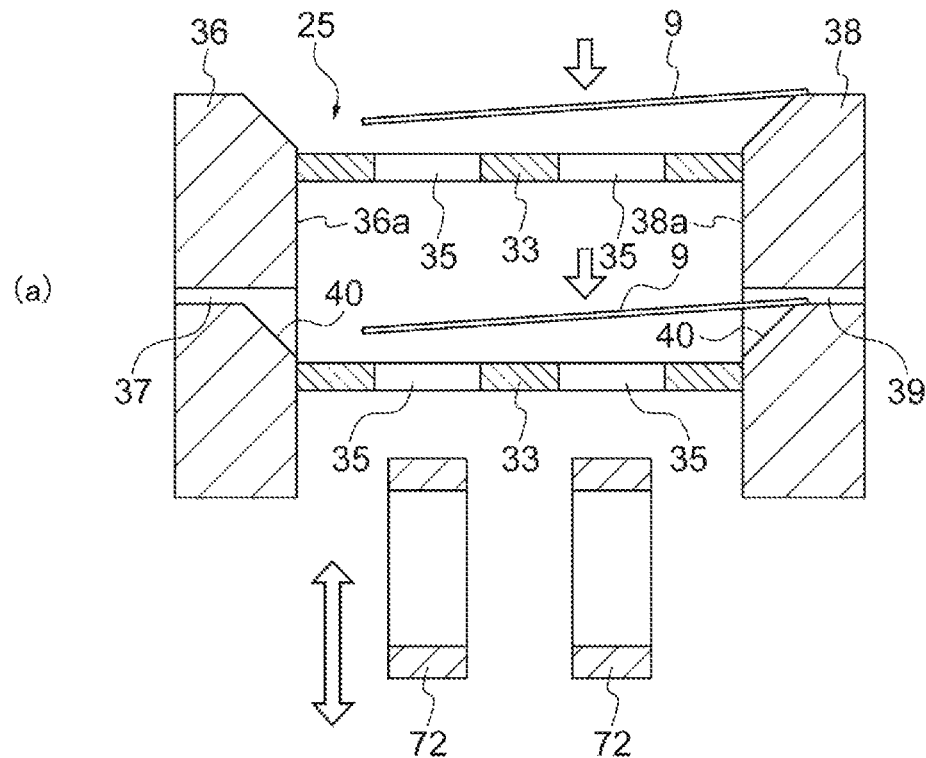
(a)
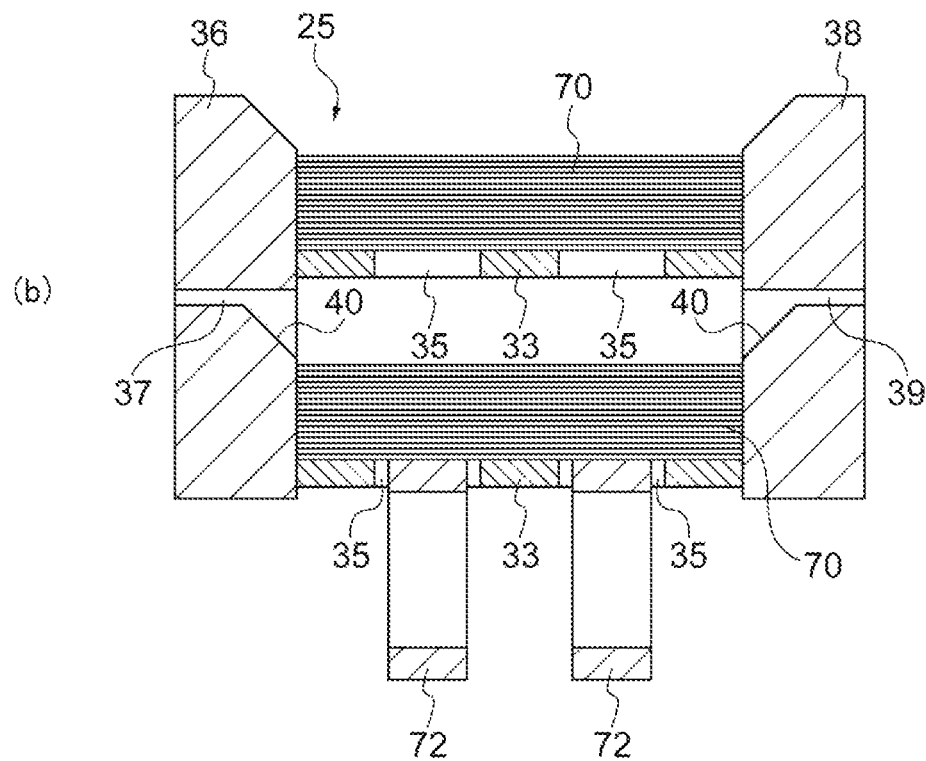
(b)

Fig. 9

| | | | | | | | | |
|---|---|---|---|---|---|---|---|---|
| POSITIVE ELECTRODE CONVEYING UNIT | | | | | | | | |
| PERIOD (TIME) | | | | | | | | |
| SUPPLY | | | | | | | | |
| PUSH-OUT (STACKING) | | | | | | | | |
| MOVEMENT DISTANCE OF SUPPORT SECTION | | | | | | | | |
| AMOUNT OF CIRCULATION MOVEMENT | 0.5 | 0.5 | 2.5 | 0.5 | 0.5 | 0.5 | 2.5 | |
| AMOUNT OF VERTICAL MOVEMENT | 0.5 | 0.5 | −1.5 | 0.5 | 0.5 | 0.5 | −1.5 | |
| AMOUNT OF MOVEMENT OF SUPPORT SECTION ON SUPPLY SIDE | 1 | 1 | 1 | 1 | 1 | 1 | 1 | |
| AMOUNT OF MOVEMENT OF SUPPORT SECTION ON STACKING SIDE | 0 | 0 | −4 | 0 | 0 | 0 | −4 | |
| NEGATIVE ELECTRODE CONVEYING UNIT | | | | | | | | |
| PERIOD (TIME) | | | | | | | | |
| SUPPLY | | | | | | | | |
| PUSH-OUT (STACKING) | | | | | | | | |
| MOVEMENT DISTANCE OF SUPPORT SECTION | | | | | | | | |
| AMOUNT OF CIRCULATION MOVEMENT | 0.5 | 2.5 | 0.5 | 0.5 | 0.5 | 2.5 | 0.5 | |
| AMOUNT OF VERTICAL MOVEMENT | 0.5 | −1.5 | 0.5 | 0.5 | 0.5 | −1.5 | 0.5 | |
| AMOUNT OF MOVEMENT OF SUPPORT SECTION ON SUPPLY SIDE | 1 | 1 | 1 | 1 | 1 | 1 | 1 | |
| AMOUNT OF MOVEMENT OF SUPPORT SECTION ON STACKING SIDE | 0 | −4 | 0 | 0 | 0 | −4 | 0 | |
| STACKING UNIT | | | | | | | | |

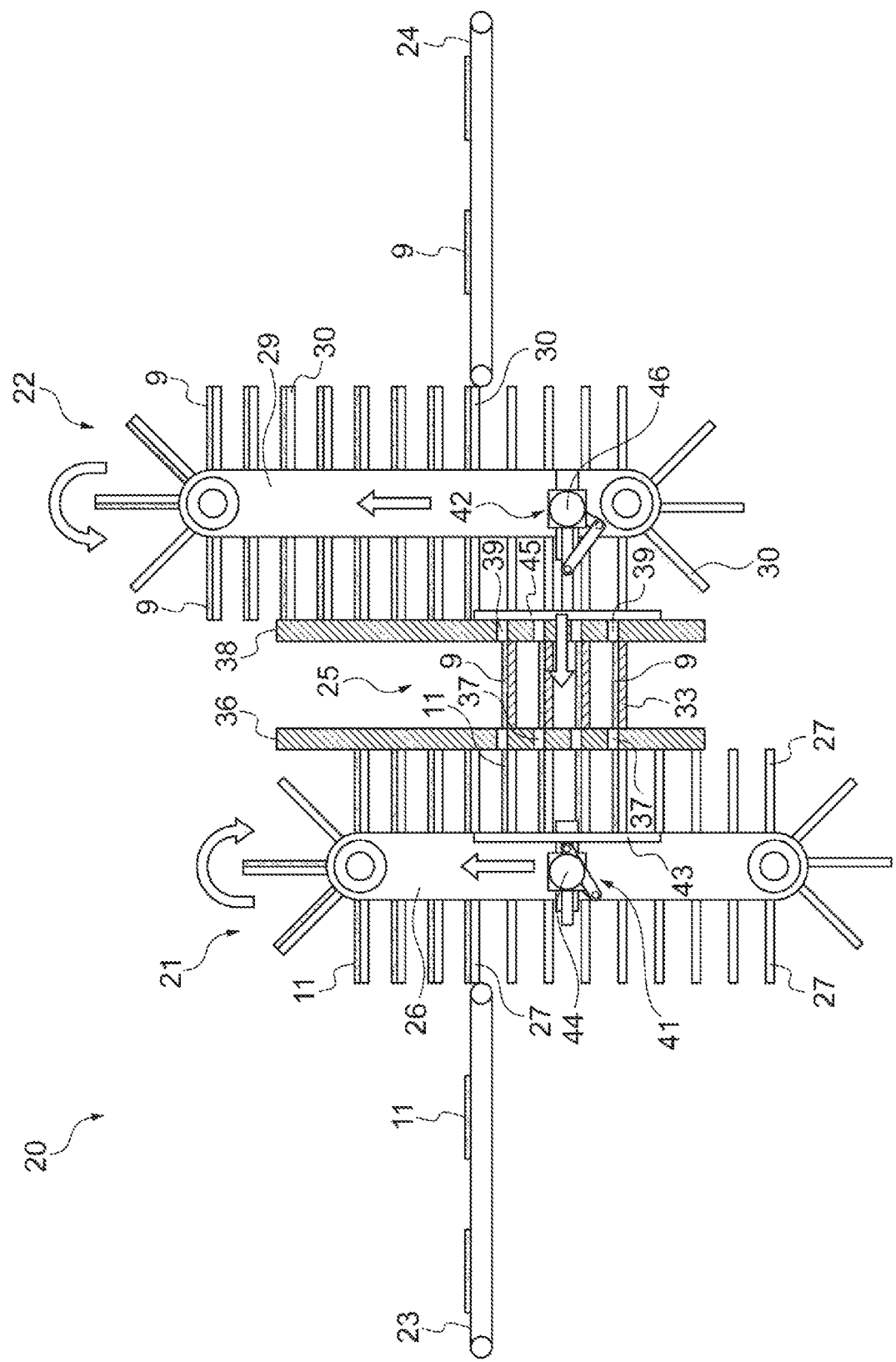

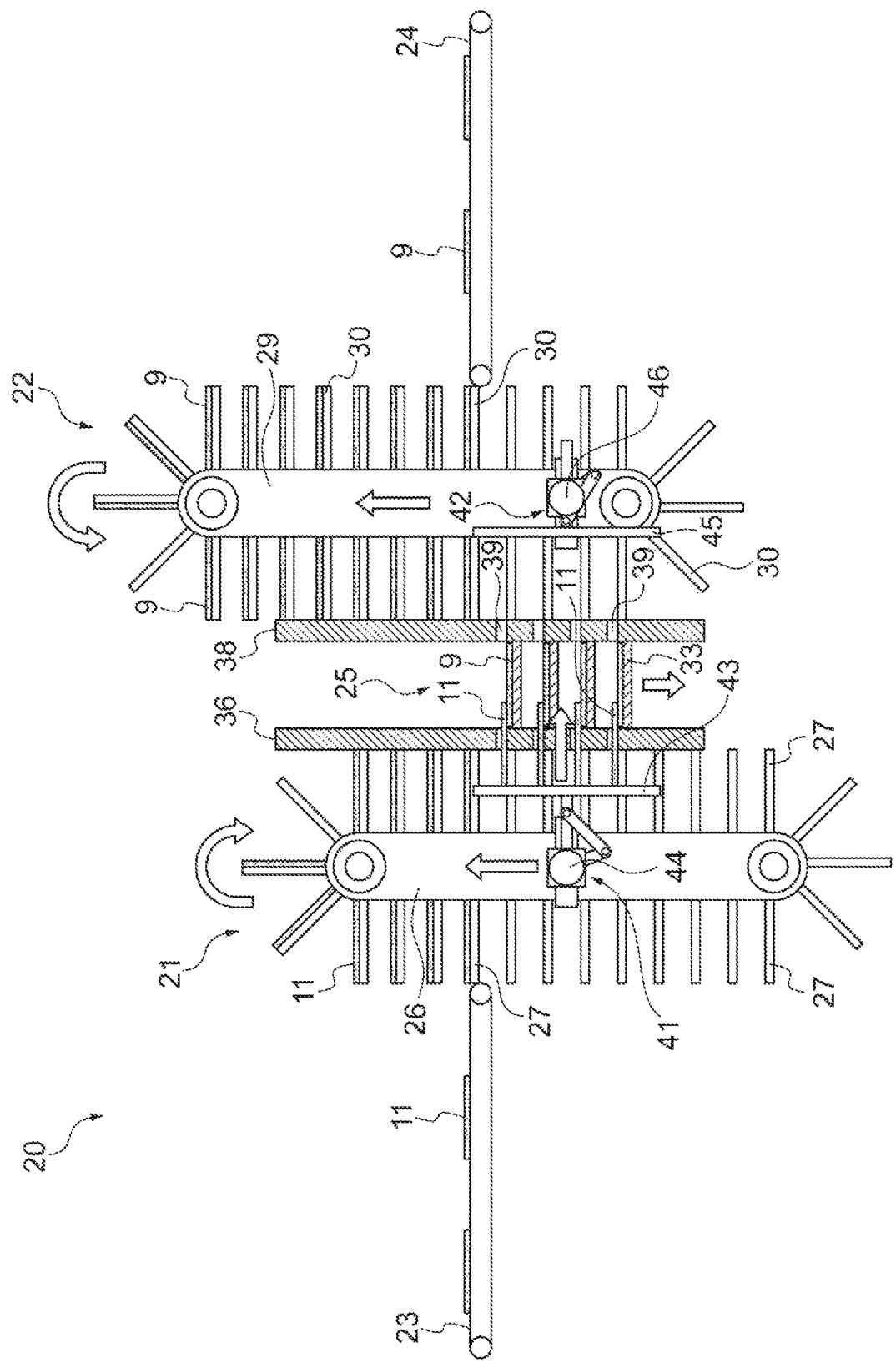

Fig.33
(a)
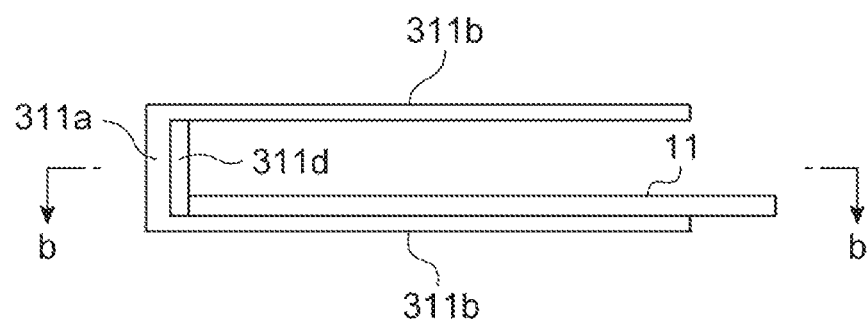
(b)
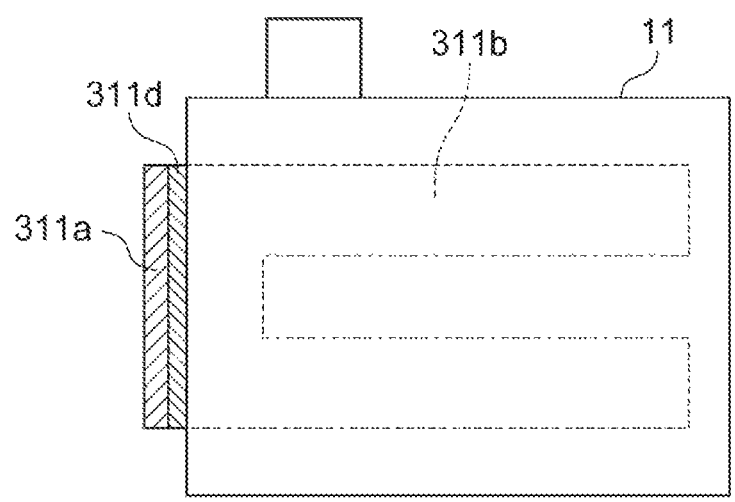

Fig. 42

ELECTRODE STACKING DEVICE AND ELECTRODE STACKING METHOD

CROSS REFERENCE TO RELATED APPLICATIONS

This application is a National Stage of International Application No. PCT/JP2017/002538 filed Jan. 25, 2017, claiming priorities based on Japanese Patent Application Nos. 2016-012432 filed Jan. 26, 2016 and 2016-117359 filed Jun. 13, 2016.

TECHNICAL FIELD

An aspect of the invention relates to an electrode stacking device and an electrode stacking method.

BACKGROUND ART

For example, in an electrical storage device including a stacking type electrode assembly such as a lithium ion rechargeable battery, as a method of stacking electrodes, a pick and place (P&P) method that uses a robot provided with a suction unit is frequently used. As one of a method of improving productivity in a manufacturing line of the electrical storage device, speeding-up of the manufacturing line is considered. To realize the speeding-up, for example, it is necessary to raise an electrode supply speed (stacking speed) to a stacking section in a stacking process. However, in the case of stacking electrodes on the stacking section by using the robot, for example, it is necessary to follow a negative pressure control of a suction unit, and the like, and thus it is difficult to raise the electrode stacking speed. As a result, this situation becomes an obstacle to the speeding-up of the manufacturing line. In contrast, as an electrode stacking device capable of realizing high-speed stacking, for example, there is known a device that is disclosed in Patent Literature 1 and Patent Literature 2.

The electrode stacking device disclosed in Patent Literature 1 includes two supply mechanisms which respectively supply a positive electrode and a negative electrode, two drop movement units which are disposed on a lower side of the supply mechanism to be perpendicular to each other and drop and move the positive electrode and the negative electrode, which are respectively supplied from the supply mechanisms, to a predetermined position by using the gravity, and a guide stacking unit that is disposed on a lower side of the drop movement units, and sequentially guides the positive electrode and the negative electrode which are respectively ejected from ejection sections of the drop movement units to a predetermined position and stacks the electrodes. The guide stacking unit includes a bottom wall on which a stacked body is placed, and two erected walls which are provided to protrude in a direction perpendicular to the bottom wall, and stops movement of the electrodes ejected from the ejection sections of the drop movement units and positions the electrodes. When stacking the positive electrode and the negative electrode, the positive electrode is supplied in a direction that faces one of the erected walls, and the negative electrode is supplied in a direction that faces the other electrode wall. A positive electrode and a negative electrode which are supplied to the guide stacking unit are dropped on the bottom wall or the positive electrode and the negative electrode which have been stacked, and are stopped after collision with the erected walls.

In the supply mechanism disclosed in Patent Literature 1, a positive electrode or a negative electrode, which is cut out from a strip-shaped positive electrode material or negative electrode material, is directly dropped on the drop movement unit. In a typical stacking type electrode, a tab, which serves as a current passage with an external terminal, has a shape that protrudes from a rectangular electrode main body. Accordingly, in the case of applying the supply mechanism to the electrode including the tab, the following configuration is considered. That is, in a manufacturing line, an electrode in which a separate tab is joined to the electrode main body, or an electrode in which a tab shape is integrally formed through a plurality of times of cutting is conveyed by a conveying device such as a conveyor, and is dropped onto the drop movement unit.

The electrode stacking device described in Patent Literature 2 includes three supply sections which are disposed on a stand and respectively supply a positive electrode, a negative electrode, and a separator, three pairs of rollers which respectively nip and convey the positive electrode, the negative electrode, and the separator which are respectively supplied from the supply sections, a stacking section which is disposed on a downstream side in a conveying direction of the pairs of rollers and in which the positive electrode, the negative electrode, and the separator which are respectively conveyed from the pairs of rollers are stacked, and a regulation unit that is disposed on an end of the stacking section and regulates a position of the positive electrode, the negative electrode, and the separator which are conveyed from the respective pairs of rollers.

In addition, in the case of speeding up the production line, the following method is also known. Specifically, only processes or a plurality of kinds of processing in which time-shortening is difficult are parallelized. For example, in a piling device described in Patent Literature 3, cut-out materials are classified by four branched conveyors arranged above and below, and the classified cut-out materials are decelerated on deceleration conveyors and are stacked in a piling chamber that is partitioned into four stages.

CITATION LIST

Patent Literature

Patent Literature 1: Japanese Unexamined Patent Publication No. 2012-91372
Patent Literature 2: Japanese Unexamined Patent Publication No. 2011-258418
Patent Literature 3: Japanese Unexamined Patent Publication No. S59-39653

SUMMARY OF INVENTION

Technical Problem

In the electrode stacking devices described in Patent Literature 1 and Patent Literature 2, it is possible to accomplish speeding-up in stacking of electrodes in comparison to the P&P method. However, in the case of further speeding up the entirety of the production line, the following failure occurs. In the case of attempting speeding-up in the electrode stacking device disclosed in Patent Literature 1, a supply speed is limited with only the drop movement, and thus it is necessary to raise an electrode supply speed by a mechanical unit such as the rollers described in Patent Literature 2. Particularly, in the case of conveying and supplying electrodes from an electrode manufacturing line, a conveying speed of the conveying device is raised in accordance with speeding-up of the production line, and thus it is necessary to set the supply speed to be equal to or faster than the conveying speed. However, an electrode on which an active material layer is formed has higher rigidity in comparison to paper, a resin film, and the like which have the same size, and in a case where one side of an outer periphery collides with the erected walls, the entirety of the electrode is bent and rebound occurs. This tendency becomes significant as the electrode supply speed is raised. According to the configuration disclosed in Patent Literature 1, even when rebound occurs, positioning is finally performed in a state in which the electrode comes into contact with the erected walls due to action of the gravity. However, when the subsequent electrode is supplied before movement of the rebounded electrode converges, the electrode of which movement after rebound has not converged yet is interposed between an electrode that has been stacked and the subsequent electrode, and stops in a state in which positional deviation occurs. As a result, finally, a stacked body including a deviated electrode inside thereof is formed.

To prevent formation of the above-described stacked body, it is necessary to supply the subsequent electrode after movement of a previously stacked electrode converges. Here, when raising a conveying speed or a supply speed of an electrode, it is necessary to set an electrode supply interval to be long so as to prevent a positional deviation of the electrode. As a result, a stacking speed reaches a peak. Furthermore, the electrode stacking device described in Patent Literature 2 is not provided with a unit that corrects a position of the electrode after collision, and thus when the supply speed of the electrode is raised, it is expected that the positional deviation increases in a more significant manner. This problem can be avoided when applying the structure disclosed in Patent Literature 3 to the electrode stacking device. However, when rapidly decelerating a workpiece that is conveyed at a high speed, a positional deviation of a workpiece occurs in a rotation direction and the like of the workpiece on a conveying device. It is necessary to secure a distance for decelerating the workpiece so that the positional deviation does not occur. Accordingly, a deceleration conveyor is necessary for each of conveying routes after divergence, and it is difficult to reduce the size of the deceleration conveyor and it is difficult to avoid an increase in size of the device. As a result, a space necessary for installation of the apparatus is also great.

An object of an aspect of the invention is to provide an electrode stacking device and an electrode stacking method which are capable of accomplishing speeding-up in a stacking speed while suppressing an increase in size of the device.

Solution to Problem

According to an aspect of the invention, there is provided an electrode stacking device that stacks an electrode supplied by a conveying device and forms an electrode stacked body. The electrode stacking device includes: an electrode support section that receives the electrode supplied by the conveying device and supports the electrode; a circulation member which has a loop shape that extends in a vertical direction, and in which the electrode support section is formed on an outer peripheral surface; a stacking unit that is disposed on a side opposite to the conveying device with the circulation member interposed therebetween, and includes a plurality of stages of stacking sections on which the electrode is stacked; a push-out section that simultaneously pushes out a plurality of the electrodes, which are respectively supported on a plurality of the electrode support sections, toward the plurality of stages of stacking sections; and a control unit that controls circulation and elevation of the circulation member, and an operation of the push-out sections. The control unit controls the operation of the push-out section to push out the electrodes toward the stacking sections at a speed slower than a conveying speed of the electrodes conveyed by the conveying device.

In the electrode stacking device, electrodes, which are sequentially supplied to the electrode support sections, are simultaneously pushed out to the stacking sections different from each other and are stacked thereon. In this manner, electrodes in a number greater than an electrode that is sequentially supplied are simultaneously pushed out and are stacked. Accordingly, an ejection speed when pushing out the electrodes to the stacking sections can be set to be slower than a conveying speed (supply speed) of the electrode by the conveying device. According to this, it is possible to suppress a positional deviation of the electrodes when stacking the electrodes while preventing an electrode stacking speed from being lowered. As a result, according to the electrode stacking device, it is possible to accomplish speeding-up of the stacking speed while suppressing an increase in size of the device.

The electrode stacking device may further include a positioning unit that aligns positions of edges of the electrodes in a direction that intersects a conveying direction of the electrodes conveyed by the conveying device. In this case, since the electrodes are pushed out toward the stacking sections in a state in which positions of edges of the electrodes are aligned, it is possible to stack the electrodes with high positioning accuracy in the stacking sections.

Each of the electrode support sections may include an impact mitigation section that mitigates impact to each of the electrodes when receiving the electrode. According to this configuration, when the electrodes are supplied to the electrode support sections, it is possible to suppress peeling-off of an active material of the electrodes. That is, even when the supply speed of the electrodes to the electrode support sections is raised, impact to the electrodes when each of the electrode support sections receives each of the electrodes is mitigated by the impact mitigation section, and thus it is possible to suppress peeling-off of the active material of the electrodes.

According to another aspect of the invention, there is provided an electrode stacking device that stacks a positive electrode in which a positive electrode active material layer is formed on a surface of a positive electrode current collector, and a negative electrode in which a negative electrode active material layer is formed on a surface of a negative electrode current collector. The electrode stacking device includes: a first conveying unit conveying the positive electrode and including a loop-shaped first circulation member that extends in a vertical direction, a plurality of first support sections which are formed on an outer peripheral surface of the first circulation member and support the positive electrode, and a first drive section that rotates the first circulation member and moves the first circulation member in the vertical direction; a second conveying unit conveying the negative electrode and including a loop-shaped second circulation member that extends in the vertical direction, a plurality of second support sections which are formed on an outer peripheral surface of the second circulation member and support the negative electrode, and a second drive section that rotates the second circulation member and moves the second circulation member in the vertical direction; a stacking unit that is disposed between the first conveying unit and the second conveying unit, and includes a plurality of stages of stacking sections on which the positive electrode and the negative electrode are alternately stacked; a conveying control unit that controls the first drive section to hold a plurality of the positive electrodes conveyed by the first conveying unit at height positions corresponding to the plurality of stages of stacking sections, and controls the second drive section to hold a plurality of the negative electrodes conveyed by the second conveying unit at height positions corresponding to the plurality of stages of stacking sections; a first push-out unit that simultaneously pushes out the plurality of positive electrodes toward the plurality of stages of stacking sections; and a second push-out unit that simultaneously pushes out the plurality of negative electrodes toward the plurality of stages of stacking sections.

In the electrode stacking device, in a state in which the plurality of positive electrodes conveyed by the first conveying unit are held at height positions corresponding to the plurality of stages of stacking sections, the plurality of positive electrodes are simultaneously pushed out toward the plurality of stages of stacking sections by the first push-out unit, and thus the plurality of positive electrodes are simultaneously stacked on the plurality of stages of stacking sections. In addition, in a state in which the plurality of negative electrodes conveyed by the second conveying unit are held at height positions corresponding to the plurality of stages of stacking sections, the plurality of negative electrodes are simultaneously pushed out toward the plurality of stages of stacking sections by the second push-out unit, and thus the plurality of negative electrodes are simultaneously stacked on the plurality of stages of stacking sections. In this manner, the plurality of positive electrodes and the plurality of negative electrodes are simultaneously stacked on the plurality of stages of stacking sections, and thus even when lowering the supply speed of the positive electrodes and the negative electrodes to the stacking sections, it is possible to secure speeding-up in stacking of the positive electrode and the negative electrode. Since the supply speed of the positive electrodes and the negative electrodes to the stacking section is lowered, when stacking the positive electrodes and the negative electrodes on the stacking sections, peeling-off of the positive electrode active material and the negative electrode active material is less likely to occur.

The electrode stacking device may further include a first wall portion that is disposed between the stacking unit and the first conveying unit, and includes a plurality of first slits through which the plurality of positive electrodes pushed out by the first push-out unit pass; and a second wall portion that is disposed between the stacking unit and the second conveying unit, and includes a plurality of second slits through which the plurality of negative electrodes pushed out by the second push-out unit pass. The conveying control unit may control the first drive section to hold the plurality of positive electrodes at height positions of the plurality of first slits, and may control the second drive section to hold the plurality of negative electrodes at height positions of the plurality of second slits. In this case, when the plurality of positive electrodes are simultaneously pushed out toward the plurality of stages of stacking sections by the first push-out unit, the plurality of positive electrodes respectively pass through the first slits and are reliably stacked on the stacking sections. In addition, when the plurality of negative electrodes are simultaneously pushed out toward the plurality of stages of stacking section by the second push-out unit, the plurality of negative electrodes respectively pass through the second slits and are reliably stacked on the stacking sections.

The height positions of the first slits may be the same as the height positions of the second slits, and a tapered portion may be formed at a portion of an inner surface of the first wall portion on a lower side of each of the first slits and at a portion of an inner surface of the second wall portion on a lower side of each of the second slits so that a distance between the first wall portion and the second wall portion gradually increases toward an upward side. In this case, since the positive electrode that has passed through the first slit and the negative electrode that has passed through the second slit are easy to drop, and thus the positive electrode and the negative electrode are easily stacked on the stacking sections.

The electrode stacking device may further include a third drive section that moves the plurality of stages of stacking sections in the vertical direction; and a stacking control unit that controls the third drive section so that stacking height positions of the positive electrodes become constant with respect to the first slits, and stacking height positions of the negative electrodes become constant with respect to the second slits. In this case, a drop distance of the positive electrode and the negative electrode becomes uniform regardless of the number of the positive electrode and the negative electrode which are stacked.

The stacking section may include a base on which each of the positive electrodes and each of the negative electrodes are placed, and a side wall that is provided to be erected from the base and aligns positions of edges of the positive electrode and the negative electrode. In this case, when stacking the positive electrode and the negative electrode on the plurality of stages of stacking sections, it is not necessary to vertically move the plurality of stages of stacking section. Accordingly, a control process becomes easy.

The electrode stacking device may further include a third drive section that moves the plurality of stages of stacking sections in the vertical direction; and a stacking control unit that controls the third drive section so that stacking height positions of the positive electrodes become constant with respect to the first slits, and stacking height positions of the negative electrodes become constant with respect to the second slits. The height positions of the first slits and the height positions of the second slits may alternatively deviate from each other. In this case, the positive electrode that has passed through the first slit comes into contact with the inner surface of the second wall portion and positioning thereof is performed. The negative electrode which has passed through the second slit comes into contact with the inner surface of the first wall portion, and positioning thereof is performed.

The electrode stacking device may further include a positioning unit that aligns a position of an edge of each of the positive electrodes or a position of an edge of each of the negative electrodes. In this case, since the positive electrode and the negative electrode are pushed out toward the stacking sections in a state in which positions of edges of the positive electrode and the negative electrode are aligned, it is possible to stack the positive electrode and the negative electrode with high positioning accuracy in the stacking section.

The positioning unit may include a receiving section that comes into contact with the edge of the positive electrode or the negative electrode, and a pressing section that presses the positive electrode or the negative electrode to the receiving section. In this case, when the positive electrode and the negative electrode are pressed to the receiving section by the pressing section, since the edges of the positive electrode and the negative electrode come into contact with the receiving section, it is possible to accurately align positions of the edges of the positive electrode and the negative electrode.

The positioning unit may include a pair of guide plates which guide the positive electrode or the negative electrode to a downward side, and each of the pair of guide plates may include a tapered portion that makes a gap between the pair of guide plates be gradually narrowed toward a downward side. In this case, it is possible to align positions of the edges of the positive electrode and the negative electrode with a simple configuration without using an actuator or the like.

According to still another aspect of the invention, there is provided an electrode stacking device that stacks electrodes supplied by a conveying device and forms an electrode stacked body. The electrode stacking device includes: a plurality of electrode support sections which support the electrodes; an electrode distribution section that distributes each of the electrodes supplied by the conveying device to each of the plurality of electrode support sections; a stacking unit that is disposed on a lateral side of the plurality of electrode support sections, and includes a plurality of stages of stacking sections on which the electrodes are respectively stacked; a push-out section that pushes out the electrodes supported on the plurality of electrode support sections toward the plurality of stages of stacking sections; and a control unit that controls an operation of the electrode distribution section and an operation of the push-out section. The control unit controls the operation of the push-out section to push out the electrodes toward the stacking sections at a speed slower than a conveying speed of the electrodes conveyed by the conveying device.

In the electrode stacking device, the plurality of electrodes are distributed to the plurality of electrode support sections. In this manner, since the plurality of electrodes which are distributed to the plurality of electrode support sections are pushed out and are stacked, an ejection speed when pushing out the electrodes to the stacking section can be set to be slower than a conveying speed (supply speed) of the electrodes by the conveying device. According to this, it is possible to suppress a positional deviation of the electrodes when stacking the electrodes while preventing an electrode stacking speed from being lowered. As a result, according to the electrode stacking device, it is possible to accomplish speeding-up of the stacking speed while suppressing an increase in size of the device.

According to still another aspect of the invention, there is provided an electrode stacking method that is executed by an electrode stacking device that stacks an electrode in which an active material layer is formed on a surface of a current collector. The electrode stacking method includes: a distribution process of distributing the electrode that is sequentially supplied to each of a plurality of electrode support sections which support the electrode; and an ejection process of ejecting each of a plurality of the electrodes which are respectively supported on the plurality of electrode support sections to each of a plurality of stages of stacking sections at an ejection speed slower than a supply speed of the electrode to the support section in the distribution process. Furthermore, in the electrode stacking method, the distribution process may be executed by a circulation member which has a loop shape that extends in a vertical direction and in which the electrode support sections are formed on an outer peripheral surface, and a control unit that controls an operation of the circulation member.

In the electrode stacking method, the electrodes which are sequentially supplied are distributed to each of the plurality of electrode support sections, and are ejected to the stacking sections different from each other and are stacked thereon. In this manner, since the electrodes which are supplied are distributed to the plurality of support sections and are stacked, it is possible to further lower an ejection speed of the electrode when ejecting the electrodes supported on the electrode support sections (that is, a supply speed of the electrodes to the stacking sections) in comparison to the supply speed of the electrodes which are sequentially supplied to the electrode support sections. In this manner, since the supply speed of the electrodes to the stacking sections is lowered, it is possible to suppress peeling-off of an active material of the electrodes when stacking the electrodes on the stacking sections. In addition, according to the distribution process that uses the loop-shaped circulation member, it is possible to realize continuous working with efficiency.

Advantageous Effects of Invention

According to an aspect of the invention, it is possible to provide an electrode stacking device and an electrode stacking method which are capable of accomplishing speeding-up in a stacking speed while suppressing an increase in size of the device.

BRIEF DESCRIPTION OF DRAWINGS

FIG. 6 is an enlarged cross-sectional view illustrating a state, in which electrodes are stacked on a stacking section of the stacking unit, in combination with a stacked body take-out conveyor.

FIG. 9 is a table illustrating an operation state of a positive electrode conveying unit, a negative electrode conveying unit, and the stacking unit when stacking electrodes on the stacking sections of the stacking unit.

FIG. 10 is a side view (including a partial cross-section) illustrating an operation state of the electrode stacking device illustrated in FIG. 3 and FIG. 4.

FIG. 11 is a side view (including a partial cross-section) illustrating an operation state of the electrode stacking device illustrated in FIG. 3 and FIG. 4.

FIG. 33 is a view illustrating a configuration of the support section.

FIG. 42 is a table illustrating an abnormal operation state of the positive electrode conveying unit, the negative electrode conveying unit, and the stacking unit when stacking electrodes.

DESCRIPTION OF EMBODIMENTS

Figure 1:
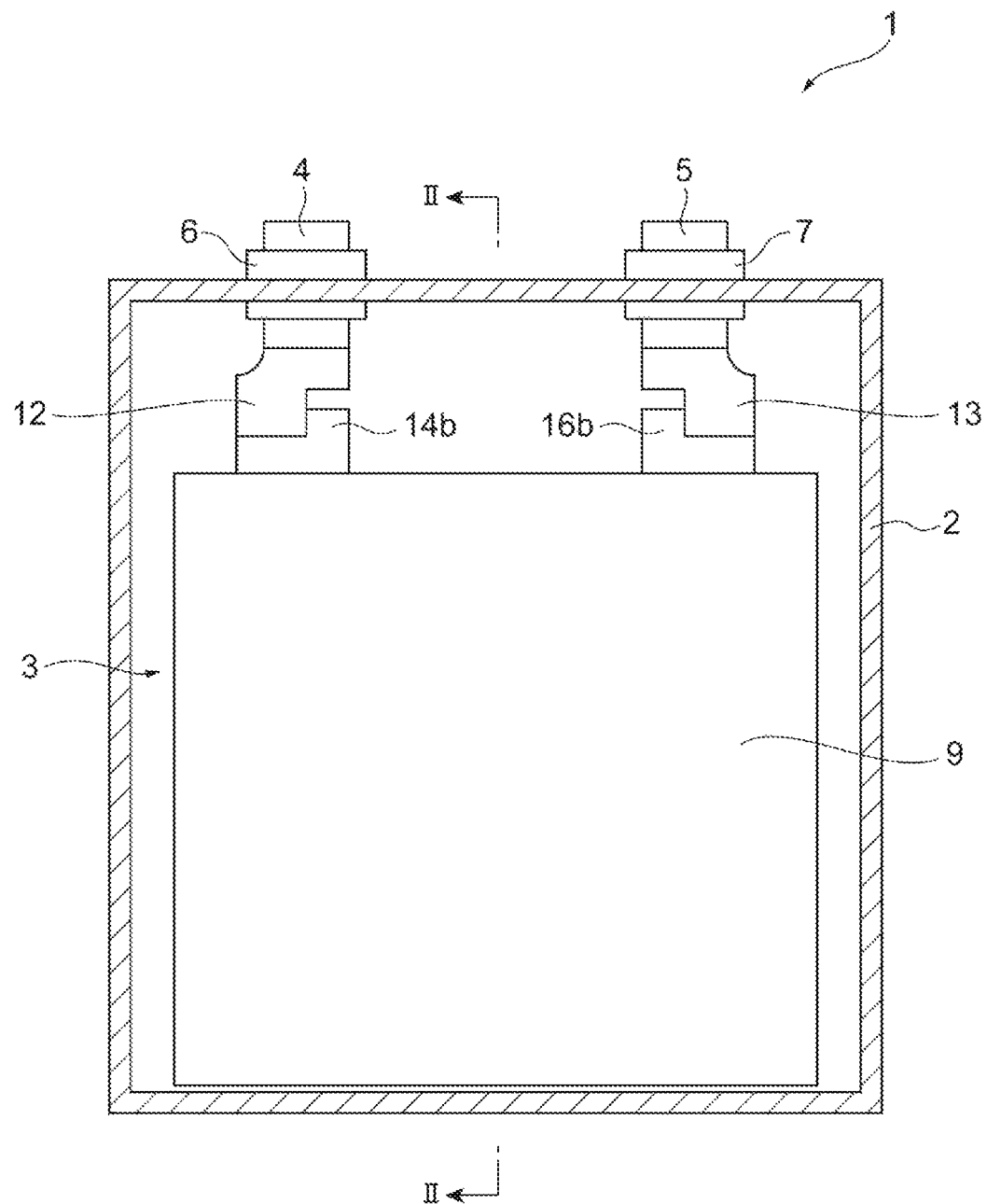
FIG. 1 is a cross-sectional view illustrating the inside of an electrical storage device that is manufactured by applying an electrode stacking device according to an embodiment.

Hereinafter, an embodiment will be described in detail with reference to the accompanying drawings. Furthermore, in the drawings, the same reference numeral will be given to the same or equivalent element, and redundant description thereof will be omitted.

Figure 2:
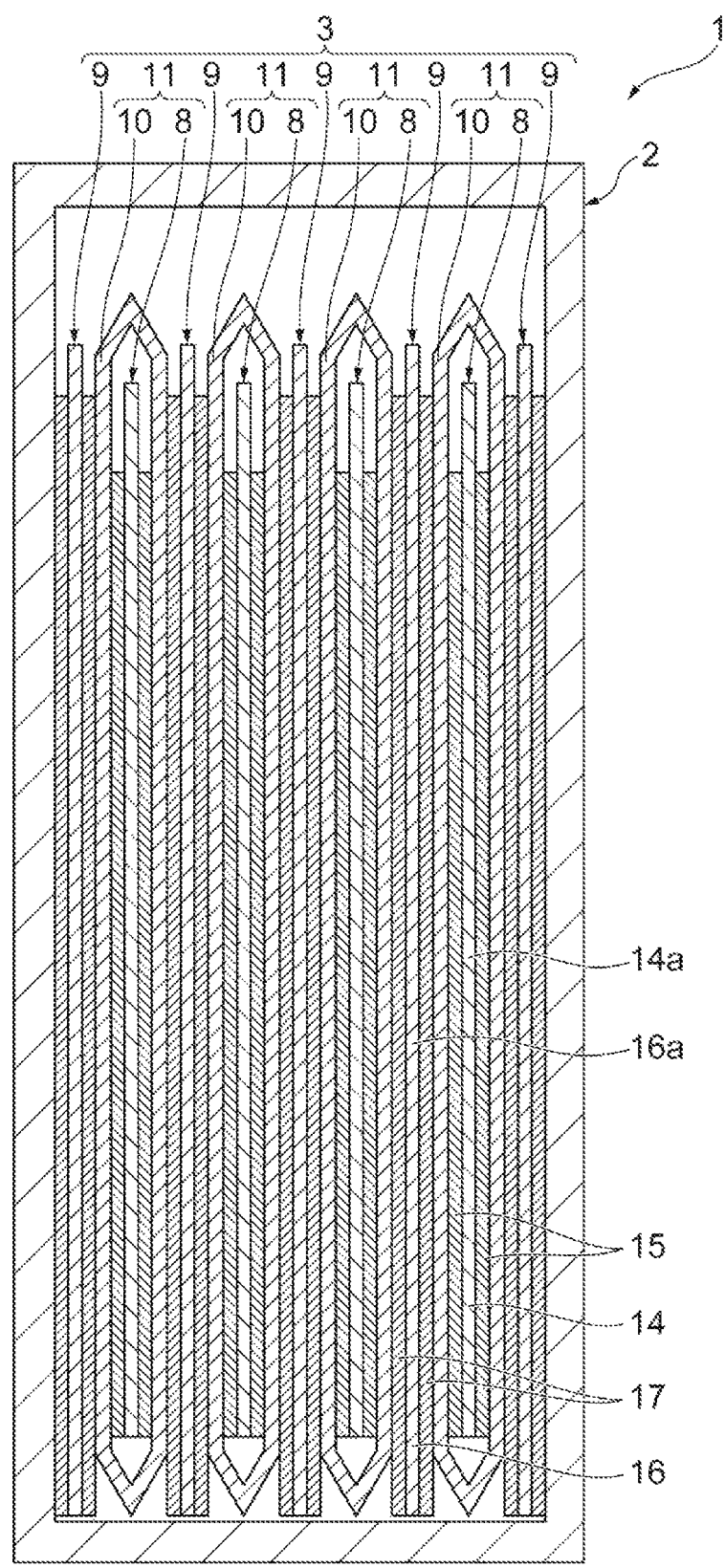
FIG. 2 is a cross-sectional view taken along line II-II in FIG. 1.

FIG. 1 is a cross-sectional view illustrating the inside of an electrical storage device that is manufactured by applying an electrode stacking device according to the embodiment. FIG. 2 is a cross-sectional view taken along line II-II in FIG. 1. In FIG. 1 and FIG. 2, an electrical storage device 1 is a lithium ion rechargeable battery including a stacking type electrode assembly.

For example, the electrical storage device 1 includes a case 2 having an approximately rectangular parallelepiped shape, and an electrode assembly 3 that is accommodated in the case 2. For example, the case 2 is formed from a metal such as aluminum. Although not illustrated, for example, a nonaqueous (organic solvent-based) electrolytic solution is injected to the inside of the case 2. A positive electrode terminal 4 and a negative electrode terminal 5 are disposed over the case 2 and are spaced away from each other. The positive electrode terminal 4 is fixed to the case 2 through an insulating ring 6, and the negative electrode terminal 5 is fixed to the case 2 through an insulating ring 7. In addition, although not illustrated, an insulating film is disposed between the electrode assembly 3 and a lateral surface and a bottom surface of the case 2 on an inner side thereof. The case 2 and the electrode assembly 3 are insulated by the insulating film. In FIG. 1, for convenience, a slight gap is formed between a lower end of the electrode assembly 3 and the bottom surface of the case 2. However, actually, the lower end of the electrode assembly 3 is in contact with the inner bottom surface of the case 2 through the insulating film. Furthermore, when a spacer is disposed between the electrode assembly 3 and the case 2, it is possible to form a gap between the electrode assembly 3 and the case 2.

The electrode assembly 3 has a structure in which a plurality of positive electrodes 8 and a plurality of negative electrodes 9 are alternately stacked through a bag-shaped separator 10. Each of the positive electrodes 8 is enveloped by the bag-shaped separator 10. The positive electrode 8 that is enveloped by the bag-shaped separator 10 is constructed as a separator-equipped positive electrode 11. Accordingly, the electrode assembly 3 has a structure in which a plurality of the separator-equipped positive electrodes 11 and the plurality of negative electrodes 9 are alternately stacked. Furthermore, electrodes located on both ends of the electrode assembly 3 are the negative electrodes 9.

For example, the positive electrode 8 includes metal foil 14 that is a positive electrode current collector formed from aluminum foil, and a positive electrode active material layer 15 that is formed on both surfaces of the metal foil 14. The metal foil 14 includes a foil main body portion 14a having a rectangular shape in a plan view, and a tab 14b that is formed integrally with the foil main body portion 14a. The tab 14b protrudes from an edge in the vicinity of one longitudinal end of the foil main body portion 14a. In addition, the tab 14b penetrates through the separator 10. The tab 14b is connected to the positive electrode terminal 4 through a conductive member 12. Furthermore, in FIG. 2, the tab 14b is omitted for convenience.

The positive electrode active material layer 15 is formed on both front and rear surfaces of the foil main body portion 14a. The positive electrode active material layer 15 is a porous layer that includes a positive electrode active material and a binder. Examples of the positive electrode active material include a composite oxide, metal lithium, sulfur, and the like. For example, at least one of manganese, nickel, cobalt, and aluminum, and lithium are included in the composite oxide.

For example, each of the negative electrodes 9 includes metal foil 16 that is a negative electrode current collector formed from copper foil, and a negative electrode active material layer 17 that is formed on both surfaces of the metal foil 16. The metal foil 16 includes a foil main body portion 16a having a rectangular shape in a plan view and a tab 16b that is formed integrally with the foil main body portion 16a. The tab 16b protrudes from an edge in the vicinity of a longitudinal one end of the foil main body portion 16a. The tab 16b is connected to the negative electrode terminal 5 through a conductive member 13. Furthermore, in FIG. 2, the table 16b is omitted for convenience.

The negative electrode active material layer 17 is formed on both front and rear surfaces of the foil main body portion 16a. The negative electrode active material layer 17 is a porous layer that includes a negative electrode active material and a bonder. Examples of the negative electrode active material include carbon such as graphite, highly oriented graphite, mesocarbon microbead, hard carbon, and soft carbon, an alkali metal such as lithium and sodium, a metal compound, a metal oxide such as $SiO_x$ ($0.5 \leq x \leq 1.5$), boron-added carbon, and the like.

The separator 10 has a rectangular shape in a plan view. Examples of a formation material of the separator 10 include a porous film formed from a polyolefin-based resin such as polyethylene (PE) and polypropylene (PP), woven fabric or non-woven fabric formed from polypropylene, polyethyleneterephthalate (PET), and methyl cellulose, and the like.

In the case of manufacturing the electrical storage device 1 having the above-described configuration, first, the separator-equipped positive electrodes 11 and the negative electrodes 9 are prepared, the separator-equipped positive electrodes 11 and the negative electrodes 9 are alternately stacked, and the separator-equipped positive electrodes 11 and the negative electrodes 9 are fixed, thereby obtaining the electrode assembly 3. In addition, the tab 14b of the separator-equipped positive electrode 11 is connected to the positive electrode terminal 4 through the conductive member 12. In addition, the tab 16b of the negative electrodes 9 is connected to the negative electrode terminal 5 through the conductive member 13, and then the electrode assembly 3 is accommodated in the case 2.

First Embodiment

Figure 3:
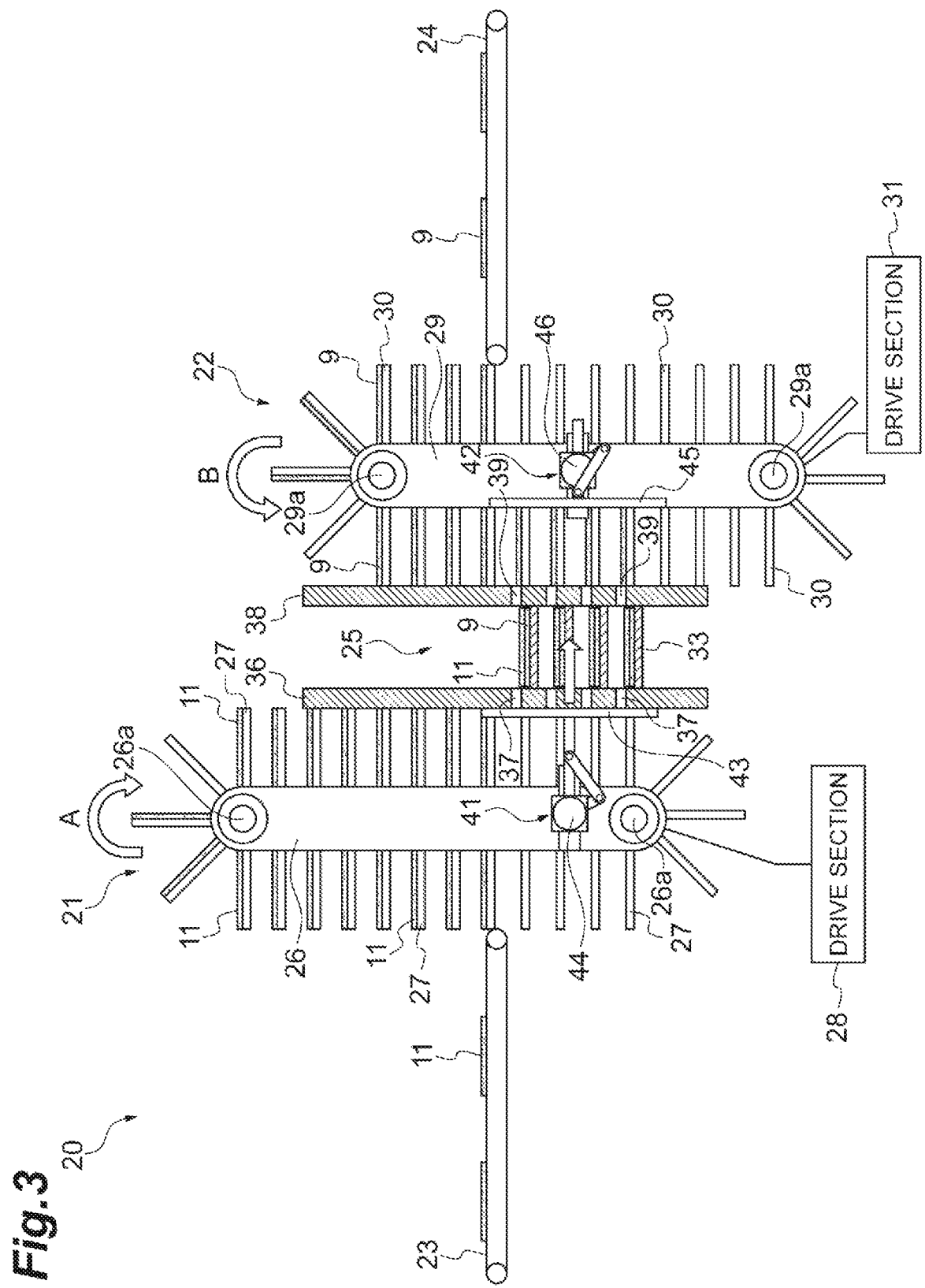
FIG. 3 is a side view (including a partial cross-section) illustrating the electrode stacking device according to a first embodiment.
Figure 4:
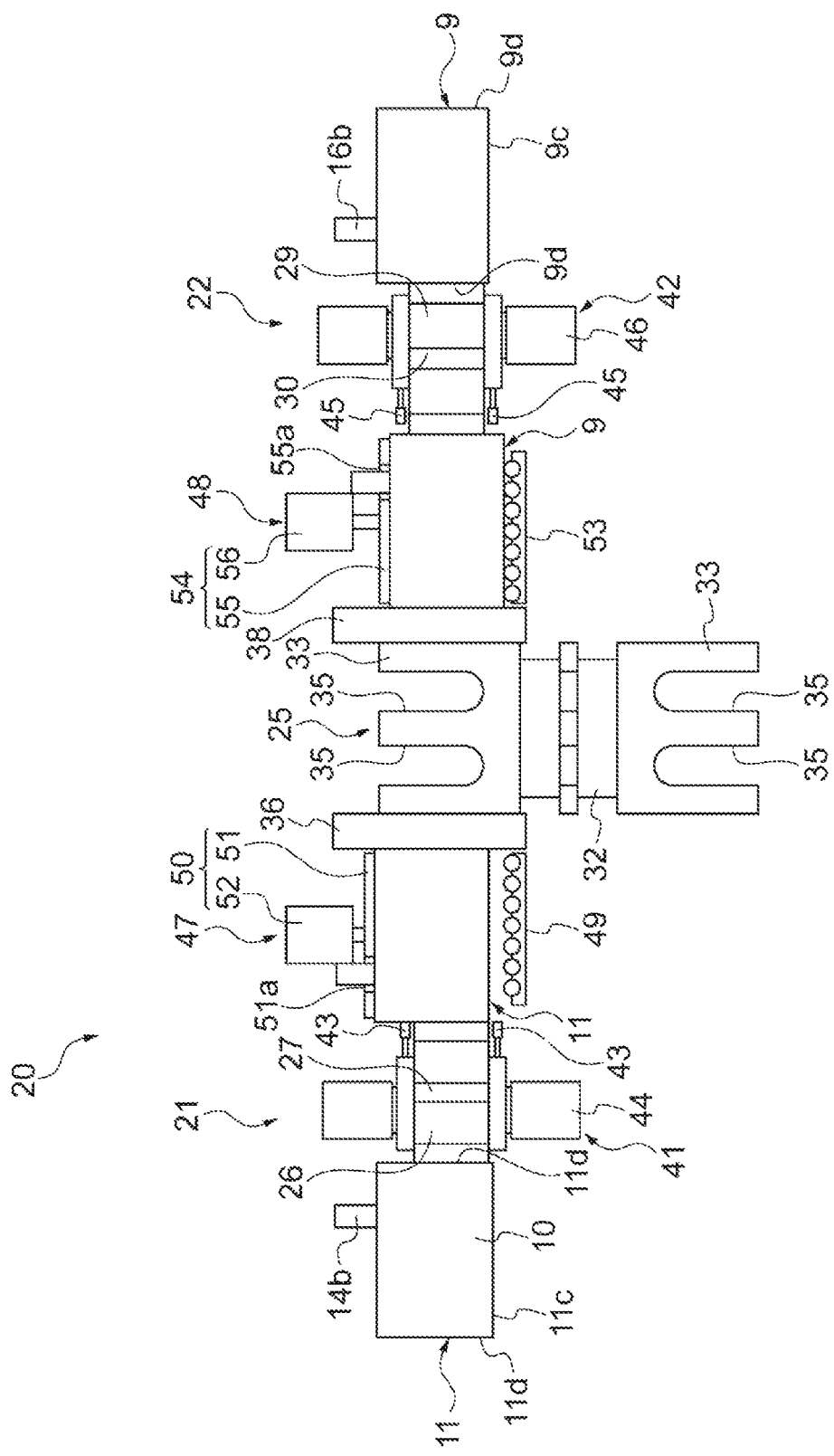
FIG. 4 is a plan view of the electrode stacking device illustrated in FIG. 3.

FIG. 3 is a side view (including a partial cross-section) illustrating the electrode stacking device according to a first embodiment. FIG. 4 is a plan view of the electrode stacking device illustrated in FIG. 3. An electrode stacking device 20 according to this embodiment is a device that alternately stacks the separator-equipped positive electrodes 11 and the negative electrodes 9.

The electrode stacking device 20 includes a positive electrode conveying unit 21, a negative electrode conveying unit 22, a positive electrode supply conveyor 23, a negative electrode supply conveyor 24, and a stacking unit 25.

The positive electrode conveying unit 21 is a first conveying unit that sequentially conveys the separator-equipped positive electrodes 11 while holding the separator-equipped positive electrodes 11. The positive electrode conveying unit 21 includes a loop-shaped circulation member 26 (first circulation member) that extends in a vertical direction, a plurality of plate-shaped support sections 27 (first support sections) which are formed on an outer peripheral surface of the circulation member 26 and respectively support the separator-equipped positive electrodes 11, and a drive section 28 (first drive section) that drives the circulation member 26.

For example, the circulation member 26 is constituted by an endless belt. The circulation member 26 is stretched by two rollers 26a which are disposed to be spaced away from each other in the vertical direction, and rotates along with rotation of the rollers 26a. When the circulation member 26 rotates (circulates) as described above, each of the support sections 27 circulates and moves. In addition, the circulation member 26 can move in the vertical direction in combination with the two rollers 26a. Here, the separator-equipped positive electrodes 11 which are supplied from the positive electrode supply conveyor 23 are distributed to the support sections 27 which circulate and move as described above. That is, the circulation member 26 functions as a distribution section that distributes the separator-equipped positive electrodes 11 supplied by the positive electrode supply conveyor 23 to the plurality of support sections 27.

The drive section 28 rotates the circulation member 26, and moves the circulation member 26 in the vertical direction. For example, although not particularly illustrated, the drive section 28 includes a rotation motor that rotates (circulates) the circulation member 26 by rotating the rollers 26a, and an elevation motor that moves the circulation member 26 in the vertical direction through an elevation mechanism (not illustrated). At this time, the drive section 28 rotates the circulation member 26 in a clockwise direction (in an arrow A direction in the drawing) when viewed from a front side (a front side of a paper surface in FIG. 3) of the electrode stacking device 20. Accordingly, the support sections 27 on the positive electrode supply conveyor 23 side is raised with respect to the circulation member 26, and the support sections 27 on the stacking unit 25 side is lowered with respect to the circulation member 26.

The negative electrode conveying unit 22 is a second conveying unit that sequentially conveys the negative electrodes 9 while holding the negative electrodes 9. The negative electrode conveying unit 22 includes a loop-shaped circulation member 29 (second circulation member) that extends in the vertical direction, a plurality of plate-shaped support sections 30 (second support sections) which are formed on an outer peripheral surface of the circulation member 29 and respectively support the negative electrodes 9, and a drive section 31 (second drive section) that drives the circulation member 29.

For example, as in the circulation member 26, the circulation member 29 is constituted by an endless belt. The circulation member 29 is stretched by two rollers 29a which are disposed to be spaced away from each other in the vertical direction, and rotates along with rotation of the rollers 29a. When the circulation member 29 rotates (circulates) as described above, each of the support sections 30 circulates and moves. In addition, the circulation member 29 can move in the vertical direction in combination with the two rollers 29a. Here, the negative electrodes 9 which are supplied from the negative electrode supply conveyor 24 are distributed to the support sections 30 which circulate and move as described above. That is, the circulation member 29 functions as a distribution section that distributes the negative electrodes 9 supplied by the negative electrode supply conveyor 24 to the plurality of support sections 30.

The drive section 31 rotates the circulation member 29, and moves the circulation member 29 in the vertical direction. For example, although not particularly illustrated, the drive section 31 includes a rotation motor that rotates (circulates) the circulation member 29 by rotating the rollers 29a, and an elevation motor that moves the circulation member 29 in the vertical direction through an elevation mechanism (not illustrated). At this time, the drive section 31 rotates the circulation member 29 in a counterclockwise direction (in an arrow B direction in the drawing) when viewed from the front side (the front side of the paper surface in FIG. 3) of the electrode stacking device 20. Accordingly, the support sections 30 on the negative electrode supply conveyor 24 side are raised with respect to the circulation member 29, and the support sections 30 on the stacking unit 25 side are lowered with respect to the circulation member 29.

The positive electrode supply conveyor 23 conveys the separator-equipped positive electrodes 11 in a horizontal direction toward the positive electrode conveying unit 21, and supplies the separator-equipped positive electrodes 11 to the support sections 27 of the positive electrode conveying unit 21. The negative electrode supply conveyor 24 conveys the negative electrodes 9 in the horizontal direction toward the negative electrode conveying unit 22, and supplies the negative electrodes 9 to the support sections 30 of the negative electrode conveying unit 22.

The separator-equipped positive electrodes 11 which are transferred from the positive electrode supply conveyor 23 to the support sections 27 of the positive electrode conveying unit 21 are circulated and moved to be raised at once and to be lowered due to rotation of the circulation member 26. At this time, the front and rear of each of the separator-equipped positive electrodes 11 are inverted at an upper side of the circulation member 26. The negative electrodes 9 which are transferred from the negative electrode supply conveyor 24 to the support sections 30 of the negative electrode conveying unit 22 are circulated and moved to be raised at once and to be lowered due to rotation of the circulation member 29. At this time, the front and rear of each of the negative electrodes 9 are inverted at an upper side of the circulation member 29.

Figure 5:
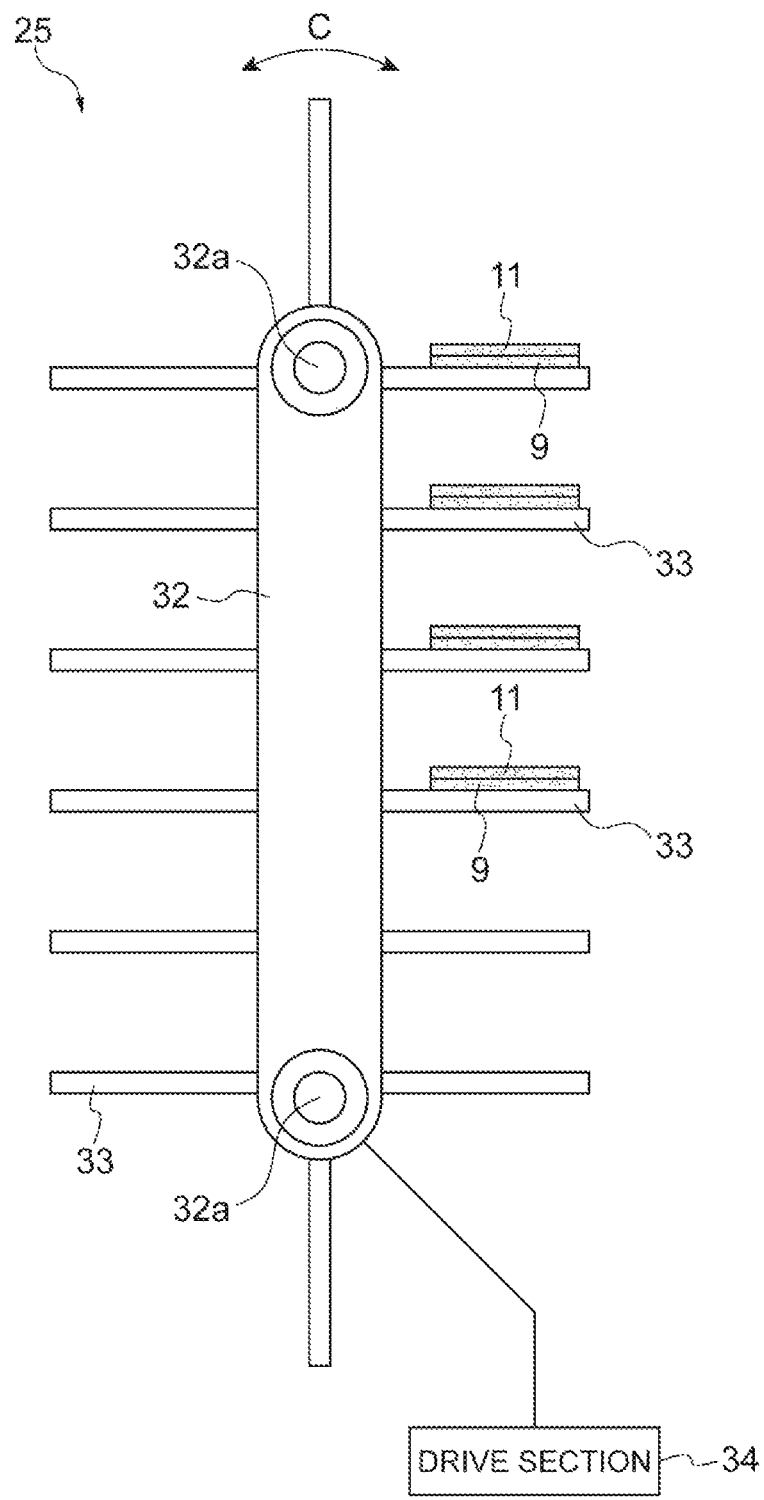
FIG. 5 is a side view of a stacking unit.

The stacking unit 25 is disposed between the positive electrode conveying unit 21 and the negative electrode conveying unit 22. As illustrated in FIG. 5, the stacking unit 25 includes a loop-shaped circulation member 32 that extends in the vertical direction, a plurality of plate-shaped stacking sections 33 which are formed on the outer peripheral surface of the circulation member 32 and on which the separator-equipped positive electrode 11 and the negative electrode 9 are alternately stacked, and a drive section 34 (third drive section) that drives the circulation member 32.

For example, as in the circulation members 26 and 29, the circulation member 32 is constituted by an endless belt. The circulation member 32 is stretched by two rollers 32a which are disposed to be spaced away from each other in the vertical direction, and rotates along with rotation of the rollers 32a. When the circulation member 32 rotates (circulates) as described above, each of the stacking sections 33 circulates and moves. In addition, the circulation member 32 can move in the vertical direction. Two slits 35 are provided in the stacking section 33 into which a part of a stacked body take-out conveyor 72 (to be described later) is inserted.

The drive section 34 rotates the circulation member 32, and moves the circulation member 32 in the vertical direction. Specifically, although not particularly illustrated, the drive section 34 includes a rotation motor that rotates (circulates) the circulation member 32 by rotating the rollers 32a. At this time, the drive section 34 rotates the circulation member 29 in both directions (C directions in the drawing).

A wall portion 36 (first wall portion) that extends in the vertical direction is disposed between the stacking unit 25 and the positive electrode conveying unit 21. The wall portion 36 is provided with a plurality of (here, four) slits 37 (first slits) through which the separator-equipped positive electrode 11 pushed out by a push-out unit 41 to be described later passes. The slits 37 are disposed in the vertical direction at regular intervals.

A wall portion 38 (second wall portion) that extends in the vertical direction is disposed between the stacking unit 25 and the negative electrode conveying unit 22. The wall portion 38 is provided with a plurality of (here, four) slits 39 (second slits) through which the negative electrode 9 pushed out by a push-out unit 42 to be described later passes. Height positions of the slits 39 are the same as height positions of the slits 37.

As illustrated in FIG. 6, a tapered portion 40 is formed at a portion of an inner surface 36a of the wall portion 36 on a lower side of each of the slits 37 and at a portion of an inner surface 38a of the wall portion 38 on a lower side of each of the slits 39 so that a distance between the wall portions 36 and 38 gradually increases toward an upward side.

In addition, the electrode stacking device 20 includes the push-out unit 41 (first push-out unit) and the push-out unit 42 (second push-out unit).

In a stacking area for stacking the separator-equipped positive electrodes 11, the push-out unit 41 simultaneously pushes out a plurality of (here, four) the separator-equipped positive electrodes 11 toward a plurality of vertical stages (here, four vertical stages) of the stacking sections 33, thereby simultaneously stacking the four separator-equipped positive electrodes 11 on the four stages of stacking sections 33. The push-out unit 41 includes a pair of push members 43 which collectively push the four separator-equipped positive electrodes 11, and a drive section 44 that moves the push members 43 to the four stages of stacking sections 33 side. The drive section 44 includes a motor and a link mechanism.

In a stacking area for stacking the negative electrodes 9, the push-out unit 42 simultaneously pushes out a plurality of (here, four) the negative electrodes 9 toward a plurality of vertical stages (here, four vertical stages) of the stacking sections 33, thereby simultaneously stacking the four negative electrodes 9 on the four stages of stacking sections 33. The push-out unit 42 includes a pair of push members 45 which collectively push the four negative electrodes 9, and a drive section 46 that moves the push members 45 to the four stages of stacking sections 33 side. A configuration of the drive section 46 is the same as the configuration of the drive section 44. Furthermore, the drive sections 44 and 46 may include a cylinder or the like.

In addition, the electrode stacking device 20 includes a positioning unit 47 that aligns a position of a bottom edge 11c of the separator-equipped positive electrode 11, and a positioning unit 48 that aligns a position of a bottom edge 9c of the negative electrode 9. The positioning units 47 and 48 are disposed in the stacking areas for staking the separator-equipped positive electrode 11 and the negative electrode 9. The bottom edge 11c of the separator-equipped positive electrode is an edge that is opposite to the tab 14b side in the separator-equipped positive electrode 11. The bottom edge 9c of the negative electrode 9 is an edge that is opposite to the tab 16b side in the negative electrode 9.

The positioning unit 47 includes a receiving section 49 that is disposed on a front side (the front side of the paper surface in FIG. 3) of the positive electrode conveying unit 21 and comes into contact with the bottom edge 11c of the separator-equipped positive electrode 11, and a pressing section 50 that is disposed on a rear side of the positive electrode conveying unit 21, and presses the separator-equipped positive electrode 11 to the receiving section 49. The receiving section 49 is provided with a plurality of free rollers which are in parallel to each other. Furthermore, the receiving section 49 may be formed from a resin having a slippery surface.

The pressing section 50 includes a pressing plate 51 that presses the separator-equipped positive electrode 11, and a drive section 52 that moves the pressing plate 51 to the receiving section 49 side. For example, the drive section 52 includes a cylinder. The pressing plate 51 is fixed to a tip end of a piston rod of the cylinder. The pressing plate 51 is provided with a slit 51a through which the tab 14b of the separator-equipped positive electrode 11 passes.

The positioning unit 48 includes a receiving section 53 that is disposed on a front side (the front side of the paper surface in FIG. 3) of the negative electrode conveying unit 22 and comes into contact with a bottom edge 9c of the negative electrode 9, and a pressing section 54 that is disposed on a rear side of the negative electrode conveying unit 22, and presses the negative electrode 9 to the receiving section 53. A structure of the receiving section 53 is the same as the structure of the receiving section 49. The pressing section 54 includes a pressing plate 55 that presses the negative electrode 9, and a drive section 56 that moves the pressing plate 55 to the receiving section 53 side. The pressing plate 55 is provided with a slit 55a through which the tab 16b of the negative electrode 9 passes. A configuration of the drive section 56 is the same as that of the drive section 52.

Figure 7:
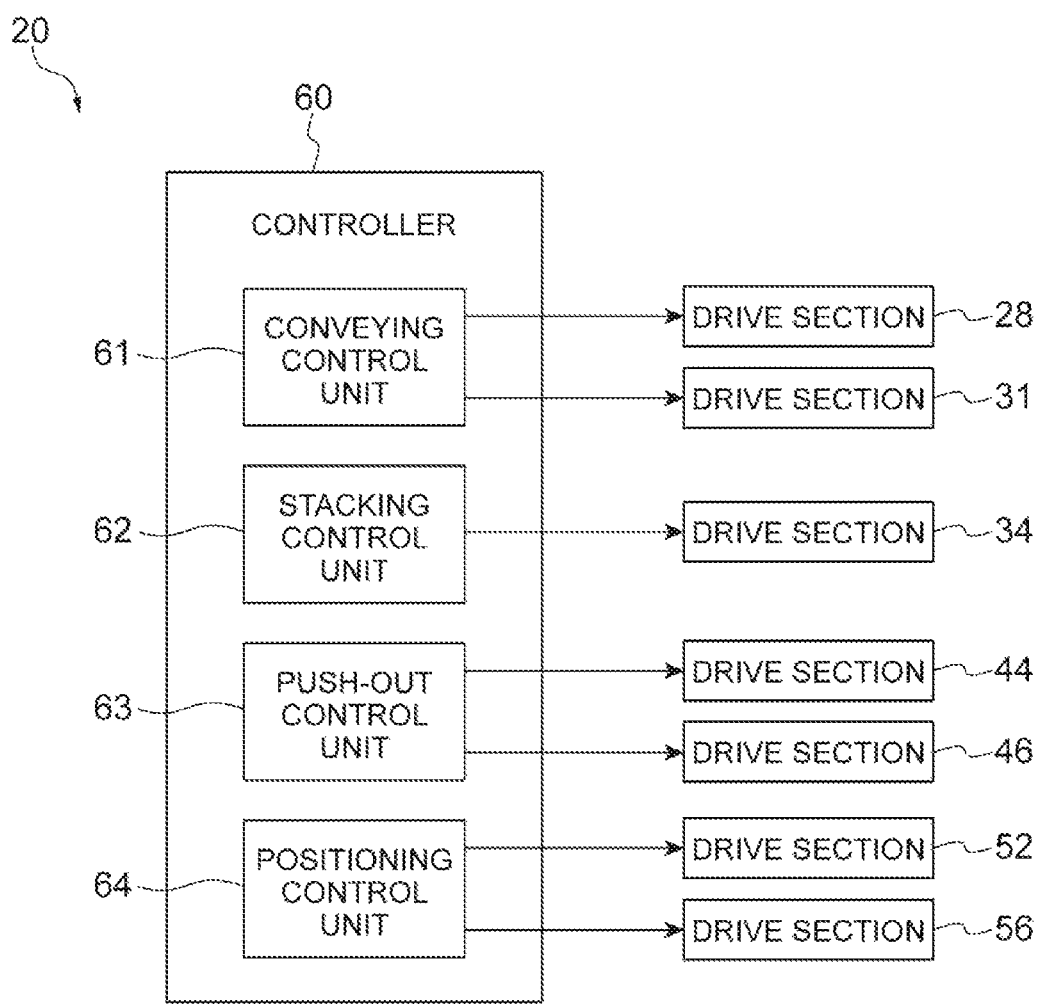
FIG. 7 is a configuration view of a control system of the electrode stacking device illustrated in FIG. 3 and FIG. 4.

In addition, as illustrated in FIG. 7, the electrode stacking device 20 includes a controller 60. The controller 60 includes a CPU, a RAM, a ROM, an input/output interface, and the like. The controller 60 includes a conveying control unit 61 that controls the drive section 28 of the positive electrode conveying unit 21 and the drive section 31 of the negative electrode conveying unit 22, a stacking control unit 62 that controls the drive section 34 of the stacking unit 25, a push-out control unit 63 that controls the drive section 44 of the push-out unit 41 and the drive section 46 of the push-out unit 42, and a positioning control unit 64 that controls the drive section 52 of the positioning unit 47 and the drive section 56 of the positioning unit 48.

Figure 8:
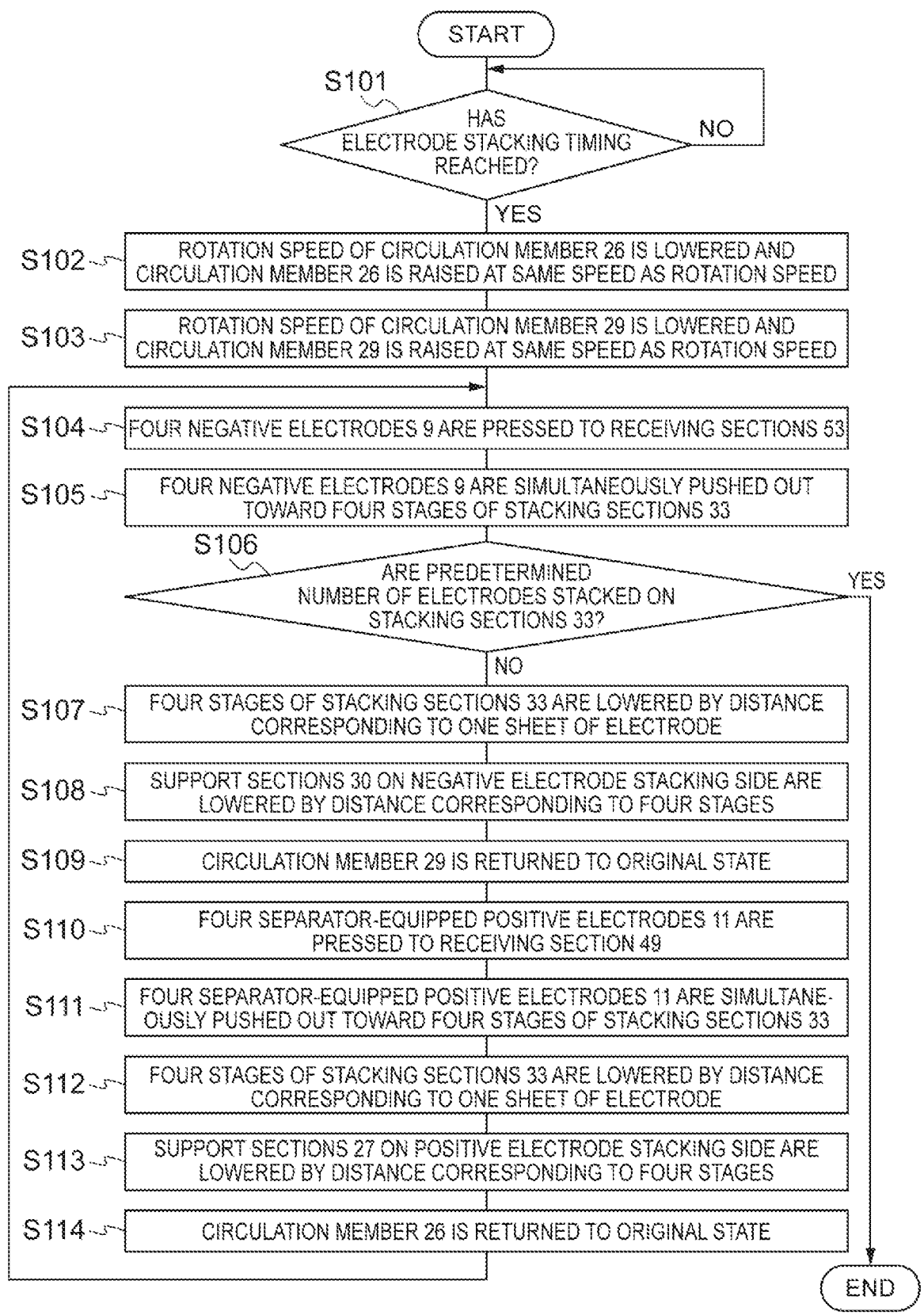
FIG. 8 is a flowchart illustrating an example of a control procedure that is executed by a controller when stacking electrodes on the stacking sections of the stacking unit.

FIG. 8 is a flowchart illustrating an example of a control procedure that is executed by the controller 60 when stacking the separator-equipped positive electrode 11 and the negative electrode 9 on the stacking section 33 of the stacking unit 25. Furthermore, at an initial operation, the circulation member 26 of the positive electrode conveying unit 21 is rotated due to an intermittent operation at a predetermined interval, and the circulation member 29 of the negative electrode conveying unit 22 is rotated in a direction opposite to the direction of the circulation member 26 due to the same intermittent operation as in the circulation member 26.

In FIG. 8, first, the controller 60 determines whether or not an electrode stacking timing has reached (step S101). A condition of the electrode stacking timing is, for example, as to whether or not the four support sections 30 which support the negative electrodes 9 respectively reach positions corresponding to lower end positions of the slits 37.

When it is determined that the electrode stacking timing has reached, the controller 60 controls the drive section 28 to reduce a rotation speed of the circulation member 26 to approximately the half of a rotation speed in an initial operation and to raise the circulation member 26 at the same speed as the rotation speed of the circulation member 26 in the positive electrode conveying unit 21 (step S102). Here, as illustrated in FIG. 9, when the amount of movement of the support section 27 in the initial operation is set as 1, the amount of movement of the support section 27 due to rotation of the circulation member 26 is 0.5, and the amount of movement of the support section 27 due to rising of the circulation member 26 is 0.5. Accordingly, the amount of movement of the support section 27 on the positive electrode conveying unit 21 side (hereinafter, referred to as "positive electrode supply side") becomes 1, and the amount of movement of the support section 27 on the stacking unit 25 side (hereinafter, referred to as "positive electrode stacking side") becomes 0. Accordingly, the amount of rise of the support section 27 on the positive electrode supply side becomes the same as in the initial operation. In addition, a height position of the support section 27 on the positive electrode stacking side does not vary and becomes constant.

At this time, the controller 60 controls the drive section 28 so that four separator-equipped positive electrodes 11 conveyed by the positive electrode conveying unit 21 are held at height positions corresponding to four vertical stages of the stacking sections 33. Specifically, the controller 60 controls the drive section 28 so that the four separator-equipped positive electrodes 11 are held at height positions of the slits 37 of the wall portion 36. According to this, the four separator-equipped positive electrodes 11 can be stacked on the four stages of stacking sections 33.

In addition, the controller 60 controls the drive section 31 to reduce a rotation speed of the circulation member 29 to approximately the half of a rotation speed in an initial operation and to raise the circulation member 29 at the same speed as the rotation speed of the circulation member 29 in the negative electrode conveying unit 22 (step S103). Furthermore, actually, step S103 is executed in parallel to step S102. Here, as illustrated in FIG. 9, when the amount of movement of the support section 30 in the initial operation is set as 1, the amount of movement of the support section 30 due to rotation of the circulation member 29 is 0.5, and the amount of movement of the support section 30 due to rising of the circulation member 29 is 0.5. Accordingly, the amount of movement of the support section 30 on the negative electrode conveying unit 22 side (hereinafter, referred to as "negative electrode supply side") becomes 1, and the amount of movement of the support section 30 on the stacking unit 25 side (hereinafter, referred to as "negative electrode stacking side") becomes 0. Accordingly, the amount of rise of the support section 30 on the negative electrode supply side becomes the same as in the initial operation. In addition, a height position of the support section 30 on the negative electrode stacking side does not vary and becomes constant.

At this time, the controller 60 controls the drive section 31 so that four negative electrodes 9 conveyed by the negative electrode conveying unit 22 are held at height positions corresponding to four vertical stages of the stacking sections 33. Specifically, the controller 60 controls the drive section 31 so that the four negative electrodes 9 are held at height positions of the slits 39 of the wall portion 38. According to this, the four negative electrodes 9 can be stacked on the four stages of stacking sections 33.

Subsequently, the controller 60 controls the drive section 56 to press the four negative electrodes 9 to the receiving section 53 by the pressing plate 55 in the positioning unit 48 (step S104). According to this, the bottom edge 9c of the negative electrode 9 is aligned.

In addition, the controller 60 controls the drive section 46 so that the four negative electrodes 9 are simultaneously pushed out toward the four vertical stages of stacking sections 33 by the push members 45 in the push-out unit 42 (step S105). According to this, the four negative electrodes 9 are simultaneously stacked on the four stages of stacking sections 33 (refer to FIG. 10).

Subsequently, the controller 60 determines whether or not predetermined sheets of electrodes are respectively stacked on the four stages of stacking sections 33 (step S106). In a case where it is determined that the predetermined sheets of electrodes are not respectively stacked on the four stages of stacking sections 33, as illustrated in FIG. 9, the controller 60 controls the drive section 34 to lower the four stages of stacking sections 33 with respect to the slits 37 and 39 by a distance corresponding to only one sheet of electrode (refer to FIG. 11) in the stacking unit 25 (step S107). That is, the controller 60 controls the drive section 34 so that stacking height positions of the separator-equipped electrodes 11 become constant with respect to the slits 37.

Subsequently, the controller 60 controls the drive section 31 to increase the rotation speed of the circulation member 29 to be five times of the previous rotation speed and to lower the circulation member 29 at a speed that is three times of the previous speed so as to lower the support sections 30 on the negative electrode stacking side by a distance corresponding to four stages in the negative electrode conveying unit 22 (step S108). Accordingly, as illustrated in FIG. 9, the amount of movement of the support sections 30 due to rotation of the circulation member 29 becomes 2.5, and the amount of movement of the support sections 30 due to lowering of the circulation member 29 becomes −1.5 ("−" represents lowering). According to this, the amount of movement of the support sections 30 on the negative electrode supply side becomes 1, and the amount of movement of the support sections 30 on the negative electrode stacking side becomes −4. As a result, the amount of rise of the support sections 30 on the negative electrode supply side becomes the same as in the initial operation, and the support sections 30 on the negative electrode stacking side lower by a distance corresponding to four stages (refer to FIG. 12).

In addition, the controller 60 controls the drive section 31 to return the circulation member 29 to the original operation state (state in step S103) (step S109).

In addition, the controller 60 controls the drive section 52 to press the four separator-equipped positive electrodes 11 to the receiving section 49 by the pressing plate 51 in the positioning unit 47 (step S110). According to this, position-ing of the bottom edge 11c of the separator-equipped positive electrodes 11 is performed.

In addition, the controller 60 controls the drive section 28 so that the four separator-equipped positive electrodes 11 are simultaneously pushed out toward the four vertical stages of stacking sections 33 by the push members 43 in the push-out unit 41 (step S111). According to this, the four separator-equipped positive electrodes 11 are simultaneously stacked on the four stages of stacking sections 33 (refer to FIG. 12). Furthermore, as illustrated in FIG. 9, actually, step S110 and step S111 are executed in parallel to step S108.

Subsequently, the controller 60 controls the drive section 34 to lower the four stages of stacking sections 33 with respect to the slits 37 and 39 by a distance corresponding to only one sheet of electrode in the stacking unit 25 (step S112). That is, the controller 60 controls the drive section 34 so that stacking height positions of the negative electrodes 9 become constant with respect to the slits 39.

Subsequently, the controller 60 controls the drive section 28 to increase the rotation speed of the circulation member 26 to be five times of the previous rotation speed and to lower the circulation member 26 at a speed that is three times of the previous speed so as to lower the support sections 27 on the positive electrode stacking side by a distance corresponding to four stages in the positive electrode conveying unit 21 (step S113). Accordingly, as illustrated in FIG. 9, the amount of movement of the support sections 27 due to rotation of the circulation member 26 becomes 2.5, and the amount of movement of the support sections 27 due to lowering of the circulation member 26 becomes −1.5 ("−" represents lowering). According to this, the amount of movement of the support sections 27 on the positive electrode supply side becomes 1, and the amount of movement of the support sections 27 on the positive electrode stacking side becomes −4. As a result, the amount of rise of the support sections 27 on the positive electrode supply side becomes the same as in the initial operation, and the support sections 27 on the positive electrode stacking side lower by a distance corresponding to four stages.

In addition, the controller 60 controls the drive section 28 to return the circulation member 26 to the original operation state (state in step S102) (step S114). In addition, the controller 60 executes step S104 and step S105. Furthermore, as illustrated in FIG. 9, actually, step S104 and step S105 are executed in parallel to step S113.

In step S106, in a case where it is determined that predetermined sheets of electrodes are respectively stacked on the four stages of stacking sections 33, the controller 60 terminates this process.

Figure 12:
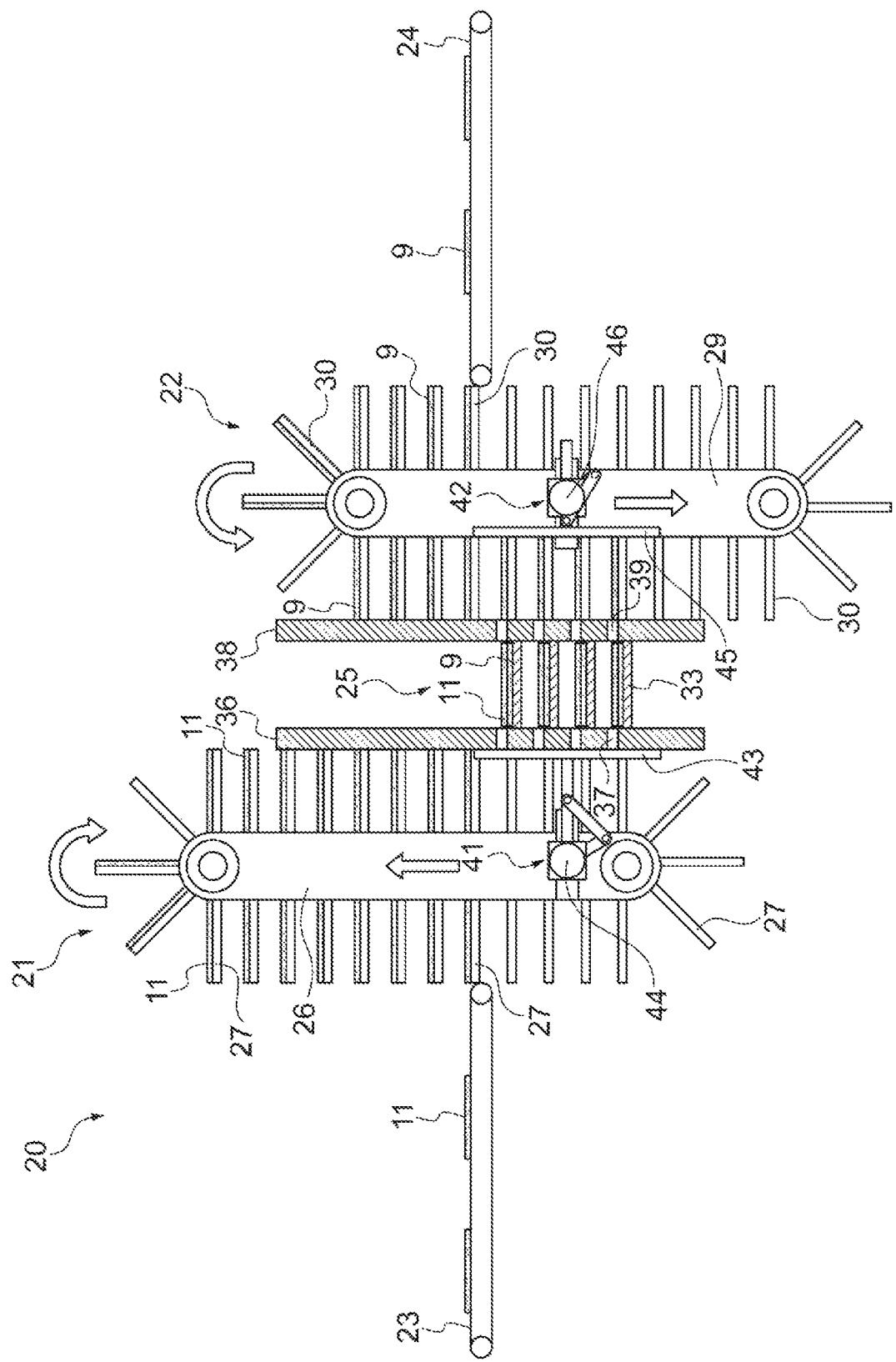
FIG. 12 is a side view (including a partial cross-section) illustrating an operation state of the electrode stacking device illustrated in FIG. 3 and FIG. 4.

FIG. 10 to FIG. 12 are side views (including a partial cross-section) illustrating an operation state of the electrode stacking device 20. FIG. 10 illustrates a state in which the support sections 27 of the positive electrode conveying unit 21 on the positive electrode stacking side are lowered by a distance corresponding to four stages, and four negative electrodes 9 are simultaneously pushed out toward four stages of the stacking sections 33 by the push-out unit 42, and thus the four negative electrodes 9 are stacked on the four stages of stacking sections 33. At this time, when the negative electrodes 9 are pushed out by the push-out unit 42, as illustrated in (a) of FIG. 6, the negative electrodes 9, which pass through the slits 39 of the wall portion 38, are dropped to be stacked on the stacking sections 33.

FIG. 11 illustrates a state in which four separator-equipped positive electrodes 11 are simultaneously pushed out toward four stages of the stacking sections 33 by the push-out unit 41 in a state in which four stages of the stacking sections 33 are lowered by a distance corresponding to one sheet of electrode. At this time, the four separator-equipped positive electrodes 11 are held at constant height positions.

FIG. 12 illustrates a state in which the four separator-equipped positive electrodes 11 are simultaneously pushed out toward the four stages of stacking sections 33 by the push-out unit 41, and thus the four separator-equipped positive electrodes 11 are respectively stacked on the negative electrodes 9, and the support sections 30 of the negative electrode conveying unit 22 on the negative electrode stacking side are lowered by a distance corresponding to four stages. At this time, the separator-equipped positive electrodes 11 supplied from the positive electrode supply conveyor 23 are sequentially held on the support sections 27 of the positive electrode conveying unit 21.

Figure 13:
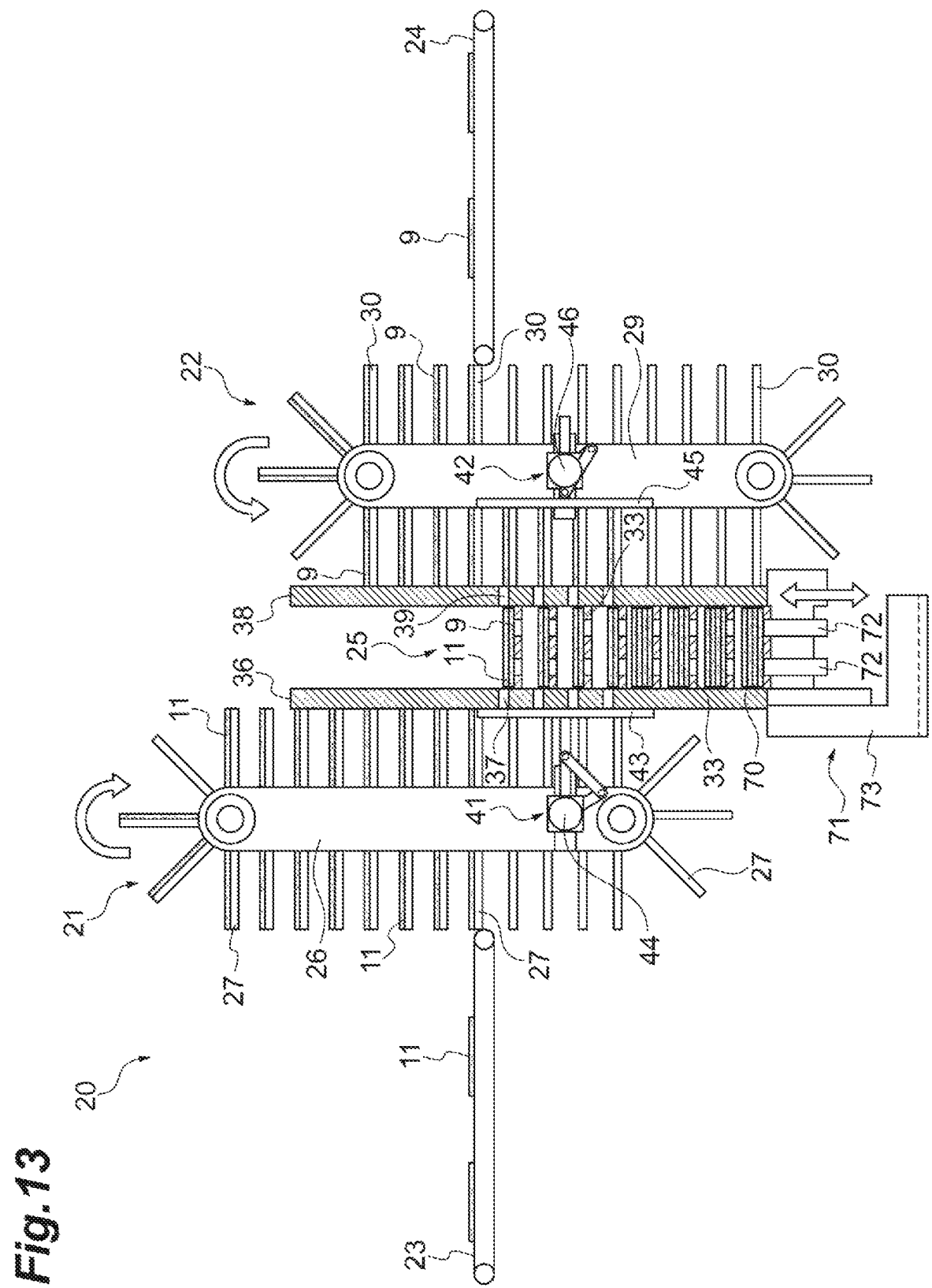
FIG. 13 is a side view (including a partial cross-section) illustrating the electrode stacking device illustrated in FIG. 3 in combination with the stacked body take-out unit.
Figure 14:
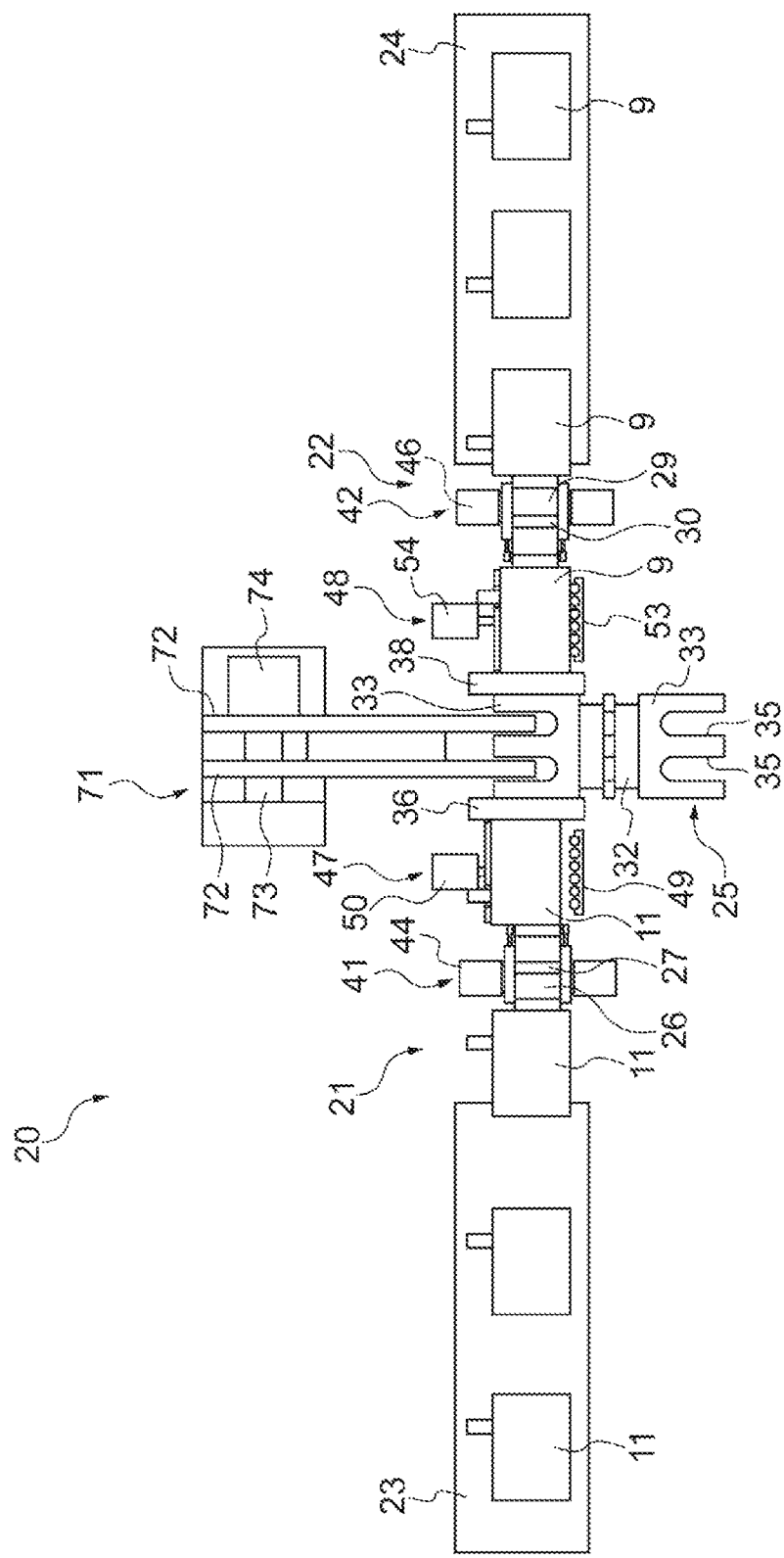
FIG. 14 is a plan view illustrating the electrode stacking device and the stacked body take-out unit which are illustrated in FIG. 13.

In addition, as illustrated in FIG. 13 and FIG. 14, the electrode stacking device 20 includes a stacked body take-out unit 71 that takes out a stacked body 70 (refer to (b) of FIG. 6) in which a plurality of the separator-equipped positive electrodes 11 and a plurality of the negative electrodes 9 are stacked on each other. As also illustrated in FIG. 6, the stacked body take-out unit 71 includes two stacked body take-out conveyors 72 for taking out the stacked body 70, a support body 73 that supports the stacked body take-out conveyors 72 in a vertically movable manner, and a drive section 74 that elevates the stacked body take-out conveyors 72.

When taking out the stacked body 70 by the stacked body take-out unit 71, as illustrated in (b) of FIG. 6, the stacked body take-out conveyors 72 are raised and thus the stacked body take-out conveyors 72 pass through the slits 35 of the stacking section 33 and come into contact with a bottom surface of the stacked body 70. Accordingly, the stacked body 70 is placed on the stacked body take-out conveyors 72, and the stacked body 70 is conveyed by the stacked body take-out conveyors 72. As a result, a plurality of the stacked bodies 70 which are respectively stacked on four vertical stages of the stacking sections 33 are sequentially got out from a lower end side.

According to the above-described embodiment, in a state in which a plurality of the separator-equipped positive electrodes 11 conveyed by the positive electrode conveying unit 21 are held at height positions corresponding to a plurality of stages of the stacking sections 33, the plurality of the separator-equipped positive electrodes 11 are simultaneously pushed out toward the plurality of stages of stacking sections 33 by the push-out unit 41, and thus the plurality of separator-equipped positive electrodes 11 are simultaneously stacked on the plurality of stages of stacking sections 33. In addition, in a state in which a plurality of the negative electrodes 9 conveyed by the negative electrode conveying unit 22 are held at height positions corresponding to a plurality of stages of the stacking sections 33, the plurality of the negative electrodes 9 are simultaneously pushed out toward the plurality of stages of stacking sections 33 by the push-out unit 42, and thus the plurality of negative electrodes 9 are simultaneously stacked on the plurality of stages of stacking sections 33. In this manner, since the plurality of separator-equipped positive electrodes 11 and the plurality of negative electrodes 9 are simultaneously stacked on the plurality of stages of stacking sections 33, even when lowering the supply speed of the separator-equipped positive electrodes 11 and the negative electrodes 9 to the stacking sections 33, it is possible to secure speeding-up in stacking of the separator-equipped positive electrodes 11 and the negative electrodes 9. Since the supply speed of the separator-equipped positive electrodes 11 and the negative electrodes 9 to the stacking sections 33 is lowered, when stacking the separator-equipped positive electrodes 11 and the negative electrodes 9 on the stacking section 33, even though each of the separator-equipped positive electrode 11 comes into contact with the wall portion 38 and each of the negative electrode 9 comes into contact with the wall portion 36, the positive electrode active material layer 15 of the separator-equipped positive electrode 11 and the negative electrode active material layer 17 of the negative electrode 9 are less likely to be peeled off. According to this, it is possible to suppress peeling-off of the positive electrode active material layer 15 and the negative electrode active material layer 17.

In addition, the plurality of separator-equipped positive electrodes 11 are held at height positions of the plurality of slits 37 provided in the wall portion 36, and the plurality of negative electrodes 9 are held at height positions of the plurality of slits 39 provided in the wall portion 38. Accordingly, when the plurality of the separator-equipped positive electrodes 11 are simultaneously pushed out toward the plurality of stages of stacking sections 33 by the push-out unit 41, the plurality of separator-equipped positive electrodes 11 respectively pass through the slits 37, and reliably stacked on the stacking sections 33. In addition, when the plurality of negative electrodes 9 are simultaneously pushed out toward the plurality of stages of stacking sections 33 by the push-out unit 42, the plurality of negative electrodes 9 respectively pass through the slits 39, and are reliably stacked on the stacking sections 33.

In addition, since the tapered portion 40 is formed at a portion of the inner surface 36a of the wall portion 36 on a lower side of each of the slits 37 and at a portion of the inner surface 38a of the wall portion 38 on a lower side of each of the slits 39 so that a distance between the wall portions 36 and 38 gradually increases toward an upward side, the separator-equipped positive electrode 11 which has passed through the slit 37 and the negative electrode 9 which has passed through the slit 39 are easily dropped to each of the stacking sections 33. As a result, the separator-equipped positive electrode 11 and the negative electrode 9 are easily stacked on the stacking section 33.

In addition, since the stacking height positions of the separator-equipped positive electrode 11 and the stacking height position of the negative electrode 9 become constant with respect to the slit 37 of the wall portion 36 and the slit 39 of the wall portion 38, a drop distance of the separator-equipped positive electrode 11 and the negative electrode 9 become uniform regardless of the number of the separator-equipped positive electrodes 11 and the negative electrodes 9 which are stacked.

In addition, since the separator-equipped positive electrode 11 and the negative electrode 9 are pushed out toward the stacking sections 33 in a state in which the position of the bottom edge 11c of the separator-equipped positive electrode 11 and the position of the bottom edge 9c of the negative electrode 9 are aligned, it is possible to stack the separator-equipped positive electrode 11 and the negative electrode 9 with high positioning accuracy in the stacking section 33.

At this time, when the separator-equipped positive electrode 11 and the negative electrode 9 are respectively pressed to the receiving sections 49 and 53 by the pressing sections 50 and 54, the bottom edge 11c of the separator-equipped positive electrode 11 and the bottom edge 9c of the negative electrode 9 respectively come into contact with the receiving sections 49 and 53, and thus it is possible to accurately align the positions of the bottom edge 11c of the separator-equipped positive electrode 11 and the bottom edge 9c of the negative electrode 9.

In addition, since the positioning units 47 and 48 are respectively disposed at the same stacking areas as those of the push-out units 41 and 42, when the separator-equipped positive electrode 11 and the negative electrode 9 are pushed out toward the stacking sections 33, a positional deviation of the separator-equipped positive electrode 11 and the negative electrode 9 is less likely to occur.

Furthermore, in this embodiment, the positioning units 47 and 48 are respectively disposed at the same stacking areas as those of the push-out units 41 and 42, but the arrangement position of the positioning units 47 and 48 may be an upper side of the stacking areas in which the push-out units 41 and 42 are respectively disposed. In this case, positioning of the separator-equipped positive electrode 11 and the negative electrode 9, and push-out of the separator-equipped positive electrode 11 and the negative electrode 9 to the stacking sections 33 can be simultaneously performed, and thus it is possible to lower the operation speed of the positioning and the push-out. In addition, in this embodiment, since reception of an electrode (the separator-equipped positive electrode 11 or the negative electrode 9) by the support section 27 or 30 and stacking of the electrodes to the stacking unit 25 are performed by using the loop-shaped circulation members 26 and 29, and thus it is possible to realize continuous working with efficiency. Specifically, the circulation members 26 and 29 have the loop shape, and thus a return operation of returning the support sections 27 and 30 to the original position is not necessary. As a result, an efficient continuous operation is realized.

Figure 15:
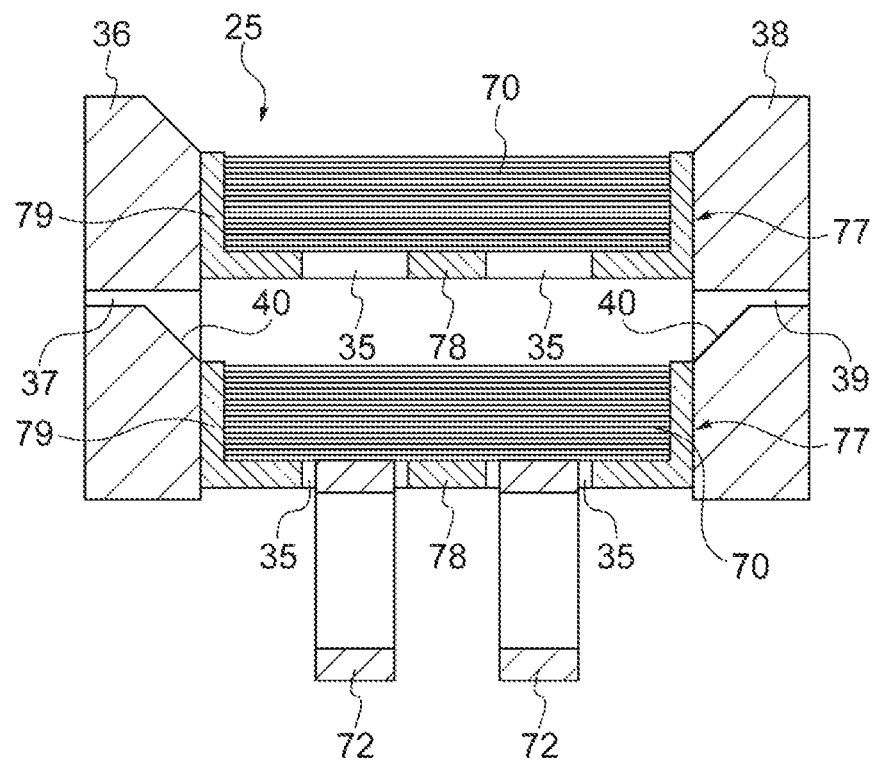
FIG. 15 is an enlarged cross-sectional view illustrating a modification example of the stacking section illustrated in (b) of FIG. 6.
Figure 16:
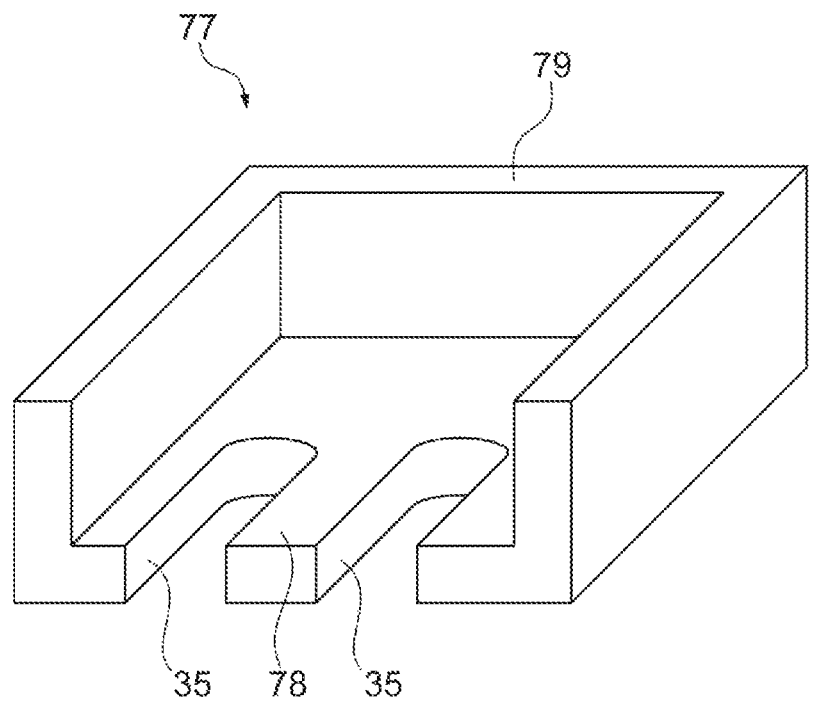
FIG. 16 is a perspective view of the stacking section illustrated in FIG. 15.

FIG. 15 is an enlarged cross-sectional view illustrating a state in which the separator-equipped positive electrode 11 and the negative electrode 9 are stacked on a modification example of the stacking sections according to the first embodiment, and corresponds to (b) of FIG. 6. FIG. 16 is a perspective view of each of the stacking sections illustrated in FIG. 15.

In FIG. 15 and FIG. 16, a stacking section 77 of this modification example includes a plate-shaped base 78 on which the separator-equipped positive electrode 11 and the negative electrode 9 are placed, and a side wall 79 which is provided to be erected from the base 78, has a U-shaped cross-section, and performs positioning of the bottom edge 11c and a side edge 11d (refer to FIG. 4) of the separator-equipped positive electrode 11 and the bottom edge 9c and a side edge 9d (refer to FIG. 4) of the negative electrode 9. The slits 35 are provided in the base 78. Both lateral surfaces of the side wall 79 are respectively fixed to the wall portions 36 and 38.

In this modification example, when stacking the separator-equipped positive electrodes 11 and the negative electrodes 9 on a plurality of stages of the stacking sections 77, it is not necessary to move the plurality of stages of stacking sections 77 in the vertical direction. Accordingly, a control process by the controller 60 becomes easy.

Figure 17:
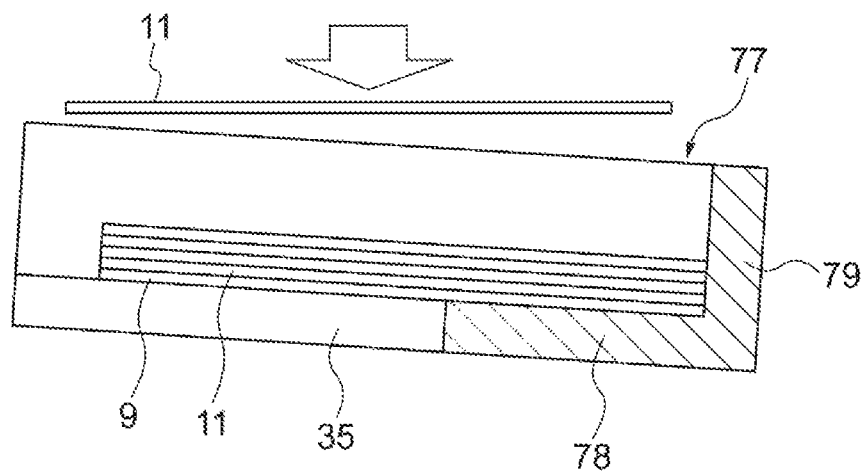
FIG. 17 is a cross-sectional view illustrating a state in which the stacking section illustrated in FIG. 15 is supported in an inclined manner.

Furthermore, as illustrated in FIG. 17, the stacking section 77 may be supported to the wall portions 36 and 38 in an inclined state in which a front side (the front side of the paper surface in FIG. 3) of the base 78 is set to be lower than a rear side of the base 78. In this configuration, the separator-equipped positive electrode 11 and the negative electrode 9 which are pushed out toward the stacking section 77 come into contact with a rear-side inner wall surface of the side wall 79 in the stacking section 77 and positioning thereof is performed. In this case, positioning of the separator-equipped positive electrode 11 and the negative electrode 9 in a front and rear direction is performed due to the inclination of the stacking section 77, and thus it is possible to omit the positioning units 47 and 48.

Figure 18:
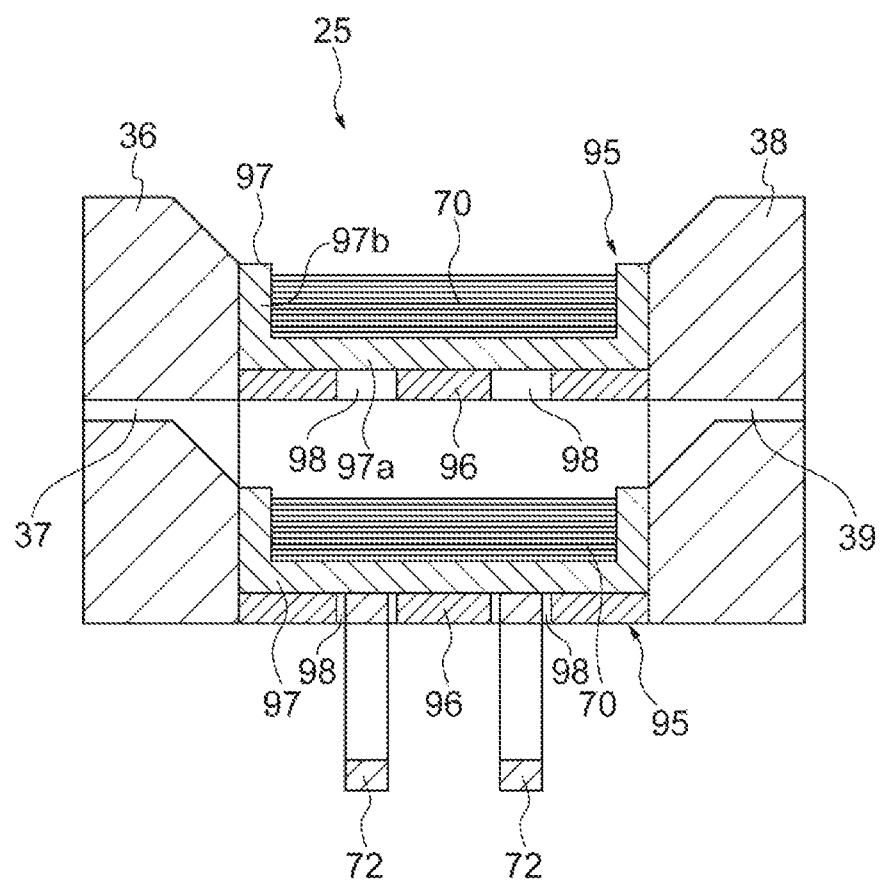
FIG. 18 is an enlarged cross-sectional view illustrating another modification example of the stacking section illustrated in (b) of FIG. 6.

FIG. 18 is an enlarged cross-sectional view illustrating a state in which the separator-equipped positive electrode 11 and the negative electrode 9 are stacked on still another modification example of the stacking section according to the first embodiment, and corresponds to FIG. 15.

In FIG. 18, a stacking section 95 of this modification example includes a stacking support portion 96 that is fixed to the wall portions 36 and 38, and a stacking jig 97 that is detachably supported on the stacking support portion 96. Two slits 98, into which a part of the stacked body take-out conveyor 72 inserted, are formed in the stacking support portion 96. The stacking jig 97 includes a plate-shaped base 97a on which the separator-equipped positive electrode 11 and the negative electrode 9 are placed, and a side wall 97b which is provided to be erected from the base 97a, has a U-shaped cross-section, and performs positioning of the bottom edge 11c and the side edge 11d (refer to FIG. 4) of the separator-equipped positive electrode 11 and the bottom edge 9c and the side edge 9d (refer to FIG. 4) of the negative electrode 9. Although not particularly illustrated, a convex portion is provided on an upper surface of the stacking support portion 96, a concave portion is provided on a bottom surface of the stacking jig 97, and positioning of the stacking jig 97 with respect to the stacking support portion 96 is performed through fitting between the convex portion and the concave portion.

After stacking of the separator-equipped positive electrode 11 and the negative electrode 9 is completed, when the stacking jig 97 rides on the stacked body take-out conveyor 72, the fitting between the convex portion and the concave portion is released, and the stacked body 70 is conveyed by the stacked body take-out conveyor 72 in combination with the stacking jig 97. As described above, when conveying the stacked body 70, the stacked body 70 is accommodated in the stacking jig 97, and thus it is possible to suppress conveyance deviation of the stacked body 70 and the like.

Second Embodiment

Figure 19:
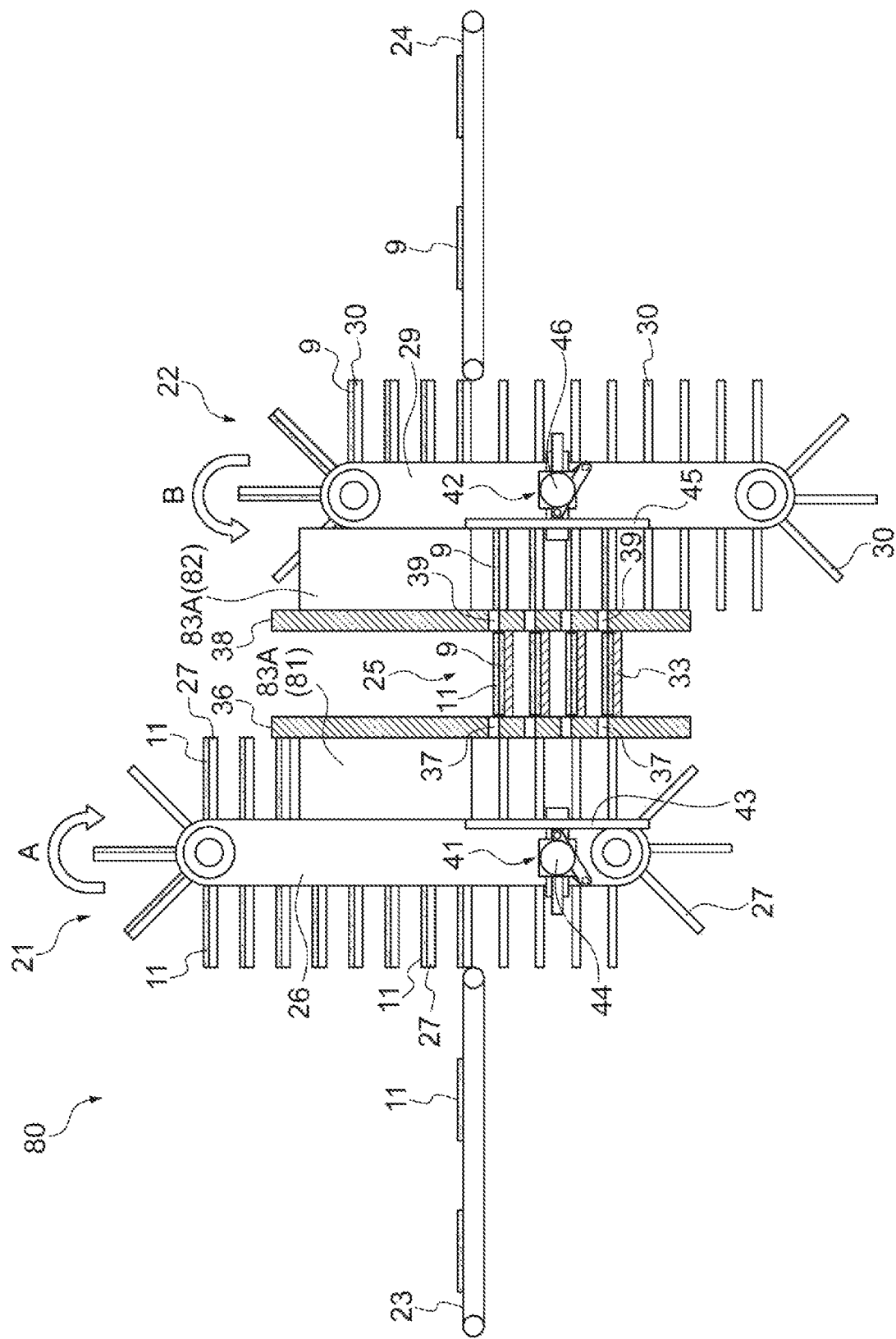
FIG. 19 is a side view (including a partial cross-section) illustrating an electrode stacking device according to a second embodiment.
Figure 20:
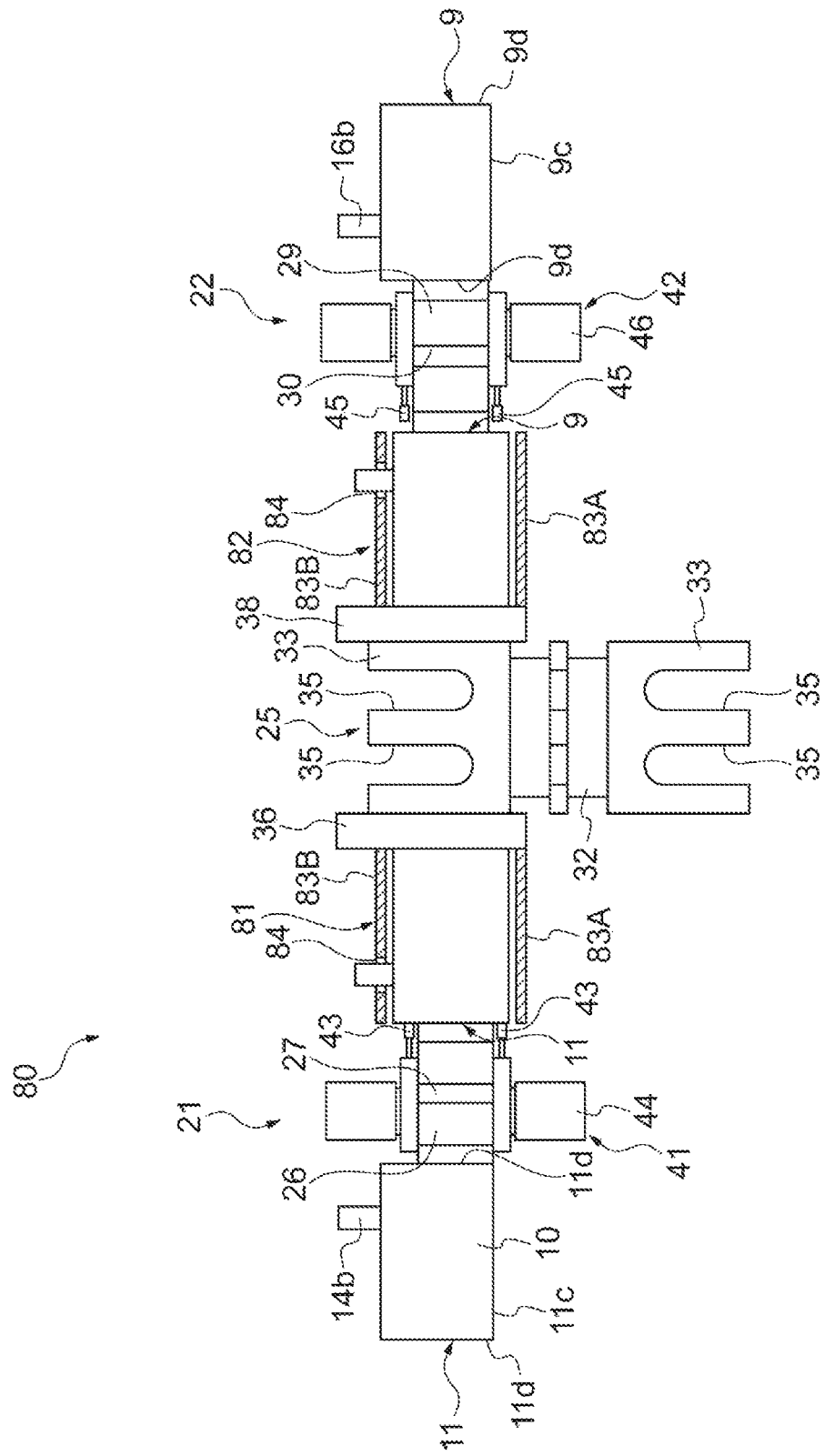
FIG. 20 is a plan view of the electrode stacking device illustrated in FIG. 19.

FIG. 19 is a side view (including a partial cross-section) illustrating an electrode stacking device according to a second embodiment. FIG. 20 is a plan view of the electrode stacking device illustrated in FIG. 19. In FIG. 19 and FIG. 20, an electrode stacking device 80 of this embodiment includes positioning units 81 and 82 instead of the positioning units 47 and 48 according to the first embodiment.

The positioning unit 81 is disposed on an upper side of the push-out unit 41, and the positioning unit 82 is disposed on an upper side of the push-out unit 42. Each of the positioning units 81 and 82 includes a pair of guide plates 83A and 83B which guide the separator-equipped positive electrode 11 or the negative electrode 9 to a lower side. The guide plates 83A and 83B are disposed to face each other in a state in which the plurality of support sections 27 or 30 on the electrode stacking side in the positive electrode conveying unit 21 or the negative electrode conveying unit 22 are interposed therebetween. The guide plate 83B is provided with a slit 84 through which the tab 14b of the separator-equipped positive electrode 11 or the tab 16b of the negative electrode 9 passes.

Figure 21:
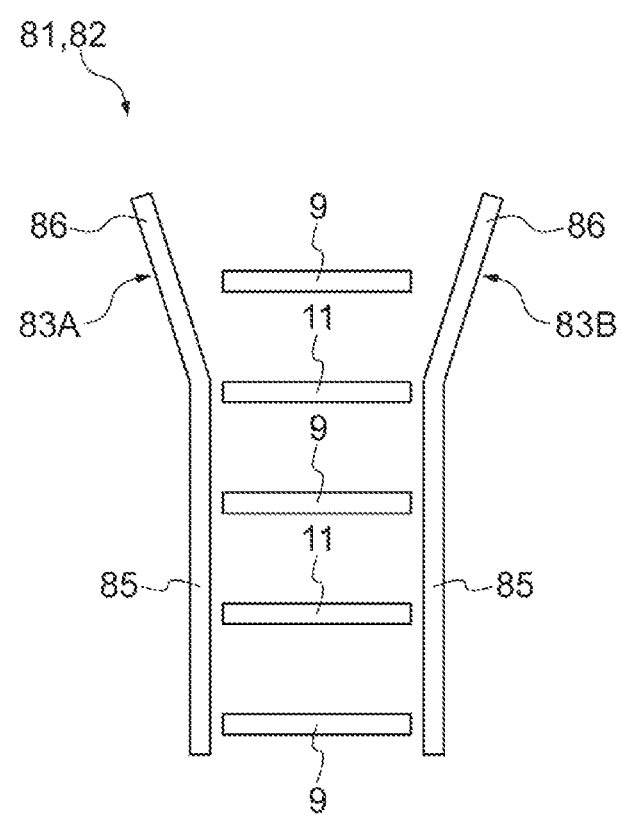
FIG. 21 is a front view of a pair of guide plates.

As illustrated in FIG. 21, each of the guide plates 83A and 83B includes a positioning portion 85 that aligns a position of the bottom edge 11c of the separator-equipped positive electrode 11 or the bottom edge 9c of the negative electrode 9, and a tapered portion 86 which is disposed on an upper side of the positioning portion 85 to make a gap between the guide plates 83A and 83B be gradually narrowed toward a downward side.

In the positioning unit 81 and 82, positioning of the separator-equipped positive electrode 11 and the negative electrode 9 is performed along the guide plates 83A and 83B when the separator-equipped positive electrode 11 and the negative electrode 9 are lowered along with lowering of the plurality of support sections 27 and 30 on the electrode stacking side in the positive electrode conveying unit 21 and the negative electrode conveying unit 22, and thus positions of the bottom edge 11c of the separator-equipped positive electrode 11 and the bottom edge 9c of the negative electrode 9 are aligned.

In this embodiment, it is possible to align the position of the bottom edge 11c of the separator-equipped positive electrode 11 and the bottom edge 9c of the negative electrode 9 in a simple configuration without using an actuator or the like.

Third Embodiment

Figure 22:
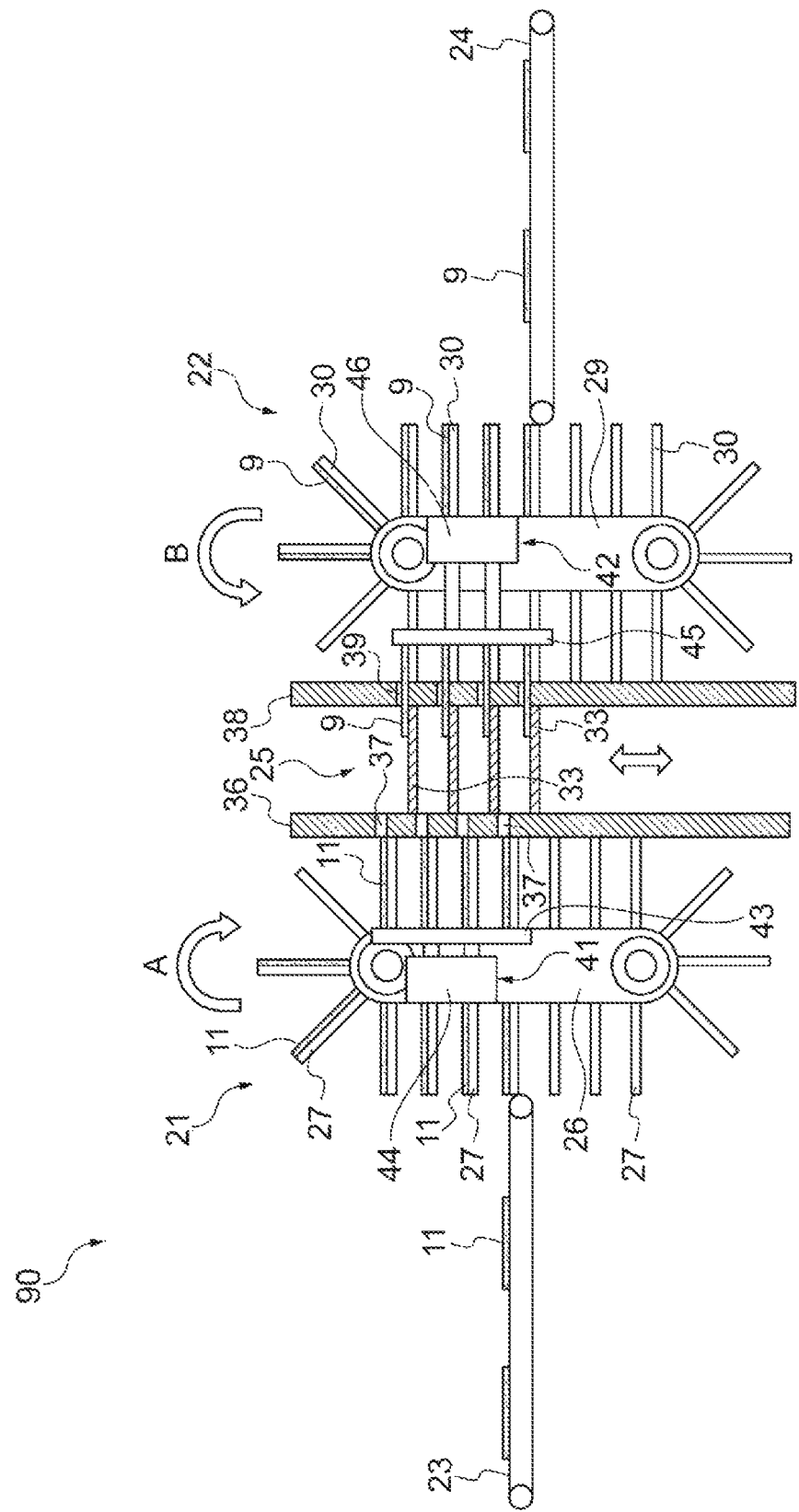
FIG. 22 is a side view (including a partial cross-section) illustrating an electrode stacking device according to a third embodiment.
Figure 23:
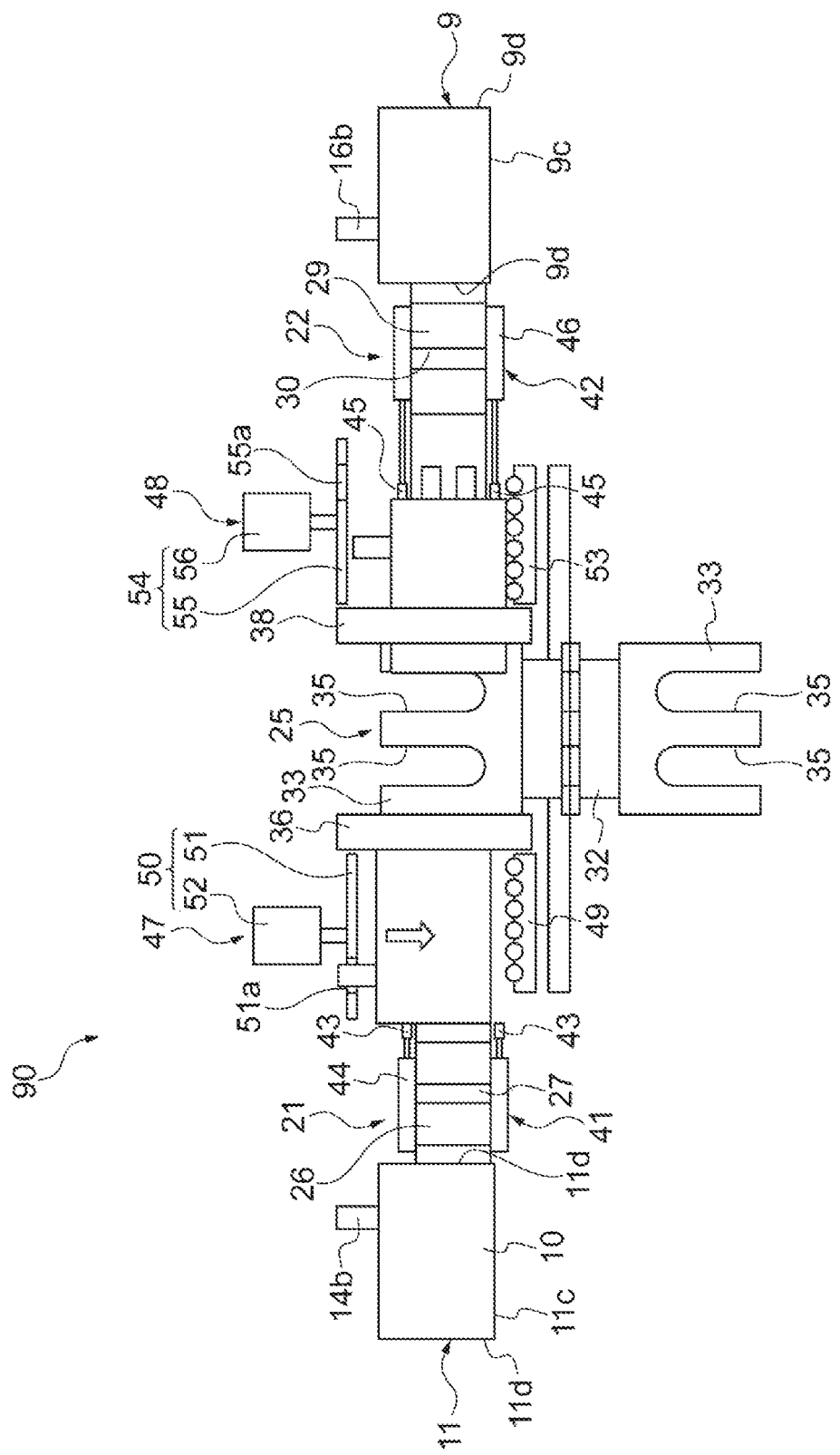
FIG. 23 is a plan view of the electrode stacking device illustrated in FIG. 22.

FIG. 22 is a side view (including a partial cross-section) illustrating an electrode stacking device according to a third embodiment. FIG. 23 is a plan view of the electrode stacking device illustrated in FIG. 22. In FIG. 22 and FIG. 23, in an electrode stacking device 90 of this embodiment, the height positions of the slits 37 of the wall portion 36 and the height positions of the slits 39 of the wall portion 38 alternatively deviate from each other. Specifically, each of the height positions of the slits 37 is set to be higher than each of the height positions of the slits 39. In addition, the drive section 44 of the push-out unit 41 and the drive section 46 of the push-out unit 42 are constituted by a pair of cylinders.

The stacking control unit 62 (refer to FIG. 7) controls the drive section 34 (refer to FIG. 5) so that the stacking height position of the separator-equipped positive electrode 11 or the negative electrode 9 becomes constant with respect to the slit 37 or the slit 39. Specifically, when stacking the separator-equipped positive electrode 11 on four stages of the stacking sections 33 by the push-out unit 41, the stacking control unit 62 controls the drive section 34 to raise the four stages of stacking sections 33. When stacking the negative electrode 9 on the four stages of stacking sections 33 by the push-out unit 42, the stacking control unit 62 controls the drive section 34 to lower the four stages of stacking sections 33.

In the first to third embodiments, when stacking the separator-equipped positive electrode 11 and the negative electrode 9 on the stacking sections 33, the separator-equipped positive electrode 11, which passes through the slit 37, comes into contact with the inner surface 38a of the wall portion 38, and thus positioning thereof is performed, and the negative electrode 9, which passes through the slit 39, comes into contact with the inner surface 36a of the wall portion 36, and thus positioning thereof is performed.

Furthermore, in the first to third embodiments, the height position of the slit 37 is set to be higher than the height position of the slit 39, but the height position of the slit 39 may be set to be higher than the height position of the slit 37. In this case, when stacking the separator-equipped positive electrode 11 on the four stages of stacking sections 33, the four stages of stacking sections 33 are lowered, and when stacking the negative electrode 9 on the four stages of stacking sections 33, the four stages of the stacking sections 33 are raised.

In addition, for example, in the first to third embodiments, the stacking unit 25 includes the loop-shaped circulation member 32 that extends in the vertical direction, and the plurality of plate-shaped stacking sections 33 which are formed on the outer peripheral surface of the circulation member 32 and on which the separator-equipped positive electrode 11 and the negative electrode 9 are alternately stacked. However, there is no particular limitation to a structure of the stacking unit as long as the stacking unit includes a plurality of stages of stacking sections on which the separator-equipped positive electrode 11 and the negative electrode 9 are alternately stacked.

Furthermore, respective constituent elements of the electrode stacking devices 20, 80, and 90 according to the first to third embodiments can be described as follows. The electrode stacking devices 20, 80, and 90 are devices which stack electrodes (the separator-equipped positive electrode 11 and the negative electrode 9) conveyed by the positive electrode supply conveyor 23 (conveying device) and the negative electrode supply conveyor 24 (conveying device) to form the stacked body 70 (electrode stacked body). The electrode stacking device 20, 80, and 90 include the support sections 27 and 30 (electrode support sections), the circulation members 26 and 29, the stacking unit 25, the push-out units 41 and 42, and the controller 60 (control unit). The support sections 27 and 30 respectively receive the separator-equipped positive electrode 11 and the negative electrode 9 which are supplied by the positive electrode supply conveyor 23 and the negative electrode supply conveyor 24, and respectively support the separator-equipped positive electrode 11 and the negative electrode 9. The circulation members 26 and 29 have a loop shape that extends in the vertical direction, and the support sections 27 and 30 are respectively formed on the outer peripheral surfaces of the circulation members 26 and 29. The stacking unit 25 is disposed on a side opposite to the positive electrode supply conveyor 23 with the circulation member 26 interposed therebetween, and is disposed on a side opposite to the negative electrode supply conveyor 24 with the circulation member 29 interposed therebetween. The stacking unit 25 includes a plurality of stages of the stacking sections 33 on which the separator-equipped positive electrode 11 and the negative electrode 9 are stacked. The push-out unit 41 simultaneously pushes out the separator-equipped positive electrodes 11 supported by the plurality of support sections 27 toward the plurality of stages of stacking sections 33. The push-out unit 42 simultaneously pushes out the negative electrodes 9 supported by the plurality of support sections 30 toward the plurality of stages of stacking sections 33. The controller 60 controls circulation and elevation of the circulation members 26 and 29, and the operation of the push-out units 41 and 42. The controller 60 controls the operation of the push-out unit 41 to push out the separator-equipped positive electrode 11 toward the stacking sections 33 at a speed that is slower than the conveying speed of the separator-equipped positive electrode 11 that is conveyed by the positive electrode supply conveyor 23. In addition, the controller 60 controls the operation of the push-out unit 42 to push out the negative electrode 9 toward the stacking sections 33 at a speed that is slower than the conveying speed of the negative electrode 9 that is conveyed by the negative electrode supply conveyor 24.

In the electrode stacking devices 20, 80, and 90 as described above, electrodes (the separator-equipped positive electrodes 11 or the negative electrodes 9) which are sequentially supplied to the support section 27 or 30 are simultaneously pushed out to the stacking sections 33 different from each other, and are stacked thereon. As described above, electrodes in a number greater than an electrode that is sequentially supplied are simultaneously pushed out and are stacked. Accordingly, an ejection speed when pushing out the electrodes to the stacking sections 33 can be set to be slower than the conveying speed (supply speed) of the electrode by the conveying device (the positive electrode supply conveyor 23 or the negative electrode supply conveyor 24). According to this, it is possible to suppress a positional deviation of the electrodes when stacking the electrodes while preventing an electrode stacking speed from being lowered. As a result, according to the electrode stacking devices 20, 80, and 90, it is possible to accomplish speeding-up of the stacking speed while suppressing an increase in size of the devices.

Figure 24:
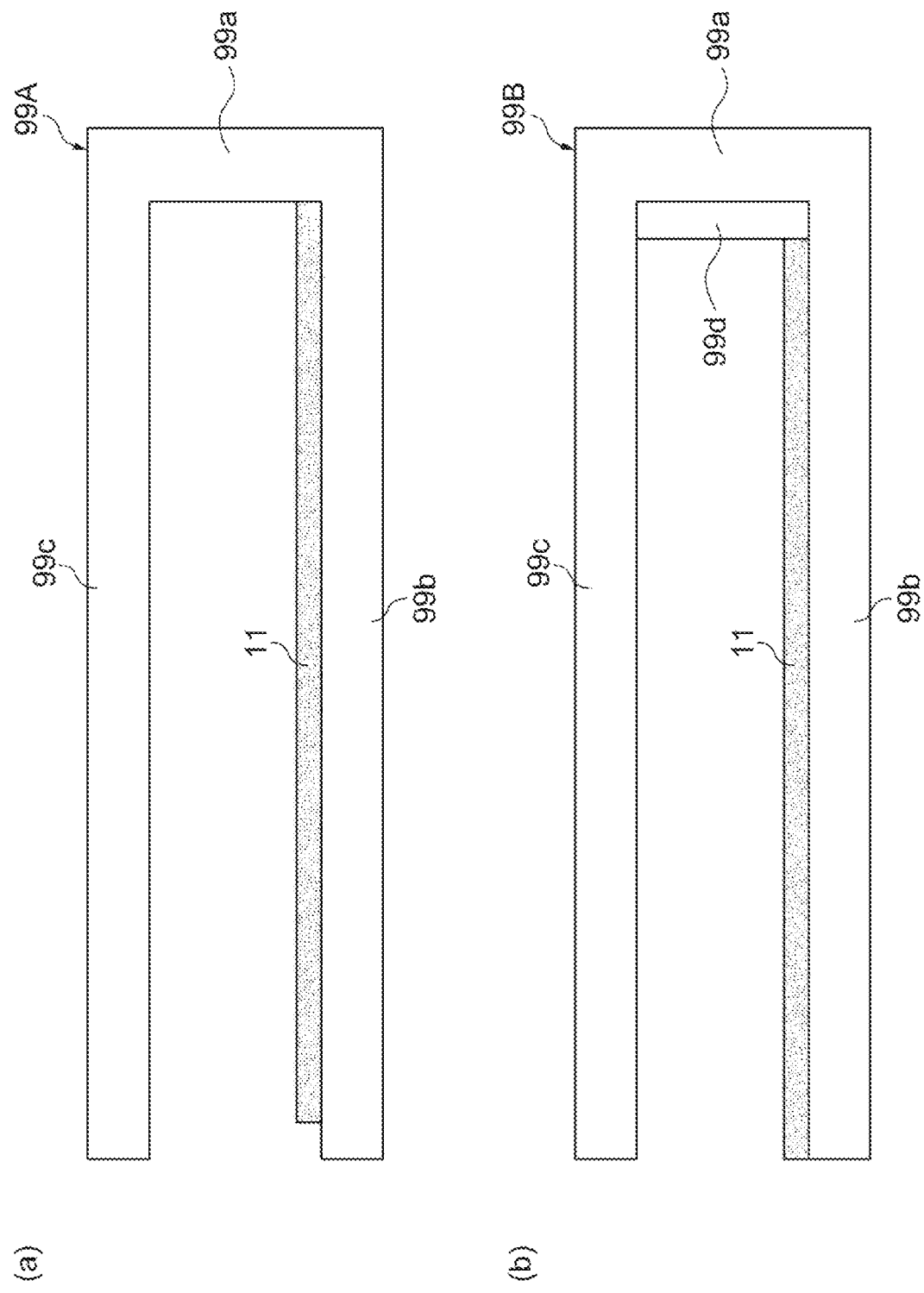
FIG. 24 is a view illustrating a modification example of a support section.

In addition, the positive electrode conveying unit 21 may include a support section 99A illustrated in (a) of FIG. 24 instead of the plate-shaped support section 27. The support section 99A is a member that has a U-shaped cross-section and includes a bottom wall 99a and a pair of side walls 99b and 99c. The bottom wall 99a is a rectangular plate-shaped member that is formed on the outer peripheral surface of the circulation member 26. The pair of side walls 99b and 99c are rectangular plate-shaped members provided to be erected from both edge portions of the bottom wall 99a in a direction in which the circulation member 26 circulates. The pair of side walls 99b and 99c face each other, and are spaced away from each other to an extent capable of accommodating the separator-equipped positive electrode 11. For example, the bottom wall 99a and the side walls 99b and 99c are integrally formed from a metal such as stainless steel.

Here, it is assumed that the support section 99A is formed on the circulation member 26 so that the side wall 99b is located on a lower side in comparison to the side wall 99c in a section in which the support section 99A is raised with respect to the circulation member 26. In this case, immediately after the support section 99A receives the separator-equipped positive electrode 11 from the positive electrode supply conveyor 23, the separator-equipped positive electrode 11 is supported by the side wall 99b. Then, when the support section 99A is switched to lowering with respect to the circulation member 26, the separator-equipped positive electrode 11 is separated from the side wall 99b due to the gravity, and is changed to a state of being supported by the side wall 99c.

A surface of the side wall 99b may be formed from a material (for example, rubber and the like) that is less slippery in comparison to the side wall 99c. Alternatively, the side wall 99b may have a suction function of suctioning the separator-equipped positive electrode 11 with respect to the surface of the side wall 99b. According to this, it is possible to reduce the speed of the separator-equipped positive electrode 11 that is supplied from the positive electrode supply conveyor 23 and slides on the side wall 99b, and thus it is possible to mitigate impact when the separator-equipped positive electrode 11 collides with the bottom wall 99a. That is, the side wall 99b functions as an impact mitigation portion that mitigates impact to the separator-equipped positive electrode 11 when the support section 99A receives the separator-equipped positive electrode 11. As a result, when the separator-equipped positive electrode 11 is supplied to the support section 99A, it is possible to suppress peeling-off of the positive electrode active material layer 15 of the separator-equipped positive electrode 11.

In addition, the positive electrode conveying unit 21 may include a support section 99B illustrated in (b) of FIG. 24 instead of the plate-shaped support section 27. The support section 99B is different from the support section 99A in that a buffering material 99d such as sponge is provided on an inner surface of the bottom wall 99a, and the other configurations are the same as in the support section 99A. When using the support section 99B, the separator-equipped positive electrode 11 supplied from the positive electrode supply conveyor 23 collides with the buffering material 99d, but collision impact is mitigated by the buffering material 99d. That is, the buffering material 99d functions as an impact mitigation section that mitigates impact to the separator-equipped positive electrode 11 when the support section 99B receives the separator-equipped positive electrode 11. As a result, when the separator-equipped positive electrode 11 is supplied to the support section 99B, it is possible to suppress peeling-off of the positive electrode active material layer 15 of the separator-equipped positive electrode 11.

Furthermore, with regard to the negative electrode conveying unit 22, the support section 99A or the support section 99B may also be used instead of the plate-shaped support section 30. In this case, the same effect as in the above-described case is achieved. In the case of using the support section 99A or the support section 99B in the negative electrode conveying unit 22, when the negative electrode 9 is supplied to the support section 99A or the support section 99B, it is possible to suppress peeling-off of the negative electrode active material layer 17 of the negative electrode 9.

In addition, in the electrode stacking devices 20, 80, and 90, the push-out unit 41 may include a push member having dimensions capable of entering the slit 37 of the wall portion 36 instead of the push member 43. According to the push member, it is possible to push the separator-equipped positive electrode 11 to a position at which the entirety of the separator-equipped positive electrode 11 passes through the slit 37, and it is possible to appropriately guide the separator-equipped positive electrode 11 to the stacking section 33. In addition, it is not necessary to vigorously push the separator-equipped positive electrode 11 into the slit 37, and thus it is possible to reduce a possibility that the separator-equipped positive electrode 11 collides with the inner surface 38a of the wall portion 38 and thus the positive electrode active material layer 15 is peeled off. Similarly, the push-out unit 42 may include a push member having dimensions capable of entering the slit 39 of the wall portion 38 instead of the push member 45. According to the push member, it is possible to push the negative electrode 9 to a position at which the entirety of the negative electrode 9 passes through the slit 39, and it is possible to appropriately guide the negative electrode 9 to the stacking section 33. In addition, it is not necessary to vigorously push the negative electrode 9 into the slit 39, and thus it is possible to reduce a possibility that the negative electrode 9 collides with the inner surface 36a of the wall portion 36 and thus the negative electrode active material layer 17 is peeled off.

Fourth Embodiment

Figure 25:
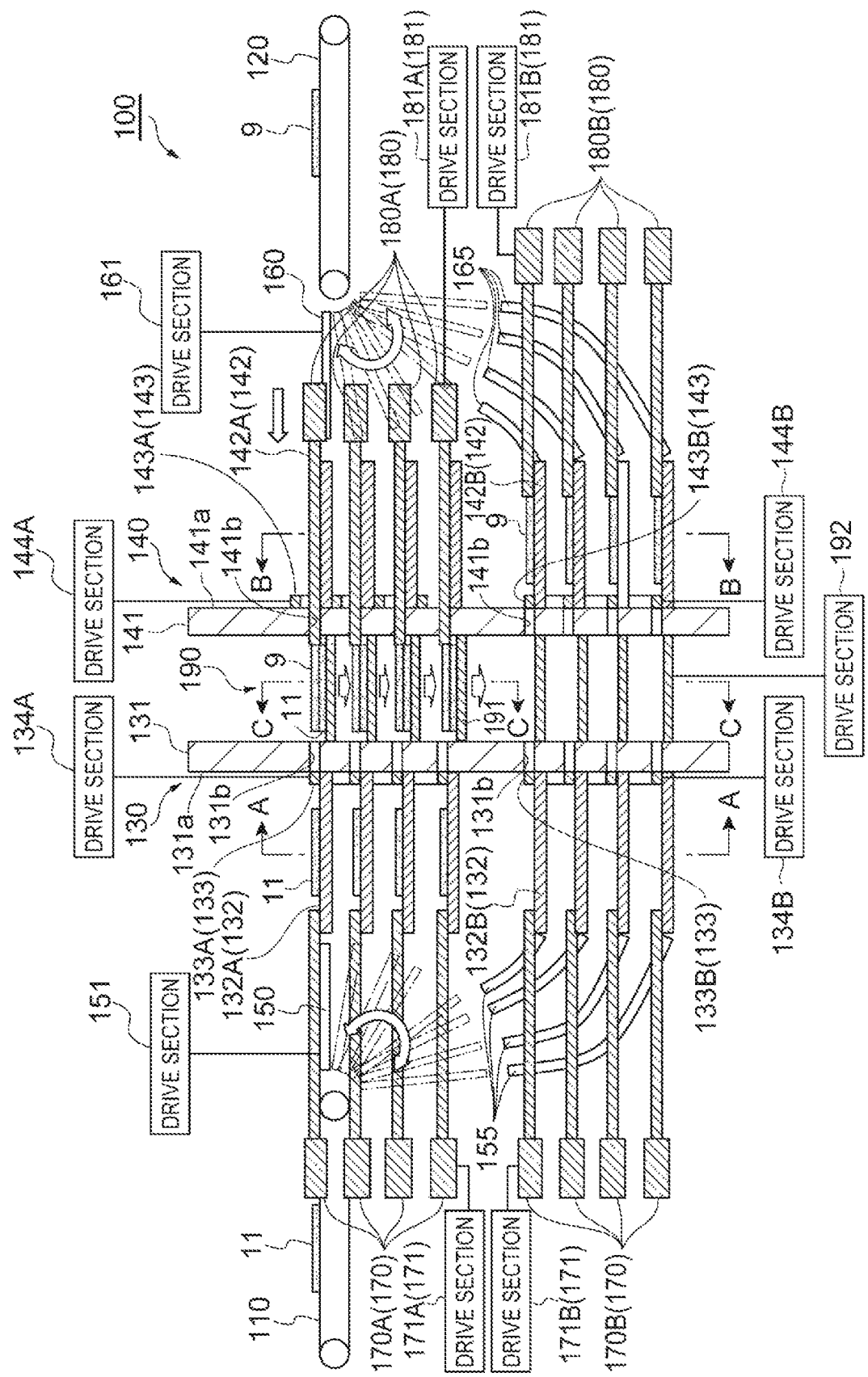
FIG. 25 is a side view (including a partial cross-section) illustrating an electrode stacking device according to a fourth embodiment.

Description will be given of an electrode stacking device 100 according to a fourth embodiment with reference to FIG. 25 to FIG. 30. FIG. 25 is a side view (including a partial cross-section) illustrating the electrode stacking device 100.

Figure 26:
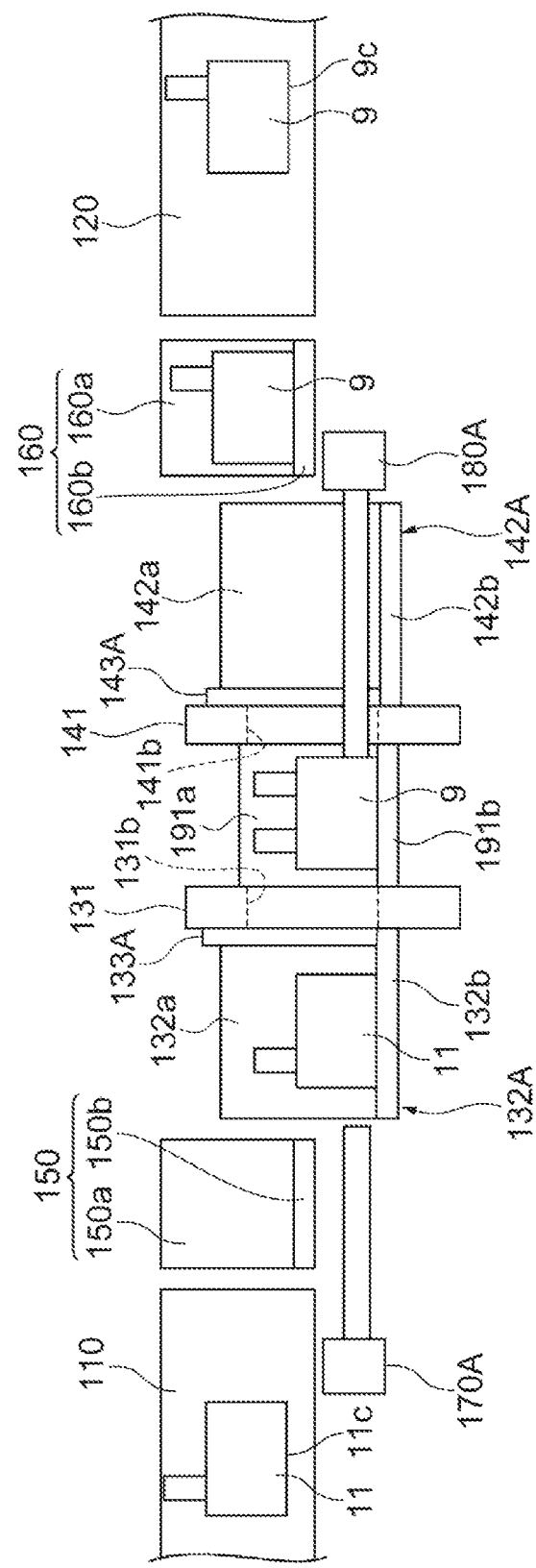
FIG. 26 is a plan view of the electrode stacking device illustrated in FIG. 25.
Figure 27:
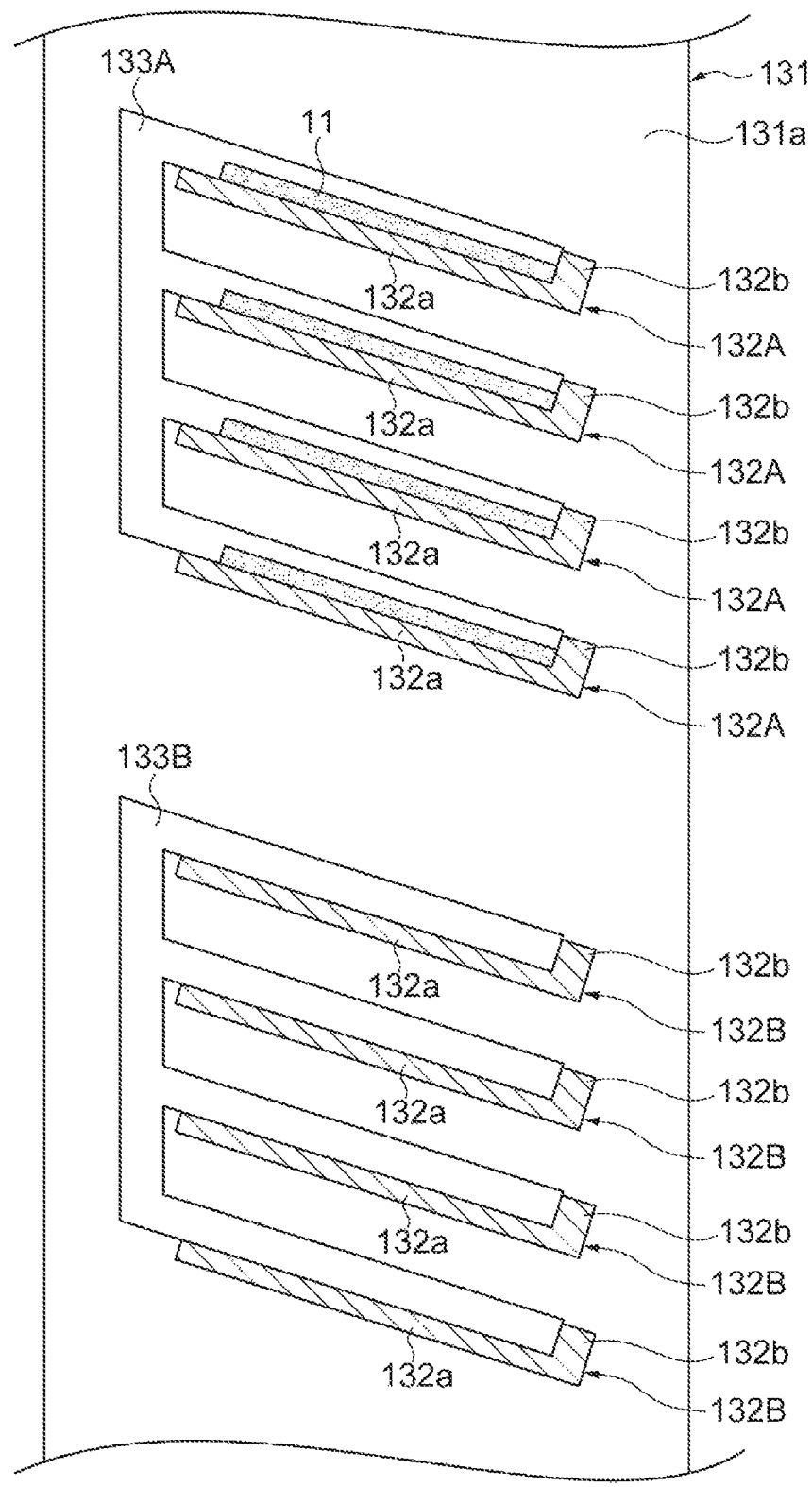
FIG. 27 is a cross-sectional view taken along line A-A in FIG. 25.
Figure 28:
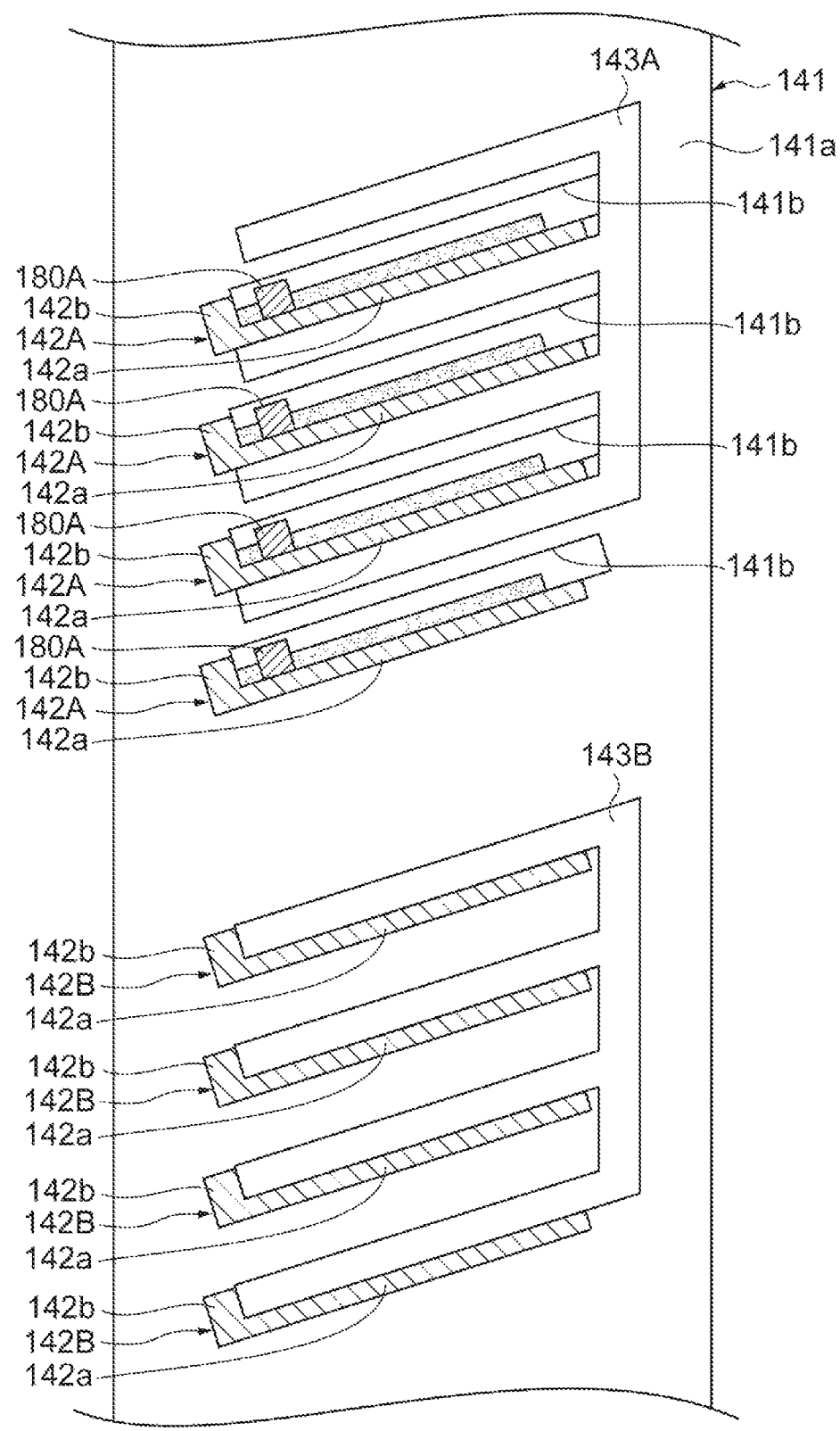
FIG. 28 is a cross-sectional view taken along line B-B in FIG. 25.
Figure 29:
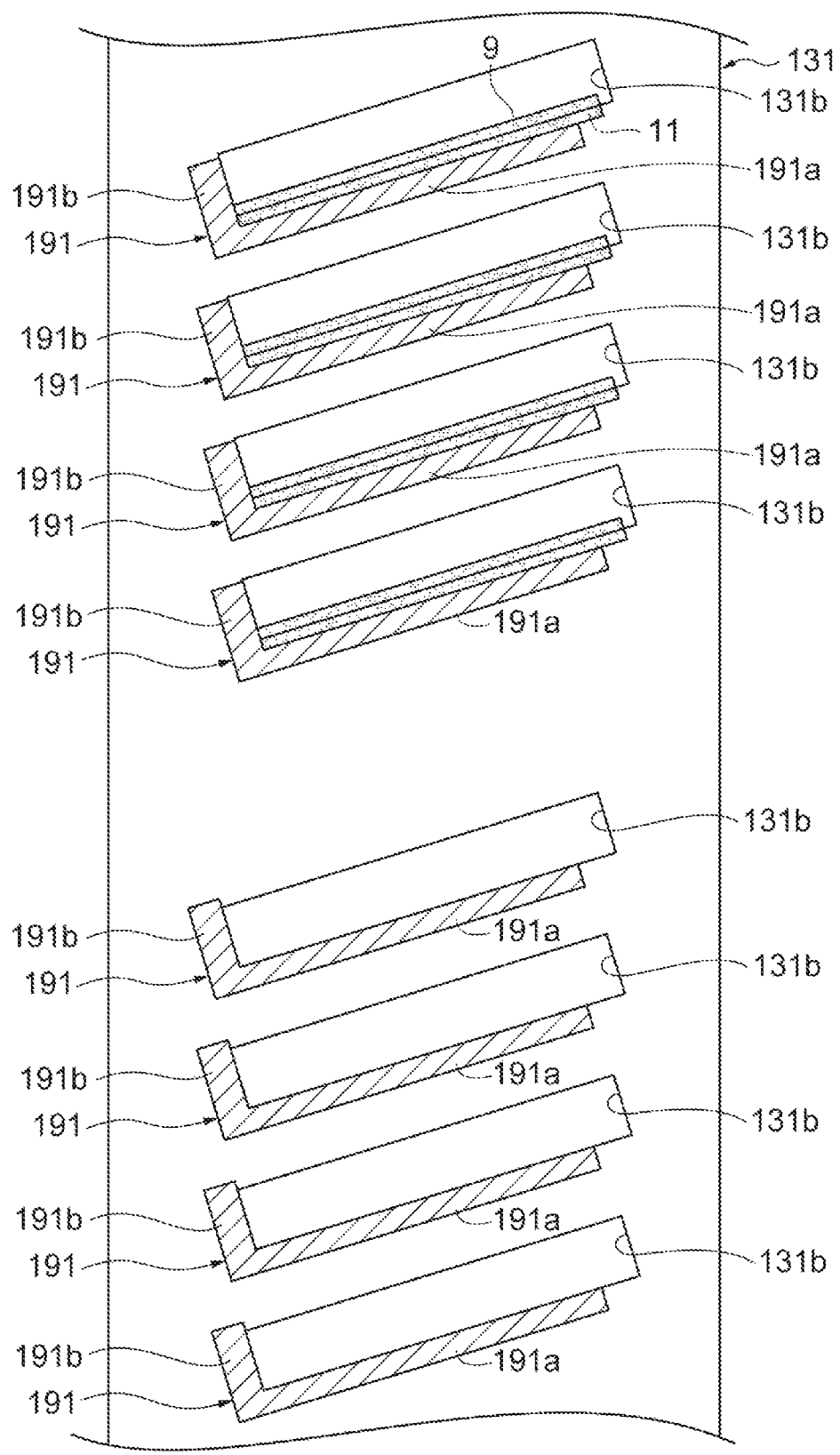
FIG. 29 is a cross-sectional view taken along line C-C in FIG. 25.
Figure 30:
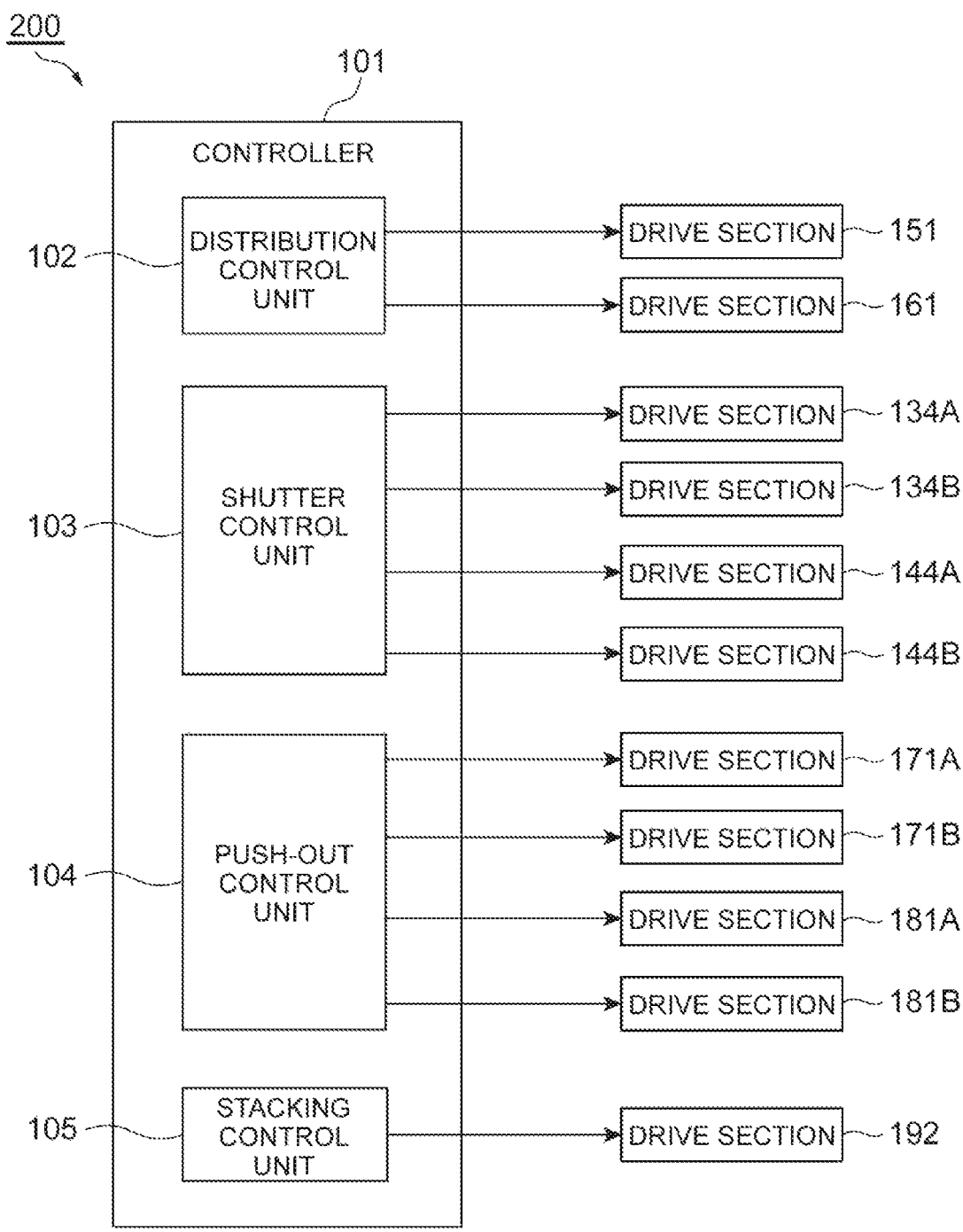
FIG. 30 is a configuration view of a control system of the electrode stacking device illustrated in FIG. 25.

FIG. 26 is a plan view of the electrode stacking device 100. FIG. 27 is a cross-sectional view taken along line A-A in FIG. 25. FIG. 28 is a cross-sectional view taken along line B-B in FIG. 25. FIG. 29 is a cross-sectional view taken along line C-C in FIG. 25. FIG. 30 is a view illustrating a configuration of a control system of the electrode stacking device 100.

The electrode stacking device 100 includes a positive electrode supply conveyor 110 (conveying device), a negative electrode supply conveyor 120 (conveying device), a positive electrode reception section 130, a negative electrode reception section 140, rotary plates 150 and 160 (electrode distribution sections), push members 170 and 180 (push-out sections), and a stacking unit 190. In addition, as in the electrode stacking device 20 according to the first embodiment, the electrode stacking device 100 includes a drive section that operates respective mechanisms provided in the electrode stacking device 20 and a controller 101 (control unit) that controls the drive section.

The positive electrode supply conveyor 110 horizontally conveys the separator-equipped positive electrode 11 toward the positive electrode reception section 130, and supplies the separator-equipped positive electrode 11 to the positive electrode reception section 130 (support section 132 to be described later) through the rotary plate 150. The negative electrode supply conveyor 120 horizontally conveys the negative electrode 9 toward the negative electrode reception section 140, and supplies the negative electrode 9 to the negative electrode reception section 140 (support section 142 to be described later) through the rotary plate 160.

The positive electrode reception section 130 includes a wall portion 131 that extends in the vertical direction, a plurality of support sections 132 (electrode support sections) provided in the wall portion 131, and a shutter 133.

Each of the support sections 132 is a member that stops the separator-equipped positive electrode 11 supplied from the positive electrode supply conveyor 110 at once and supports the separator-equipped positive electrode 11, and is provided to be erected from an outer wall surface 131*a* of the wall portion 131. As illustrated in FIG. 25 and FIG. 27, in this embodiment, as an example, four support sections 132A are disposed at an upper portion of the wall portion 131 at regular intervals in the vertical direction. Similarly, four support sections 132B are disposed at a lower portion of the wall portion 131 at regular intervals in the vertical direction.

The support section 132 includes a plate-shaped base 132*a* on which the separator-equipped positive electrode 11 is placed, and a side wall 132*b* that is provided to be erected from an edge portion on a front side (a front side of a paper surface in FIG. 25) of the base 132*a* and performs positioning of the bottom edge 11*c* of the separator-equipped positive electrode 11. As illustrated in FIG. 27, the support section 132 is supported to the wall portion 131 in an inclined state in which the front side of the base 132*a* is lowered than a rear side thereof. According to this configuration, the separator-equipped positive electrode 11 supplied to the support section 132 comes into contact with an inner wall surface of the side wall 132*b* on the base 132*a*, and positioning thereof is performed. Here, as illustrated in FIG. 26, in a plan view, a front end of the support section 132 is disposed on a further front side in comparison to a front end of the rotary plate 150. The reason for this is as follows. That is, it is necessary for the push member 170 to be described later and the rotary plate 150 to be described later to be disposed in a manner of not overlapping each other so as to prevent interference between the push member 170 and the rotary plate 150 that performs a rotary operation. In this arrangement, a front end of the support section 132 is disposed on a further front side in comparison to the front end of the rotary plate 150 so as to push out the separator-equipped positive electrode 11 supported on the support section 132 by the push member 170. Furthermore, even though a position of the support section 132 in a front and rear direction deviates from a position of the rotary plate 150, as described above, the front side of the base 132*a* of the support section 132 is inclined to be lower than the rear side, and thus positioning of the separator-equipped positive electrode 11 in the front and rear direction is appropriately performed. That is, the separator-equipped positive electrode 11 conveyed from the rotary plate 150 onto the base 132*a* of the support section 132 slides on the base 132*a* toward the side wall 132*b* due to the gravity, and thus the bottom edge 11*c* of the separator-equipped positive electrode 11 comes into contact with the side wall 132*b*.

The wall portion 131 is provided with a plurality of slits 131*b* through which the separator-equipped positive electrode 11 passes (here, a total of eight slits including four upper slits and four lower slits). The four upper slits 131*b* and the four lower slits 131*b* are disposed at regular intervals on an upper side and the lower side, respectively. The respective slits 131*b* are provided in correspondence with the respective support sections 132. In this embodiment, as an example, as illustrated in FIG. 25, a bottom surface of each of the slits 131*b* is set to be flush with an upper surface of the base 132*a* of the support section 132 corresponding to the slit 131*b*. According to this, the separator-equipped positive electrode 11 placed on the base 132*a* can smoothly pass through the slit 131*b* when being pushed out by the push member 170 to be described later.

The shutter 133 opens or closes an inlet (inlet on the outer wall surface 131*a* side) of the slit 131*b* that is provided in the wall portion 131. In this embodiment, as an example, the positive electrode reception section 130 includes a shutter 133A that opens or closes inlets of the four upper slits 131*b*, and a shutter 133B that opens or closes inlets of the four lower slits 131*b*. As illustrated in FIG. 27, in this embodiment, as an example, each of the shutters 133 is provided in a comb-like shape so as to open or close the inlets of the four slits 131*b* which are arranged in a vertical direction at regular intervals. The shutter 133 is formed to be slidable in the vertical direction with respect to the outer wall surface 131*a*. The shutters 133A and 133B can be slidably moved in the vertical direction by the drive sections 134A and 134B, respectively. In a state illustrated in FIG. 27, each of the shutters 133A and 133B closes the inlets of the four slits 131*b* at the lowest position in a vertically movable range. From this state, when the shutters 133A and 133B are moved to an upward side by the drive sections 134A and 134B, it enters a state in which the inlets of the slits 131*b* are opened.

In a state in which the inlets of the slits 131*b* are closed, each of the shutters 133 also has a function of stopping the separator-equipped positive electrode 11 that is supplied from the positive electrode supply conveyor 110 to the support section 132 through the rotary plate 150.

Specifically, when the separator-equipped positive electrode 11 is supplied to the support section 132, if the inlets of the slits 131*b* are closed by the shutter 133, the separator-equipped positive electrode 11 collides with the shutter 133 and is stopped. Here, for example, the shutter 133 is formed from a flexible material such as a sponge. In this manner, when the shutter 133 is formed from the flexible material, it is possible to mitigate impact when the separator-equipped positive electrode 11 collides with the shutter 133. That is, the shutter 133 functions as an impact mitigation section that mitigates impact to the separator-equipped positive electrode 11 when the support section 132 receives the separator-equipped positive electrode 11.

The negative electrode reception section 140 is disposed to face the positive electrode reception section 130 with the stacking unit 190 interposed therebetween. The negative electrode reception section 140 includes a wall portion 141 that extends in the vertical direction, a plurality of support sections 142 (electrode support sections) which are provided on the wall portion 141, and a shutter 143.

Each of the support section 142 is a member that stops the negative electrode 9 supplied from the negative electrode supply conveyor 120 at once and supports the negative electrode 9, and is provided to be erected from an outer wall surface 141a of the wall portion 111. As illustrated in FIG. 25 and FIG. 28, in this embodiment, as an example, four support sections 142A are disposed at an upper portion of the wall portion 141 at regular intervals in the vertical direction. Similarly, four support sections 142B are disposed at a lower portion of the wall portion 141 at regular intervals in the vertical direction. In this embodiment, as an example, height positions of the four support sections 142A and the four support sections 142B are set to be the same as height positions of the four support sections 132A and the four support sections 132B.

The support section 142 includes a plate-shaped base 142a on which the negative electrode 9 is placed, and a side wall 142b that is provided to be erected from an edge portion on a front side (the front side of the paper surface in FIG. 25) of the base 142a and performs positioning of the bottom edge 9c of the negative electrode 9. As illustrated in FIG. 28, the support section 142 is supported to the wall portion 141 in an inclined state in which the front side of the base 142a is lowered than a rear side thereof. According to this configuration, the negative electrode 9 supplied to the support section 142 comes into contact with an inner wall surface of the side wall 142b on the base 142a, and positioning thereof is performed. Here, as illustrated in FIG. 26, in a plan view, a front end of the support section 142 is disposed on a further front side in comparison to a front end of the rotary plate 160. The reason for this is as follows. That is, it is necessary for the push member 180 to be described later and the rotary plate 160 to be described later to be disposed in a state of not overlapping each other in a plan view so as to prevent interference between the push member 180 and the rotary plate 160 that performs a rotary operation. In this arrangement, a front end of the support section 142 is disposed on a further front side in comparison to the front end of the rotary plate 160 so as to push out the negative electrode 9 supported on the support section 142 by the push member 180. Furthermore, even though a position of the support section 142 in a front and rear direction deviates from a position of the rotary plate 160, as described above, the front side of the base 142a of the support section 142 is inclined to be lower than the rear side, and thus positioning of the negative electrode 9 in the front and rear direction is appropriately performed. That is, the negative electrode 9 conveyed from the rotary plate 160 onto the base 142a of the support section 142 slides on the base 142a toward the side wall 142b due to the gravity, and thus the bottom edge 9c of the negative electrode 9 comes into contact with the side wall 142b.

The wall portion 141 is provided with a plurality of slits 141b through which the negative electrode 9 passes (here, a total of eight slits including four upper slits and four lower slits). The four upper slits 141b and the four lower slits 141b are disposed at regular intervals on an upper side and the lower side, respectively. The respective slits 141b are provided in correspondence with the respective support sections 142. In this embodiment, as an example, as illustrated in FIG. 25, a bottom surface of each of the slits 141b is set to be flush with an upper surface of the base 142a of the support section 142 corresponding to the slit 141b. According to this, the negative electrode 9 placed on the base 142a can smoothly pass through the slit 141b when being pushed out by the push member 180 to be described later.

The shutter 143 opens or closes an inlet (inlet on the outer wall surface 141a side) of the slit 141b that is provided in the wall portion 141. In this embodiment, as an example, the negative electrode reception section 140 includes a shutter 143A that opens or closes inlets of the four upper slits 141b, and a shutter 143B that opens or closes inlets of the four lower slits 141b. As illustrated in FIG. 28, in this embodiment, as an example, each of the shutters 143 is provided in a comb-like shape so as to open or close the inlets of the four slits 141b which are arranged in a vertical direction at regular intervals. The shutter 143 is formed to be slidable in the vertical direction with respect to the outer wall surface 141a. The shutters 143A and 143B can be slidably moved in the vertical direction by the drive sections 144A and 144B, respectively. In a state illustrated in FIG. 28, the lower shutters 143B close the inlets of the four slits 141b at the lowest position in a vertically movable range. On the other hand, the upper shutters 143A open the inlets of the four slits 141b at the highest position in the vertically movable range.

In a state in which the inlets of the slits 141b are closed, each of the shutters 143 also has a function of stopping the negative electrode 9 that is supplied from the negative electrode supply conveyor 120 to the support section 142 through the rotary plate 160. Specifically, when the negative electrode 9 is supplied to the support section 142, if the inlets of the slits 141b are closed by the shutter 143, the negative electrode 9 collides with the shutter 143 and is stopped. Here, for example, the shutter 143 is formed from a flexible material such as a sponge. In this manner, when the shutter 143 is formed from the flexible material, it is possible to mitigate impact when the negative electrode 9 collides with the shutter 143. That is, the shutter 143 functions as an impact mitigation section that mitigates impact to the negative electrode 9 when the support section 142 receives the negative electrode 9.

The rotary plate 150 is disposed between the positive electrode supply conveyor 110 and the positive electrode reception section 130, and distributes the separator-equipped positive electrodes 11, which are sequentially supplied from the positive electrode supply conveyor 110, to each of the plurality of support sections 132. As illustrated in FIG. 25, the rotary plate 150 is provided in a rotatable manner in a state in which an end on an upstream side (on the positive electrode supply conveyor 110 side) in a conveying direction of the separator-equipped positive electrode 11 is set as a rotation axis. The rotary plate 150 is rotated by a drive section 151. In this embodiment, as an example, an inclination angle of the rotary plate 150 is set to any one of eight steps of inclination angles which are set in advance as an inclination angle capable of supplying the separator-equipped positive electrode 11 to each of eight support sections 132. When the inclination angle of the rotary plate 150 is changed by the drive section 151, the separator-equipped positive electrode 11 is supplied to the support section 132 corresponding to the inclination angle. Furthermore, in this embodiment, as an example, each of the four lower support sections 132B is provided with a slope member 155 that guides the separator-equipped positive electrode 11 ejected from the rotary plate 150 to each of the support sections 132B.

As illustrated in FIG. 26, the rotary plate 150 includes a plate-shaped base 150a on which the separator-equipped positive electrode 11 is placed, and a side wall 150b that is provided to be erected along an edge of the base 150a on a front side to perform positioning of the bottom edge 11c of the separator-equipped positive electrode 11. As in the support section 132, the rotary plate 150 may be inclined in such a manner that the front side of the base 150a is lowered than a rear side thereof. According to this configuration, the separator-equipped positive electrode 11 that is supplied to the rotary plate 150 comes into contact with an inner wall surface of the side wall 150b on the base 150a, and positioning thereof is performed.

The rotary plate 160 is disposed between the negative electrode supply conveyor 120 and the negative electrode reception section 140, and distributes the negative electrodes 9, which are sequentially supplied from the negative electrode supply conveyor 120, to each of the plurality of support sections 142. As illustrated in FIG. 25, the rotary plate 160 is provided in a rotatable manner in a state in which an end on an upstream side (on the negative electrode supply conveyor 120 side) in a conveying direction of the negative electrode 9 is set as a rotation axis. The rotary plate 160 is rotated by a drive section 161. In this embodiment, as an example, an inclination angle of the rotary plate 160 is set to any one of eight steps of inclination angles which are set in advance as an inclination angle capable of supplying the negative electrode 9 to each of eight support sections 142. When the inclination angle of the rotary plate 160 is changed by the drive section 161, the negative electrode 9 is supplied to the support section 142 corresponding to the inclination angle. Furthermore, in this embodiment, as an example, each of the four lower support sections 142B is provided with a slope member 165 that guides the negative electrode 9 ejected from the rotary plate 160 to each of the support sections 142B.

As illustrated in FIG. 26, the rotary plate 160 includes a plate-shaped base 160a on which the negative electrode 9 is placed, and a side wall 160b that is provided to be erected along an edge of the base 160a on a front side to perform positioning of the bottom edge 9c of the negative electrode 9. As in the support section 142, the rotary plate 160 may be inclined in such a manner that the front side of the base 160a is lowered than a rear side thereof. According to this configuration, the negative electrode 9 that is supplied to the rotary plate 160 comes into contact with an inner wall surface of the side wall 160b on the base 160a, and positioning thereof is performed.

The push member 170 ejects each of a plurality of the separator-equipped positive electrodes 11 which are respectively supported on the plurality of support sections 132 to the stacking unit 190 through the slit 131b. As illustrated in FIG. 25, in this embodiment, as an example, a plurality of (here, eight) the push members 170 are provided in correspondence with the plurality of support sections 132. Each of the push members 170 is provided at the same height position as that of a corresponding slit 131b.

In addition, in the push members 170, a portion that comes into contact with the separator-equipped positive electrode 11 and pushes out the separator-equipped positive electrode 11 has dimensions capable of passing through each of the slits 131b. According to this, each of the push members 170 can pass through the slit 131b and can push out the separator-equipped positive electrode 11 to a predetermined stacking position in the stacking section 191 to be described later. As a result, it is possible to appropriately perform positioning of the separator-equipped positive electrode 11, which is stacked on the stacking section 191, in a right and left direction (right and left direction when viewed from the front side of the paper surface in FIG. 25). That is, it is possible to perform positioning of the separator-equipped positive electrode 11, which is stacked on the stacking section 191, on the right and left direction through only a push-out operation by the push member 170 instead of performing positioning, for example, by allowing the separator-equipped positive electrode 11 to collide with the wall portion 141 and the like. According to this, it is possible to suppress impact with respect to the separator-equipped positive electrode 11 in stacking, and it is possible to suppress peeling-off of the positive electrode active material layer 15 of the separator-equipped positive electrode 11. For example, the push members 170 are provided in such a manner capable of performing piston movement in the right and left direction by the drive section 171 including a motor, a link mechanism, a cylinder, or the like as an example.

Here, the push members 170 may independently operate. In addition, for example, a common drive section 171A may be used with respect to four push members 170A which are provided in correspondence with the four upper support sections 132A, and push-out operations of the four upper push members 170A may be simultaneously performed. Similarly, a common drive section 171B may be used with respect to four push members 170B which are provided in correspondence with the four lower support sections 132B, and push-out operations of the four lower push members 170B may be simultaneously performed. In this manner, the drive mechanism of the push members 170, which eject the separator-equipped positive electrodes 11 which are respectively placed on the plurality of (here, four) support sections 132, is made to be common, and thus it is possible to simplify a mechanism that ejects the separator-equipped positive electrodes 11 and it is possible to simplify the configuration of the electrode stacking device 100.

The push member 180 ejects each of the plurality of negative electrodes 9 which are respectively supported on the plurality of support sections 142 to the stacking unit 190 through the slit 141b. As illustrated in FIG. 25 and FIG. 28, in this embodiment, as an example, a plurality of (here, eight) the push members 180 are provided in correspondence with the plurality of support sections 142. Each of the push members 180 is provided at the same height position as that of a corresponding slit 141b.

In addition, in the push members 180, a portion that comes into contact with the negative electrode 9 and pushes out the negative electrode 9 has dimensions capable of passing through each of the slits 141b. According to this, each of the push members 180 can pass through the slit 141b and can push out the negative electrode 9 to a predetermined stacking position in the stacking section 191 to be described later. As a result, it is possible to appropriately perform positioning of the negative electrode 9, which is stacked on the stacking section 191, in a right and left direction. That is, it is possible to perform positioning of the negative electrode 9, which is stacked on the stacking section 191, on the right and left direction through only a push-out operation by the push member 180 instead of performing positioning, for example, by allowing the negative electrode 9 to collide with the wall portion 131 and the like. According to this, it is possible to suppress impact with respect to the negative electrode 9 in stacking, and it is possible to suppress peeling-off of the negative electrode active material layer 17 of the negative electrode 9. For example, the push members 180 are provided in such a manner capable of performing piston movement in the right and left direction by the drive section 181 including a motor, a link mechanism, a cylinder, or the like as an example.

Here, the push members 180 may independently operate. In addition, for example, a common drive section 181A may be used with respect to four push members 180A which are provided in correspondence with the four upper support sections 142A, and push-out operations of the four upper push members 180A may be simultaneously performed. Similarly, a common drive section 181B may be used with respect to four push members 180B which are provided in correspondence with the four lower support sections 142B, and push-out operations of the four lower push members 180B may be simultaneously performed. In this manner, the drive mechanism of the push members 180, which eject the negative electrodes 9 which are respectively placed on the plurality of (here, four) support sections 142, is made to be common, and thus it is possible to simplify a mechanism that ejects the negative electrodes 9 and it is possible to simplify the configuration of the electrode stacking device 100.

The stacking unit 190 is disposed between the wall portion 131 of the positive electrode reception section 130 and the wall portion 141 of the negative electrode reception section 140. The stacking unit 190 includes a plurality of (here, eight) stacking sections 191 configured to stack the separator-equipped positive electrode 11 that is supplied through each of the slits 131b provided in the wall portion 131, and the negative electrode 9 that is supplied through each of the slits 141b provided in the wall portion 141. In addition, the stacking unit 190 includes a drive section 192 that changes height positions of the stacking sections 191. Furthermore, in this embodiment, a detailed configuration of the stacking unit 190 is not illustrated. For example, as in the stacking unit 25 according to the first embodiment, the stacking unit 190 may have a configuration in which the plurality of stacking sections 191 are formed on the outer peripheral surface of the loop-shaped circulation member that extends in the vertical direction. According to this configuration, the plurality of stacking sections 191 can move in the vertical direction by an operation of the circulation member. In addition, the stacking unit 190 may have a configuration in which the heights of the stacking sections 191 can be independently set. In a case where the stacking unit 190 has this configuration, for example, timing at which the height positions of the four upper stacking sections 191 are changed, and timing at which the height positions of the four lower stacking sections 191 are changed can be set to be different from each other. According to this, it is possible to execute a lowering operation of the stacking sections 191 to be described later at an appropriate timing with respect to the upper stacking sections 191 and the lower stacking sections 191.

As illustrated in FIG. 26 and FIG. 29, each of the stacking sections 191 includes a plate-shaped base 191a on which the separator-equipped positive electrode 11 and the negative electrode 9 are alternately stacked, and a side wall 191b that is provided to be erected along a front edge of the base 191a and performs positioning of the bottom edge 11c of the separator-equipped positive electrode 11 and the bottom edge 9c of the negative electrode 9. The stacking section 191 may be inclined in such a manner that a front side of the base 191a is lower than a rear side. According to this configuration, the separator-equipped positive electrode 11 and the negative electrode 9 which are supplied to the stacking section 191 come into contact with an inner wall surface of the side wall 191b on the base 191a, and positioning thereof is performed.

In an initial state (a state in which one sheet of an electrode is not stacked yet), the height position of the stacking section 191 is set to a position at which an upper surface of the base 191a is flush with an upper surface of the slit 131b and an upper surface of the slit 141b (or, a position that is slightly lower than the height positions). According to this, when being pushed out by the push member 170, the separator-equipped positive electrode 11 placed on the base 132a of the support section 132 can smoothly move from the base 132a onto the base 191a of the stacking section 191 through the slit 131b. Similarly, when being pushed out by the push member 180, the negative electrode 9 placed on the base 142a of the support section 142 can smoothly move from the base 142a onto the base 191a of the stacking section 191 through the slit 141b.

When an electrode (the separator-equipped positive electrode 11 or the negative electrode 9) is stacked on the stacking section 191, the stacking section 191 is lowered by a distance corresponding to one sheet of electrode through a control of the controller 101 to the drive section 192. According to this operation, it is possible to constantly maintain a relative height position of an upper surface of an electrode stacked body formed on the base 191a of the stacking section 191 with respect to the upper surface of the slit 131b and the upper surface of the slit 141b. According to this, it is possible to make stacking conditions (the drop distance and the like) of the separator-equipped positive electrode 11 and the negative electrode 9 uniform regardless of the number of sheets of the separator-equipped positive electrodes 11 and the negative electrodes 9 which are stacked. As a result, it is possible to stabilize a stacking operation of the separator-equipped positive electrode 11 and the negative electrode 9.

The controller 101 of the electrode stacking device 100 includes a CPU, a RAM, a ROM, an input/output interface, and the like. As illustrated in FIG. 30, the controller 101 includes a distribution control unit 102 that controls the drive sections 151 and 161 which respectively rotate the rotary plates 150 and 160, a shutter control unit 103 that controls the drive sections 134A, 134B, 144A, and 144b which respectively slide the shutter 133A, 133B, 143A, and 143B, a push-out control unit 104 that control the drive sections 171A, 171B, 181A, and 181B which respectively executes push-out operations of the push members 170A, 170B, 180A, and 180B, and a stacking control unit 105 that controls the drive section 192 that changes the height position of the stacking section 191. Hereinafter, description will be given of an example of the stacking operation of the electrode stacking device 100 which is realized by the control of the controller 101.

First, description will be given of an operation until the separator-equipped positive electrodes 11 which are sequentially supplied from the positive electrode supply conveyor 110 are stacked on the individual stacking sections 191. Here, each of the separator-equipped positive electrodes 11 is continuously supplied from the positive electrode supply conveyor 110 at a predetermined time interval. The controller 101 controls the drive section 151 to change the inclination angle of the rotary plate 150 whenever one sheet of the separator-equipped positive electrode 11 is supplied from the positive electrode supply conveyor 110 toward the rotary plate 150. The following operation is realized by this control. That is, in a case where the inclination angle of the rotary plate 150 is in a state illustrated in FIG. 25, the separator-equipped positive electrode 11 is supplied to the uppermost support section 132. Then, the controller 101 controls the drive section 151 to downwardly incline the rotary plate 150 in the conveying direction of the separator-equipped positive electrode 11 (right direction when viewed from the front side of the paper surface in FIG. 25) by one stage, and thus the separator-equipped positive electrode 11 that is subsequently supplied is supplied to a second support section 132 from an upper side. In this manner, when the inclination angle of the rotary plate 150 is sequentially changed, the separator-equipped positive electrodes 11 are sequentially distributed to the eight support sections 132 (distribution process).

When the separator-equipped positive electrode 11 is supplied to any one of the four upper support sections 132A, the controller 101 controls the drive section 134A to lower the shutter 133A on an upper side. According to this, it enters a state in which the slit 131b of the wall portion 131 is closed. According to this, the separator-equipped positive electrode 11, which is supplied from the positive electrode supply conveyor 110 to the support section 132A through the rotary plate 150, collides with the shutter 133A and is stopped at once on the base 132a of the support section 132A. Similarly, when the separator-equipped positive electrode 11 is supplied to any one of the four lower support sections 132B, the controller 101 controls the drive section 134B to lower the shutter 133B on a lower side. According to this, it enters a state in which the slit 131b of the wall portion 131 is closed. According to this, the separator-equipped positive electrode 11, which is supplied from the positive electrode supply conveyor 110 to the support section 132B through the rotary plate 150, collides with the shutter 133B and is stopped at once on the base 132a of the support section 132B. As described above, since the shutters 133A and 133B are formed from a flexible material such as a sponge, impact to the separator-equipped positive electrode 11 is mitigated, and thus peeling-off of the positive electrode active material layer 15 of the separator-equipped positive electrode 11 is less likely to occur.

In the above-described distribution process, when supply of the separator-equipped positive electrode 11 to the four upper support sections 132A is completed, and supply of the separator-equipped positive electrode 11 to the four lower support sections 132B is initiated, the controller 101 controls an operation of the shutter 133A and the push member 170A so that the separator-equipped positive electrode 11 that is supported on each of the four upper support sections 132A is ejected to the stacking sections 191 corresponding to the support sections 132A (ejection process). Specifically, the controller 101 controls the drive section 134A to raise the shutter 133A on an upper side, and thus it enters a state in which the slit 131b of the wall portion 131 is opened. In addition, the controller 101 controls the drive section 171A to allow the four push members 170A provided in correspondence with the four upper support sections 132A to execute a push-out operation. According to this, each of the separator-equipped positive electrodes 11 supported on the support sections 132A is pushed out to each of the stacking sections 191 through the slit 131b. As a result, the separator-equipped positive electrode 11 is newly stacked on the base 191a of the stacking section 191 (alternatively, on a stacked body including electrodes which have been stacked). After the new electrode (in this case, the separator-equipped positive electrode 11) is stacked on the stacking section 191 in this manner, the controller 101 controls the drive section 192 to lower the stacking section 191 by a distance corresponding to one sheet of electrode.

Here, after supply of the separator-equipped positive electrode 11 to the four upper support sections 132A is completed and before supply of the separator-equipped positive electrode 11 to the four upper support sections 132A is initiated again, there is an interval corresponding to time taken to supply four sheets of the separator-equipped positive electrode 11 to the four lower support sections 132B. Accordingly, in the electrode stacking device 100, it is possible to execute a push-out operation of the push member 170A at an ejection speed that is slower than a speed (that is, the conveying speed of the positive electrode supply conveyor 110) of the separator-equipped positive electrode 11 when the separator-equipped positive electrode 11 is supplied from the positive electrode supply conveyor 110 to the support section 132A. Accordingly, it is possible to suppress impact to the separator-equipped positive electrode 11 when the push member 170A comes into contact with the separator-equipped positive electrode 11. In addition, it is possible to prevent occurrence of a situation in which the separator-equipped positive electrode 11 is vigorously pushed out by a high-speed push-out operation of the push member 170A to collide with the wall portion 141 and the like. As a result, it is possible to suppress peeling-off of the positive electrode active material layer 15 of the separator-equipped positive electrode 11. Furthermore, after the separator-equipped positive electrode 11 is supplied to the one support section 132 and before the separator-equipped positive electrode 11 is supplied again to the support section 132, there is an interval corresponding to time taken to supply seven sheets of the separator-equipped positive electrodes 11 to other support sections 132. Accordingly, in a configuration in which the push-out operations of the respective push members 170 are independently performed, it is possible to perform the push-out operations of the respective push members 170 at a lower speed.

In the above-described distribution process, when supply of the separator-equipped positive electrode 11 with respect to the four lower support sections 132B is completed, and supply of the separator-equipped positive electrode 11 with respect to the four upper support sections 132A is initiated, an operation of the above-described ejection process is executed with respect to the separator-equipped positive electrodes 11 which are supported on the four lower support sections 132B by the same control as the above-described control of the controller 101. That is, in this embodiment, the separator-equipped positive electrodes 11, which are supported on the four upper support sections 132A, are ejected to the stacking sections 191 when the separator-equipped positive electrodes 11 are being distributed to the four lower support sections 132B. On the other hand, the separator-equipped positive electrodes 11, which are supported on the four lower support sections 132B, are ejected to the stacking sections 191 when the separator-equipped positive electrodes 11 are being distributed to the four upper support sections 132A. In this manner, a cycle of the distribution process and the ejection process is alternatively executed between the upper portion and the lower portion of the positive electrode reception section 130.

Next, description will be given of an operation until the negative electrodes 9 which are sequentially supplied from the negative electrode supply conveyor 120 are stacked on the individual stacking sections 191. Here, each of the negative electrodes 9 is continuously supplied from the negative electrode supply conveyor 120 at a predetermined time interval. The controller 101 controls the drive section 161 to change the inclination angle of the rotary plate 160 whenever one sheet of the negative electrode 9 is supplied from the negative electrode supply conveyor 120 toward the rotary plate 160. The following operation is realized by this control. That is, in a case where the inclination angle of the rotary plate 160 is in a state illustrated in FIG. 25, the negative electrode 9 is supplied to the uppermost support section 142. Then, the controller 101 controls the drive section 161 to downwardly incline the rotary plate 160 in the conveying direction of the negative electrode 9 (left direction when viewed from the front side of the paper surface in FIG. 25) by one stage, and thus the negative electrode 9 that is subsequently supplied is supplied to a second support section 142 from an upper side. In this manner, when the inclination angle of the rotary plate 160 is sequentially changed, the negative electrodes 9 are sequentially distributed to the eight support sections 142 (distribution process).

When the negative electrode 9 is supplied to any one of the four upper support sections 142A, the controller 101 controls the drive section 144A to lower the shutter 143A on an upper side. According to this, it enters a state in which the slit 141b of the wall portion 141 is closed. According to this, the negative electrode 9, which is supplied from the negative electrode supply conveyor 120 to the support section 142A through the rotary plate 160, collides with the shutter 143A and is stopped at once on the base 142a of the support section 142A. Similarly, when the negative electrode 9 is supplied to any one of the four lower support sections 142B, the controller 101 controls the drive section 144B to lower the shutter 143B on a lower side. According to this, it enters a state in which the slit 141b of the wall portion 141 is closed. According to this, the negative electrode 9, which is supplied from the negative electrode supply conveyor 120 to the support section 142B through the rotary plate 160, collides with the shutter 143B and is stopped at once on the base 142a of the support section 142B. As described above, since the shutters 143A and 143B are formed from a flexible material such as a sponge, impact to the negative electrode 9 is mitigated, and thus peeling-off of the negative electrode active material layer 17 of the negative electrode 9 is less likely to occur.

In the above-described distribution process, when supply of the negative electrode 9 to the four upper support sections 142A is completed, and supply of the negative electrode 9 to the four lower support sections 142B is initiated, the controller 101 controls an operation of the shutter 143A and the push member 180A so that the negative electrodes 9 supported on the four upper support sections 142A is ejected to the stacking sections 191 corresponding to the support sections 142A (ejection process). Specifically, the controller 101 controls the drive section 144A to raise the shutter 143A on an upper side, and thus it enters a state in which the slit 141b of the wall portion 141 is opened. In addition, the controller 101 controls the drive section 181A to allow the four push members 180A provided in correspondence with the four upper support sections 142A to execute a push-out operation. According to this, each of the negative electrodes 9 supported on the support sections 142A is pushed out to each of the stacking sections 191 through the slit 141b. As a result, the negative electrode 9 is newly stacked on the base 191a of the stacking section 191 (alternatively, on a stacked body including electrodes which have been stacked). After the new electrode (in this case, the negative electrode 9) is stacked on the stacking section 191 in this manner, the controller 101 controls the drive section 192 to lower the stacking section 191 by a distance corresponding to one sheet of electrode.

Here, after supply of the negative electrode 9 to the four upper support sections 142A is completed and before supply of the negative electrode 9 to the four upper support sections 142A is initiated again, there is an interval corresponding to time taken to supply four sheets of the negative electrodes 9 to the four lower support sections 142B. Accordingly, in the electrode stacking device 100, it is possible to execute a push-out operation of the push member 180A at an ejection speed that is slower than a speed (that is, the conveying speed of the negative electrode supply conveyor 120) of the negative electrode 9 when the negative electrode 9 is supplied from the negative electrode supply conveyor 120 to the support section 142A. Accordingly, it is possible to suppress impact to the negative electrode 9 when the push member 180A comes into contact with the negative electrode 9. In addition, it is possible to prevent occurrence of a situation in which the negative electrode 9 is vigorously pushed out by a high-speed push-out operation of the push member 180A to collide with the wall portion 131 and the like. As a result, it is possible to suppress peeling-off of the negative electrode active material layer 17 of the negative electrode 9. Furthermore, after the negative electrode 9 is supplied to the one support section 142 and before the negative electrode 9 is supplied again to the support section 142, there is an interval corresponding to time taken to supply seven sheets of the negative electrodes 9 to other support sections 142. Accordingly, in a configuration in which the push-out operations of the respective push members 180 are independently performed, it is possible to perform the push-out operations of the respective push members 180 at a lower speed.

In the above-described distribution process, when supply of the negative electrode 9 with respect to the four lower support sections 142B is completed, and supply of the negative electrode 9 with respect to the four upper support sections 142A is initiated, an operation of the above-described ejection process is executed with respect to the negative electrodes 9 which are supported on the four lower support sections 142B by the same control as the above-described control of the controller 101. That is, in this embodiment, the negative electrodes 9, which are supported on the four upper support sections 142A, are ejected to the stacking sections 191 when the negative electrodes 9 are being distributed to the four lower support sections 142B. On the other hand, the negative electrodes 9, which are supported on the four lower support sections 142B, are ejected to the stacking sections 191 when the negative electrodes 9 are being distributed to the four upper support sections 142A. In this manner, a cycle of the distribution process and the ejection process is alternatively executed between the upper portion and the lower portion of the negative electrode reception section 140.

In addition, the controller 101 controls the operation of the rotary plates 150 and 160, the shutters 133 and 143, and the push members 170 and 180 so that the processes (the distribution process and the ejection process), which are executed with respect to the positive electrode reception section 130 and the negative electrode reception section 140, to be opposite to each other in a corresponding portion (the upper portion or the lower portion). Specifically, the controller 101 controls operations of respective mechanisms so that when the process (ejection process) of ejecting the separator-equipped positive electrodes 11 supported on the support sections 132A at the upper portion (or the lower portion) of the positive electrode reception section 130 to the stacking sections 191 is being executed, the process (distribution process) of supplying the negative electrodes 9 to the support sections 142A at the upper portion (or the lower portion) of the negative electrode reception section 140 with respect to the support sections 142A is executed. According to this control, the separator-equipped positive electrode 11 and the negative electrode 9 are alternatively stacked on the stacking sections 191.

The above-described electrode stacking device 100 is a device that stacks electrodes (the separator-equipped positive electrode 11 and the negative electrode 9) which are supplied by the conveying devices (the positive electrode supply conveyor 110 and the negative electrode supply conveyor 120) and forms an electrode stacked body. The electrode stacking device 100 includes the plurality of support sections 132 which support the separator-equipped positive electrodes 11, the plurality of support sections 142 which support the negative electrodes 9, the rotary plate 150 that distributes the separator-equipped positive electrodes 11 supplied by the positive electrode supply conveyor 110 to the plurality of support sections 132, the rotary plate 160 that distributes the negative electrodes 9 supplied by the negative electrode supply conveyor 120 to the plurality of support sections 142, the stacking unit 190 that is disposed on a lateral side of the plurality of support sections 132 and 142 and include the plurality of stages of stacking sections 191 on which electrode are stacked, the push member 170 that pushes out the separator-equipped positive electrodes 11 that are supported on the plurality of support sections 132 toward the plurality of stages of stacking sections 191, the push member 180 that pushes the negative electrodes 9 that are supported on the plurality of support sections 142 toward the plurality of stages of stacking sections 191, and the controller 101 that controls the operation of the rotary plates 150 and 160, and the push members 170 and 180. The controller 101 controls the operation of the push member 170 to push out the separator-equipped positive electrode 11 toward each of the stacking sections 191 at a speed that is slower than the conveying speed of the separator-equipped positive electrode 11 by the positive electrode supply conveyor 110. In addition, the controller 101 controls the operation of the push member 180 to push out the negative electrode 9 toward each of the stacking sections 191 at a speed that is slower than the conveying speed of the negative electrode 9 by the negative electrode supply conveyor 120.

In the electrode stacking device 100, a plurality of electrodes (the separator-equipped positive electrodes 11 or the negative electrodes 9) are distributed to the plurality of support sections 132 or 142. In this manner, the electrodes which are distributed to the plurality of support sections 132 or 142, are pushed out and stacked, and thus an ejection speed when pushing out the electrodes to the stacking sections 191 can be set to be slower than the conveying speed (supply speed) of the electrodes by the conveying device (the positive electrode supply conveyor 110 or the negative electrode supply conveyor 120). According to this, it is possible to suppress a positional deviation of the electrodes when stacking the electrodes while preventing an electrode stacking speed from being lowered. As a result, according to the electrode stacking device 100, it is possible to accomplish speeding-up of the stacking speed while suppressing an increase in size of the device.

In addition, the separator-equipped positive electrodes 11 which are sequentially supplied to the positive electrode reception section 130 are respectively distributed to the plurality of support sections 132 and are ejected to the stacking sections 191 different from each other to be stacked. In this manner, when the separator-equipped positive electrodes 11, which are supplied, are stacked after being distributed to the plurality of support sections 132, it is possible to lower the ejection speed (that is, the supply speed of the separator-equipped positive electrodes 11 to the stacking sections 191) of the separator-equipped positive electrodes 11 when ejecting the separator-equipped positive electrodes 11 which are respectively supported on the support sections 132 in comparison to the supply speed (in this embodiment, the conveying speed of the positive electrode supply conveyor 110) of the separator-equipped positive electrodes 11 which are sequentially supplied to the positive electrode reception section 130. In this manner, when the supply speed of the separator-equipped positive electrodes 11 to the stacking sections 191 is lowered, it is possible to suppress peeling-off of the positive electrode active material layer 15 of the separator-equipped positive electrodes 11 when stacking the separator-equipped positive electrodes 11 on the stacking sections 191.

Similarly, in the electrode stacking device 100, the negative electrodes 9 which are sequentially supplied to the negative electrode reception section 140 are respectively distributed to the plurality of support sections 142 and are ejected to the stacking sections 191 different from each other to be stacked. In this manner, when the negative electrodes 9, which are supplied, are stacked after being distributed to the plurality of support sections 142, it is possible to lower the ejection speed (that is, the supply speed of the negative electrodes 9 to the stacking sections 191) of the negative electrode 9 when ejecting the negative electrodes 9 which are respectively supported on the support sections 142 in comparison to the supply speed (in this embodiment, the conveying speed of the negative electrode supply conveyor 120) of the negative electrodes 9 which are sequentially supplied to the negative electrode reception section 140. In this manner, when the supply speed of the negative electrodes 9 to the stacking sections 191 is lowered, it is possible to suppress peeling-off of the negative electrode active material layer 17 of the negative electrodes 9 when stacking the negative electrodes 9 on the stacking sections 191.

In addition, the positive electrode reception section 130 includes the shutter 133 as an impact mitigation section that mitigates impact to each of the separator-equipped positive electrodes 11 when the positive electrode reception section 130 receives the separator-equipped positive electrode 11. According to this, even when supplying the separator-equipped positive electrode 11 to the positive electrode reception section 130, it is possible to suppress peeling-off of the positive electrode active material layer 15 of the separator-equipped positive electrode 11. That is, even when the supply speed of the separator-equipped positive electrode 11 to the positive electrode reception section 130 is raised, impact to the separator-equipped positive electrode 11 when each of the support sections 132 receives the separator-equipped positive electrode 11 is mitigated by the shutter 133, and thus it is possible to suppress peeling-off of the positive electrode active material layer 15 of the separator-equipped positive electrode 11.

Similarly, the negative electrode reception section 140 includes the shutter 143 as an impact mitigation section that mitigates impact to each of the negative electrodes 9 when the negative electrode reception section 140 receives the negative electrode 9. According to this, even when supplying the negative electrode 9 to the negative electrode reception section 140, it is possible to suppress peeling-off of the negative electrode active material layer 17 of the negative electrode 9. That is, even when the supply speed of the negative electrode 9 to the negative electrode reception section 140 is raised, impact to the negative electrode 9 when each of the support sections 142 receives the negative electrode 9 is mitigated by the shutter 143, and thus it is possible to suppress peeling-off of the negative electrode active material layer 17 of the negative electrode 9.

In addition, an electrode stacking method, which is realized by the controller 101, includes the distribution process of distributing an electrode (the separator-equipped positive electrode 11 or the negative electrode 9) that is sequentially supplied to each of the plurality of support sections 132 or 142. In addition, the electrode stacking method includes the ejection process of ejecting each of the plurality of electrodes which are respectively supported on the plurality of support sections 132 or 142 to each of the plurality of stages of stacking sections 191 at an ejection speed (that is, a push-out operation speed of the push member 170 or 180) slower than the supply speed (in this embodiment, a conveying speed of the positive electrode supply conveyor 110 and the negative electrode supply conveyor 120) of the electrodes to the support sections 132 or 142 in the distribution process. In this electrode stacking method, the electrodes which are sequentially supplied are distributed to each of the plurality of support sections 132 or 142, and are ejected to the stacking sections 191 different from each other and are stacked thereon. In this manner, electrodes which are supplied are distributed to the plurality of support sections 132 or 142 and are stacked, and thus it is possible to lower the ejection speed (that is, an electrode supply speed to the stacking sections 191) of the electrodes when ejecting the electrodes supported on the support sections 132 or 142 than a supply speed of an electrode that is sequentially supplied to the support section 132 or 142. In this manner, when the electrode supply speed to the stacking sections 191 is lowered, it is possible to suppress peeling-off of the active material (the positive electrode active material layer 15 or the negative electrode active material layer 17) of the electrodes when stacking the electrodes on the stacking sections 191.

Furthermore, in the electrode stacking device 100, instead of a configuration in which the separator-equipped positive electrode 11 is supplied by the positive electrode supply conveyor 110, it is also possible to employ a configuration in which the separator-equipped positive electrode 11 is continuously supplied to the rotary plate 150 at a predetermined time interval from a magazine in which a plurality of the separator-equipped positive electrodes 11 are stacked and accommodated in advance. Similarly, instead of a configuration in which the negative electrode 9 is supplied by the negative electrode supply conveyor 120, it is also possible to employ a configuration in which the negative electrode 9 is continuously supplied to the rotary plate 160 at a predetermined time interval from a magazine in which a plurality of the negative electrodes 9 are stacked and accommodated in advance.

Fifth Embodiment

Figure 31:
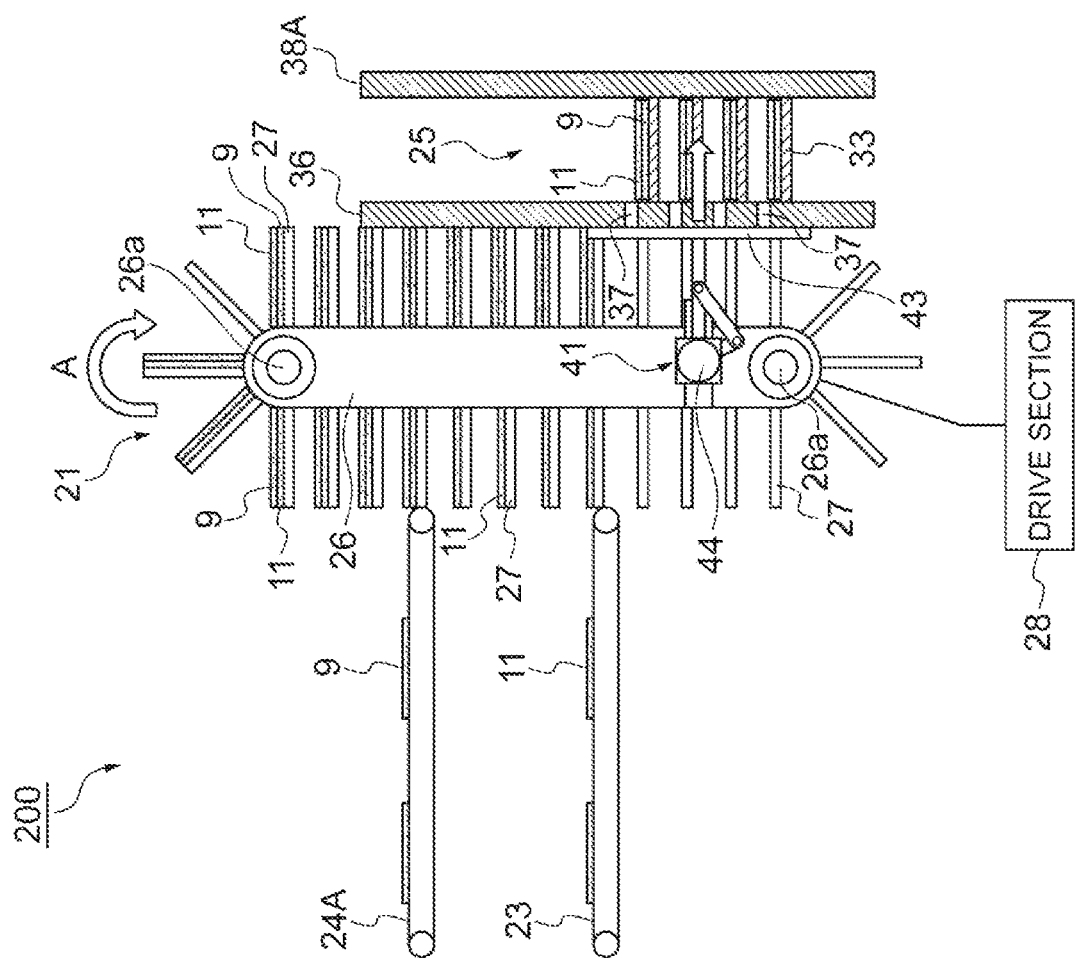
FIG. 31 is a side view (including a partial cross-section) illustrating an electrode stacking device according to a fifth embodiment.

Description will be given of an electrode stacking device 200 according to a fifth embodiment with reference to FIG. 31. FIG. 31 is a side view (including a partial cross-section) illustrating the electrode stacking device 200. The electrode stacking device 200 is different from the electrode stacking device 20 according to the first embodiment as follows. That is, the electrode stacking device 200 employs a configuration in which the positive electrode conveying unit 21 conveys the separator-equipped positive electrode 11 and the negative electrode 9, and the negative electrode conveying unit 22 is omitted. In addition, the electrode stacking device 200 includes a negative electrode supply conveyor 24A that supplies the negative electrode 9 to the positive electrode conveying unit 21 instead of the negative electrode supply conveyor 24. In addition, the electrode stacking device 200 includes a wall portion 38A in which the slit 39 is not formed instead of the wall portion 38. The other configurations of the electrode stacking device 200 are the same as in the electrode stacking device 20. In the electrode stacking device 200, the circulation member 26 functions as a distribution section that distributes the separator-equipped positive electrode 11 supplied by the positive electrode supply conveyor 23 and the negative electrode 9 supplied by the negative electrode supply conveyor 24A to each of the plurality of support sections 27.

The negative electrode supply conveyor 24A is disposed on an upward side of the positive electrode supply conveyor 23. That is, the negative electrode supply conveyor 24A is disposed downstream of the supply position at which the separator-equipped positive electrode 11 is supplied by the positive electrode supply conveyor 23 in the circulation route that is formed by circulation of the circulation member 26. According to this arrangement, the negative electrode supply conveyor 24A supplies the negative electrode 9 to the support section 27 that supports the separator-equipped positive electrode 11 supplied from the positive electrode supply conveyor 23. Specifically, the negative electrode supply conveyor 24A supplies the negative electrode 9 to be superimposed on the separator-equipped positive electrode 11 that is supported on the support section 27.

As described above, in the electrode stacking device 200, a pair (hereinafter, referred to as "electrode pair") of one sheet of the separator-equipped positive electrode 11 and one sheet of the negative electrode 9 are conveyed in a state of being supported by each of the support sections 27. In this configuration, the controller 60 (refer to FIG. 7) controls the drive section 28 so that four electrode pairs conveyed by the positive electrode conveying unit 21 are held at height positions corresponding to four vertical stages of the stacking sections 33. According to this, it is possible to stack the four electrode pairs on the four stage of stacking sections 33. Specifically, when the four electrode pairs are simultaneously pushed out toward the four stages of stacking sections 33 by the push-out unit 42, the four electrode pairs can be simultaneously stacked on the four stages of stacking sections 33.

The above-described electrode stacking device 200 is a device that stacks electrodes (the separator-equipped positive electrode 11 and the negative electrode 9) which are supplied by the positive electrode supply conveyor 23 (conveying device) and the negative electrode supply conveyor 24A (conveying device) to form an electrode stacked body. The electrode stacking device 200 includes the support sections 27 (electrode support sections), the circulation member 26, the stacking unit 25, the push-out unit 41, and the controller 60 (control unit). The support section 27 receives the separator-equipped positive electrode 11 and the negative electrode 9 which are supplied by the positive electrode supply conveyor 23 and the negative electrode supply conveyor 24A, and supports the separator-equipped positive electrode 11 and the negative electrode 9. The circulation member 26 has a loop shape that extends in the vertical direction, and the support sections are formed on an outer peripheral surface thereof. The stacking unit 25 are disposed on a side opposite to the positive electrode supply conveyor 23 and the negative electrode supply conveyor 24A with the circulation member 26 interposed therebetween, and includes a plurality of stages of the stacking sections 33 on which the separator-equipped positive electrode 11 and the negative electrode 9 are stacked. The push-out unit 41 simultaneously pushes out the separator-equipped positive electrodes 11 and the negative electrode 9 which are supported by the plurality of support sections 27 toward the plurality of stages of stacking sections 33. The controller 60 controls circulation and elevation of the circulation member 26, and the operation of the push-out unit 41. The controller 60 controls the operation of the push-out unit 41 to push out the separator-equipped positive electrode 11 and the negative electrode 9 toward the stacking sections 33 at a speed that is slower than the conveying speed of the separator-equipped positive electrode 11 that is conveyed by the positive electrode supply conveyor 23 and the conveying speed of the negative electrode 9 that is conveyed by the negative electrode supply conveyor 24A.

In the above-described electrode stacking device 200, electrodes (the separator-equipped positive electrodes 11 and the negative electrodes 9) which are sequentially supplied to the support section 27 are simultaneously pushed out to the stacking sections 33 different from each other, and are stacked thereon. As described above, electrodes in a number greater than an electrode that is sequentially supplied are simultaneously pushed out and are stacked. Accordingly, an ejection speed when pushing out the electrodes to the stacking sections 33 can be set to be slower than the conveying speed (supply speed) of the electrode by the conveying device (the positive electrode supply conveyor 23 or the negative electrode supply conveyor 24A). According to this, it is possible to suppress a positional deviation of the electrodes when stacking the electrodes while preventing an electrode stacking speed from being lowered. As a result, according to the electrode stacking devices 200, it is possible to accomplish speeding-up of the stacking speed while suppressing an increase in size of the device.

Furthermore, in the electrode stacking device 200, the support section 99A or the support section 99B (refer to FIG. 24) having a U-shaped cross-section may be used instead of the support section 27.

Sixth Embodiment

Figure 32:
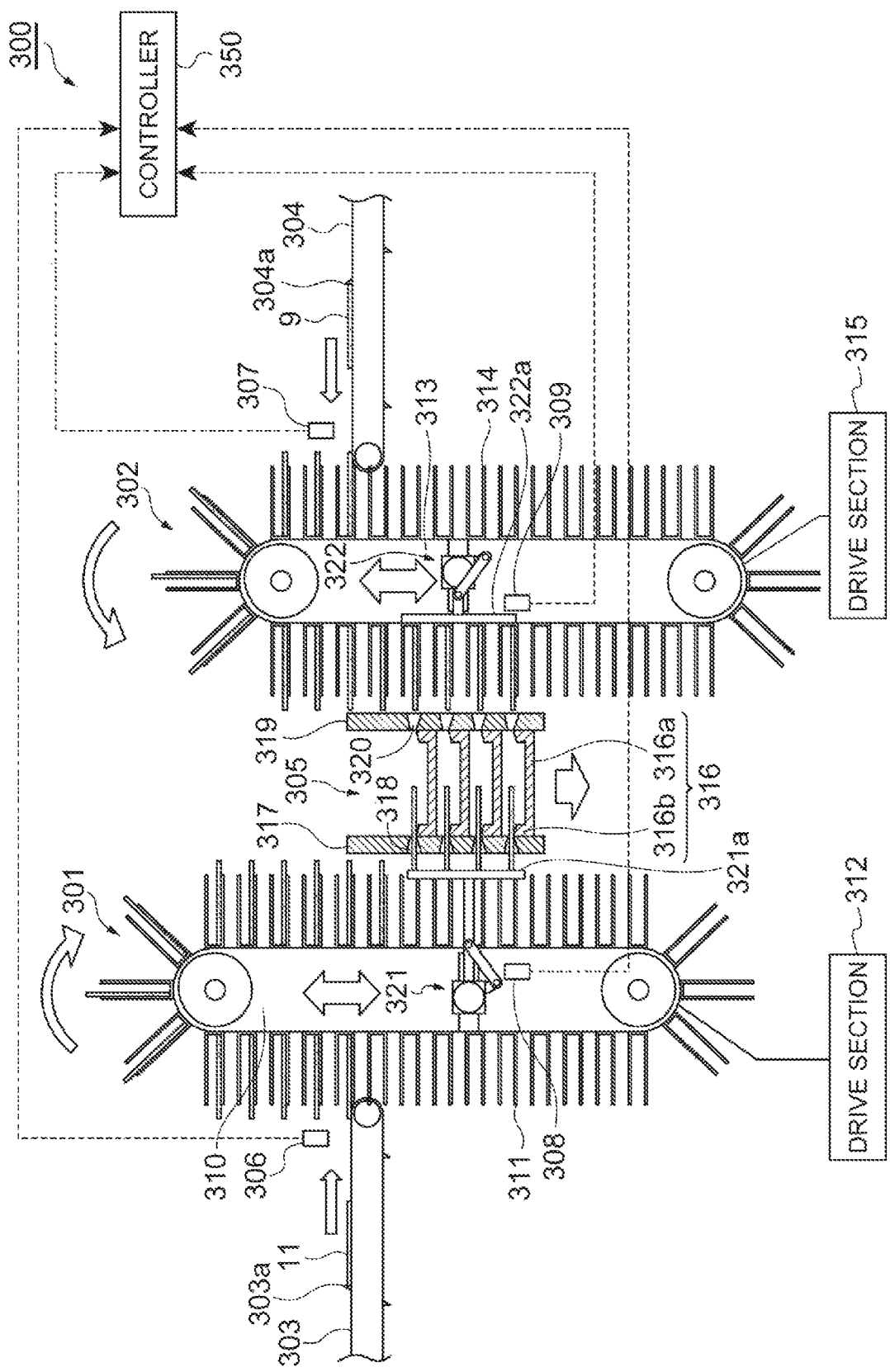
FIG. 32 is a side view (including a partial cross-section) illustrating an electrode stacking device according to a sixth embodiment.

Description will be given of an electrode stacking device 300 according to a sixth embodiment with reference to FIG. 32 to FIG. 50. FIG. 32 is a side view (including a partial cross-section) illustrating the electrode stacking device 300. FIG. 33 is a view illustrating a configuration of a support section of the electrode stacking device 300.

The electrode stacking device 300 includes a positive electrode conveying unit 301, a negative electrode conveying unit 302, a positive electrode supply conveyor 303, a negative electrode supply conveyor 304, and a stacking unit 305. In addition, the electrode stacking device 300 includes electrode supply sensors 306 and 307, and stacking position sensors 308 and 309.

As in the positive electrode conveying unit 21 according to the first embodiment, the positive electrode conveying unit 301 is a unit that sequentially conveys the separator-equipped positive electrodes 11 while holding the separator-equipped positive electrodes 11. The positive electrode conveying unit 301 includes a loop-shaped circulation member 310 that extends in the vertical direction, a plurality of support sections 311 which are formed on an outer peripheral surface of the circulation member 310 and respectively support the separator-equipped positive electrodes 11, and a drive section 312 that drives the circulation member 310. Here, for example, configurations of the circulation member 310 and the drive section 312 are the same as in the circulation member 26 and the drive section 28 of the positive electrode conveying unit 21. Here, the circulation member 310 functions as a distribution section that distributes the separator-equipped positive electrodes 11 supplied by the positive electrode supply conveyor 303 to the plurality of support sections 311.

(a) of FIG. 33 is a side view of each of the support sections 311 on which each of the separator-equipped positive electrodes 11 is supported, and (b) of FIG. 33 is a cross-sectional view taken along line b-b in (a) of FIG. 33. As illustrated in FIG. 33, the support section 311 is a member that has a U-shaped cross-section and includes a bottom wall 311a and a pair of side walls 311b. The bottom wall 311a is a rectangular plate-shaped member that is formed on an outer peripheral surface of the circulation member 310. The pair of side walls 311b are rectangular plate-shaped members provided to be erected from both edge portions of the bottom wall 311a in a direction in which the circulation member 310 circulates. As illustrated in (b) of FIG. 33, in this embodiment, as an example, the side walls 311b are formed in a bifurcated shape. However, the side wall 311b may be an arbitrary shape as long as the separator-equipped positive electrode 11 can be supported. The pair of side walls 311b face each other, and are spaced away from each other to an extent capable of accommodating the separator-equipped positive electrode 11. For example, the bottom wall 311a and the side walls 311b are integrally formed from a metal such as stainless steel.

A buffering material 311d such as sponge is provided on an inner surface of the bottom wall 311a. The separator-equipped positive electrode 11, which is supplied from the positive electrode supply conveyor 303 to the support section 311, collides with the buffering material 311d, and impact of the collision is mitigated by the buffering material 311d. That is, the buffering material 311d functions as an impact mitigation section that mitigates impact to the separator-equipped positive electrode 11 when the support section 311 receives the separator-equipped positive electrode 11. As a result, when supplying the separator-equipped positive electrode 11 to the support section 311, it is possible to suppress peeling-off of the positive electrode active material layer 15 of the separator-equipped positive electrode 11.

As in the negative electrode conveying unit 22 according to the first embodiment, the negative electrode conveying unit 302 is a unit that sequentially conveys negative electrodes 9 while holding the negative electrodes 9. The negative electrode conveying unit 302 includes a loop-shaped circulation member 313 that extends in the vertical direction, a plurality of support sections 314 which are formed on an outer peripheral surface of the circulation member 313 and respectively support the negative electrodes 9, and a drive section 315 that drives the circulation member 313. Here, for example, configurations of the circulation member 313 and the drive section 315 are the same as in the circulation member 29 and the drive section 31 of the negative electrode conveying unit 22. In addition, a configuration of the support section 314 is the same as that of the support section 311. Here, the circulation member 313 functions as a distribution section that distributes the negative electrodes 9 supplied by the negative electrode supply conveyor 304 to the plurality of support sections 314.

As in the positive electrode supply conveyor 23 according to the first embodiment, the positive electrode supply conveyor 303 horizontally conveys the separator-equipped positive electrodes 11 toward the positive electrode conveying unit 301, and supplies the separator-equipped positive electrodes 11 to the support sections 311 of the positive electrode conveying unit 301. The positive electrode supply conveyor 303 is different from the positive electrode supply conveyor 23 in that a plurality of claws 303a provided at regular intervals in the circulation direction of the positive electrode supply conveyor 303. Each of the claws 303a extends in a direction perpendicular to the circulation direction, and comes into contact with a rear end of each of the separator-equipped positive electrodes 11 in a conveying direction. According to this, the separator-equipped positive electrodes 11 are supplied to the positive electrode conveying unit 301 at regular intervals.

As in the negative electrode supply conveyor 24 according to the first embodiment, the negative electrode supply conveyor 304 horizontally supplies the negative electrodes 9 toward the negative electrode conveying unit 302, and supplies the negative electrodes 9 to the support sections 314 of the negative electrode conveying unit 302. The negative electrode supply conveyor 304 is different from the negative electrode supply conveyor 24 in that a plurality of claws 304a are provided at regular intervals in the circulation direction of the negative electrode supply conveyor 304. Each of the claws 304a extends in a direction that is perpendicular to the circulation direction and comes into contact with a rear end of each of the negative electrodes 9 in a conveying direction. According to this, the negative electrodes 9 are supplied to the negative electrode conveying unit 302 at regular intervals.

The separator-equipped positive electrodes 11 which are respectively transferred from the positive electrode supply conveyor 303 to the support sections 311 of the positive electrode conveying unit 301 are circulated and moved to be raised at once and to be lowered due to rotation of the circulation member 310. At this time, the front and rear of each of the separator-equipped positive electrodes 11 are inverted at an upper side of the circulation member 310. The negative electrodes 9 which are transferred from the negative electrode supply conveyor 304 to the support sections 314 of the negative electrode conveying unit 302 are circulated and moved to be raised at once and to be lowered due to rotation of the circulation member 313. At this time, the front and rear of each of the negative electrodes 9 are inverted at an upper side of the circulation member 313.

The stacking unit 305 is disposed between the positive electrode conveying unit 301 and the negative electrode conveying unit 302. The configuration of the stacking unit 305 is the same as that of the stacking unit 25 according to the first embodiment. That is, as an example, the stacking unit 305 includes a loop-shaped circulation member (not illustrated) that extends in the vertical direction, a plurality of stacking sections 316 which are formed on the outer peripheral surface of the circulation member and on which the separator-equipped positive electrode 11 and the negative electrode 9 are alternatively stacked, and a drive section (not illustrated) that drives the circulation member. A basic configuration of the stacking unit 305 is the same as that of the stacking unit 25, and thus detailed description thereof will be omitted.

In this embodiment, as an example, the stacking sections 316 have the same configuration as that of the stacking sections 77 (refer to FIG. 16). That is, each of the stacking sections 316 includes a plate-shaped base 316a on which the separator-equipped positive electrode 11 and the negative electrode 9 are placed, and a side wall 316b which is provided to be erected from the base 316a, has a U-shaped cross-section, and performs positioning of the bottom edge 11c and the side edge 11d (refer to FIG. 4) of the separator-equipped positive electrode 11 and the bottom edge 9c and the side edge 9d (refer to FIG. 4) of the negative electrode 9. In addition, here, as an example, as illustrated in FIG. 32, an upper surface of the side wall 316b on the positive electrode conveying unit 301 side is set as an inclined surface that is downwardly inclined toward the base 316a. Similarly, an upper surface of the side wall 316b on the negative electrode conveying unit 302 side is also set as an inclined surface that is downwardly inclined toward the base 316a. According to this configuration, the separator-equipped positive electrode 11 and the negative electrode 9 can be smoothly moved to the base 316a.

A wall portion 317 that extends in the vertical direction is disposed between the stacking unit 305 and the positive electrode conveying unit 301. The wall portion 317 is provided with a plurality of (here, four) slits 318 through which the separator-equipped positive electrodes 11 pushed out by a push-out unit 321 to be described later pass. The slits 318 are disposed in the vertical direction at regular intervals. Furthermore, in this embodiment, as an example, an upper portion of the each of the slits 318 are set as an inclined surface that is downwardly inclined from the positive electrode conveying unit 301 side toward the stacking section 316 side. In addition, a lower portion of the slit 318 is set as an inclined surface that is upwardly inclined from the positive electrode conveying unit 301 side toward the stacking section 316 side. According to this, it is possible to appropriately guide the separator-equipped positive electrode 11 to the stacking section 316, and it is possible to enlarge an opening on an inlet side (positive electrode conveying unit 301 side) in the slit 318. As a result, even when the height position of the separator-equipped positive electrode 11 pushed out by the push-out unit 321 slightly deviates, it is possible to allow the separator-equipped positive electrode 11 to pass through the slit 318.

A wall portion 319 that extends in the vertical direction is disposed between the stacking unit 305 and the negative electrode conveying unit 302. The wall portion 319 is provided with a plurality of (here, four) slits 320 through which the negative electrodes 9 pushed out by a push-out unit 322 to be described later pass. Height positions of the slits 320 are the same as the height positions of the slits 318. Furthermore, in this embodiment, as an example, an upper portion of each of the slits 320 is set as an inclined surface that is downwardly inclined from the negative electrode conveying unit 302 side toward the stacking section 316 side. In addition, a lower portion of the slit 320 is set as an inclined surface that is upwardly inclined from the negative electrode conveying unit 302 side toward the stacking section 316 side. According to this, it is possible to appropriately guide the negative electrode 9 to the stacking section 316, and it is possible to enlarge an opening on an inlet side (the negative electrode conveying unit 302 side) in the slit 320. As a result, even when the height position of the negative electrode 9 pushed out by the push-out unit 322 slightly deviates, it is possible to allow the negative electrode 9 to pass through the slit 320.

In addition, the electrode stacking device 20 includes the push-out unit 321 and the push-out unit 322.

As an example, the push-out unit 321 has the same configuration as in the push-out unit 41 according to the first embodiment. That is, in a stacking area in which the separator-equipped positive electrodes 11 are stacked, the push-out unit 321 simultaneously pushes out a plurality of (here, four) the separator-equipped positive electrodes 11 toward a plurality of vertical stages (here, four vertical stages) of the stacking sections 316, thereby simultaneously stacking the four separator-equipped positive electrodes 11 on the four stages of stacking sections 316. The push-out unit 321 includes a pair of push members 321a (push-out sections) which collectively push the four separator-equipped positive electrodes 11, and a drive section (not illustrated) that moves the push members 321a to the four stages of stacking sections 316 side. For example, the drive section includes a motor and a link mechanism.

As an example, the push-out unit 322 has the same configuration as in the push-out unit 42 according to the first embodiment. In a stacking area in which the negative electrodes 9 are stacked, the push-out unit 322 simultaneously pushes out a plurality of (here, four) the negative electrodes 9 toward a plurality of vertical stages (here, four vertical stages) of the stacking sections 316, thereby simultaneously stacking the four negative electrodes 9 on the four stages of stacking sections 316. The push-out unit 322 includes a pair of push members 322a (push-out sections) which collectively push the four negative electrodes 9, and a drive section (not illustrated) that moves the push members 322a to the four stages of stacking sections 316 side. A configuration of the drive section is the same as the configuration of the drive section of the push-out unit 321. Furthermore, the drive sections of the push-out units 321 and 322 may further include a cylinder or the like.

In addition, as in the electrode stacking device 20, the electrode stacking device 300 includes the positioning unit 47 (refer to FIG. 4) that aligns a position of the bottom edge 11c of the separator-equipped positive electrode 11, and the positioning unit 48 (refer to FIG. 4) that aligns a position of the bottom edge 9c of the negative electrode 9.

In addition, the electrode stacking device 300 includes a controller 350. The controller 350 includes a CPU, a RAM, a ROM, an input/output interface, and the like. As in the controller 60 according to the first embodiment, the controller 350 includes a conveying control unit that controls the drive sections 312 and 315, a stacking control unit that controls the drive section of the stacking unit 305, a push-out control unit that controls the drive section of the push-out units 321 and 322, and a positioning control unit that controls the drive section of the positioning units 47 and 48. In addition, the controller 350 is connected to the electrode supply sensors 306 and 307, and the stacking position sensors 308 and 309, and can receive a detection signal from the sensors.

The electrode supply sensor 306 is disposed in the vicinity of an end of the positive electrode supply conveyor 303 on the positive electrode conveying unit 301 side, and detects presence or absence of the claw 303a or the separator-equipped positive electrode 11. The electrode supply sensor 306 periodically transmits a detection signal, which indicates presence or absence of the claw 303a or the separator-equipped positive electrode 11 to the controller 350.

The electrode supply sensor 307 is disposed in the vicinity of an end of the negative electrode supply conveyor 304 on the negative electrode conveying unit 302 side, and detects presence or absence of the claw 304a or the negative electrode 9. The electrode supply sensor 307 periodically transmits a detection signal, which indicates presence or absence of the claw 304a or the negative electrode 9 to the controller 350.

The stacking position sensor 308 detects that the support section 311 that supports the separator-equipped positive electrode 11 reaches a predetermined stacking position (for example, a lower end position of the slit 318 corresponding to a lowermost stage of the stacking section 316 of the stacking unit 305). The stacking position sensor 308 is independent from the vertical movement of the circulation member 310 and a height position of the stacking position sensor 308 is fixed with respect to the slit 318. When detecting that the support section 311 that supports the separator-equipped positive electrode 11 reaches the stacking position, the stacking position sensor 308 transmits a detection signal indicating this situation to the controller 350.

The stacking position sensor 309 detects that the support section 314 that supports the negative electrode 9 reaches a predetermined stacking position (for example, a lower end position of the slit 320 corresponding to a lowermost stage of the stacking section 316 of the stacking unit 305). The stacking position sensor 309 is independent from the vertical movement of the circulation member 313 and a height position of the stacking position sensor 309 is fixed with respect to the slit 320. When detecting that the support section 314 that supports the negative electrode 9 reaches the stacking position, the stacking position sensor 309 transmits a detection signal indicating this situation to the controller 350.

Next, description will be given of an operation control of the circulation members 310 and 313, the positioning units 47 and 48 (refer to FIG. 4), and the push-out units 321 and 322 by the controller 350 with reference to FIG. 34 to FIG. 40.

Figure 34:
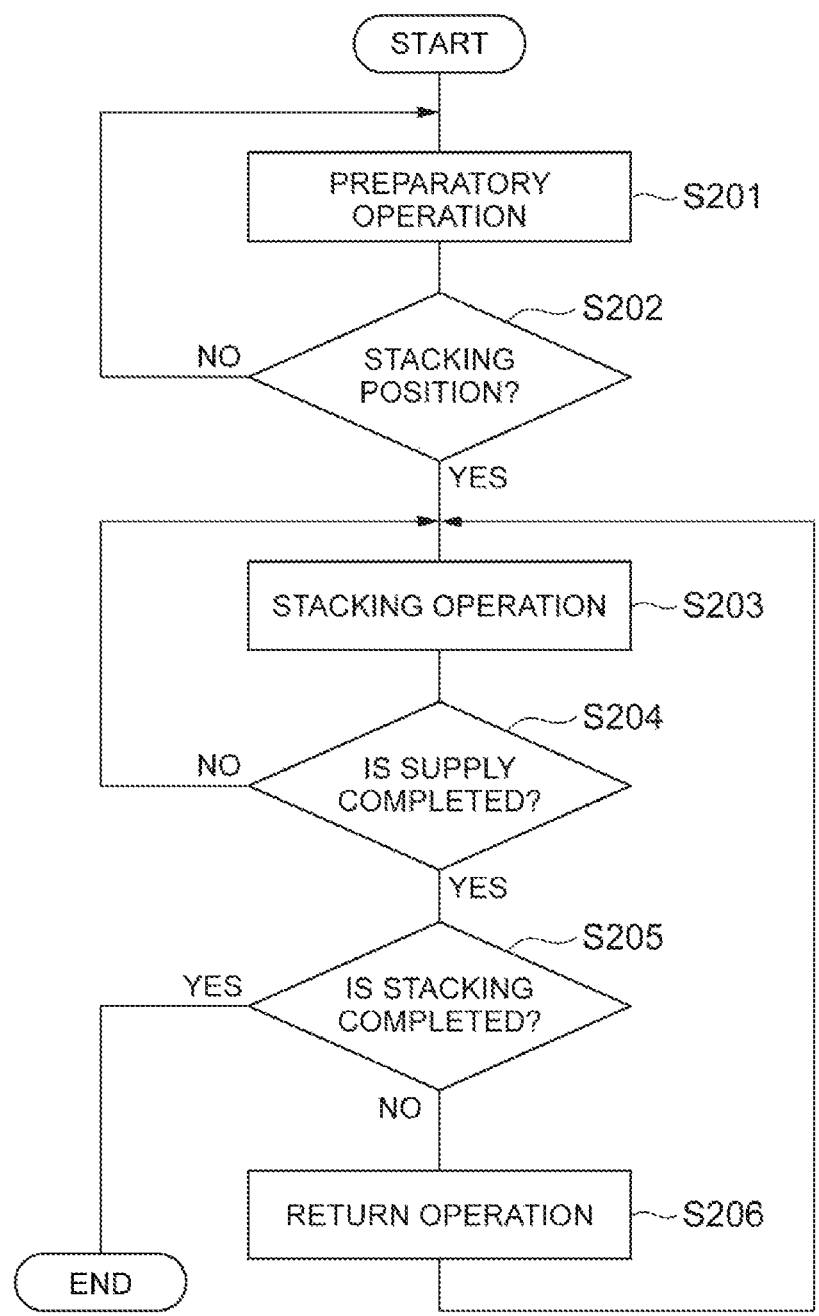
FIG. 34 is a flowchart illustrating a control flow of a circulation member.
Figure 35:
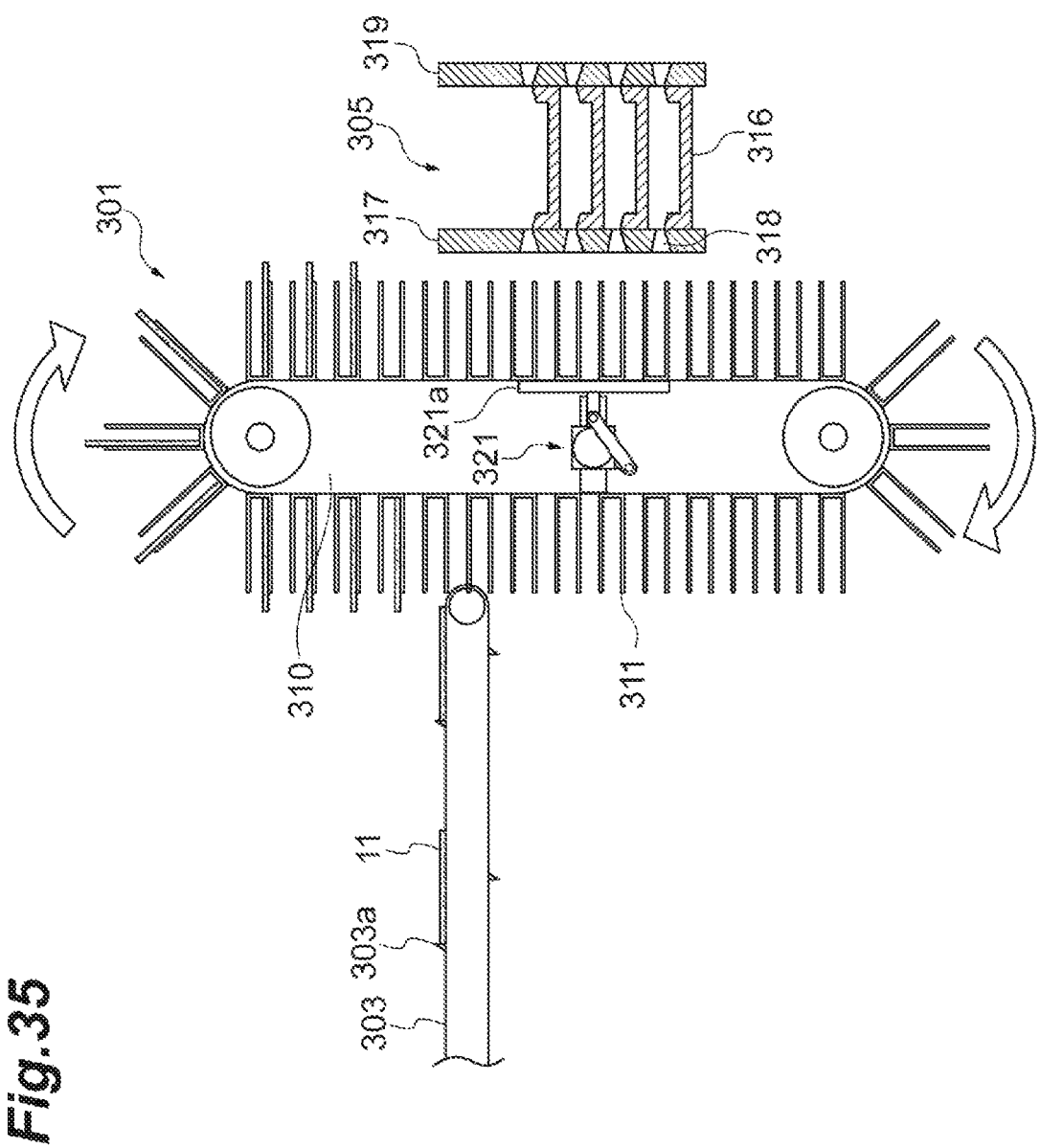
FIG. 35 is a partial side view illustrating an operation of the circulation member in a preparatory operation.
Figure 36:
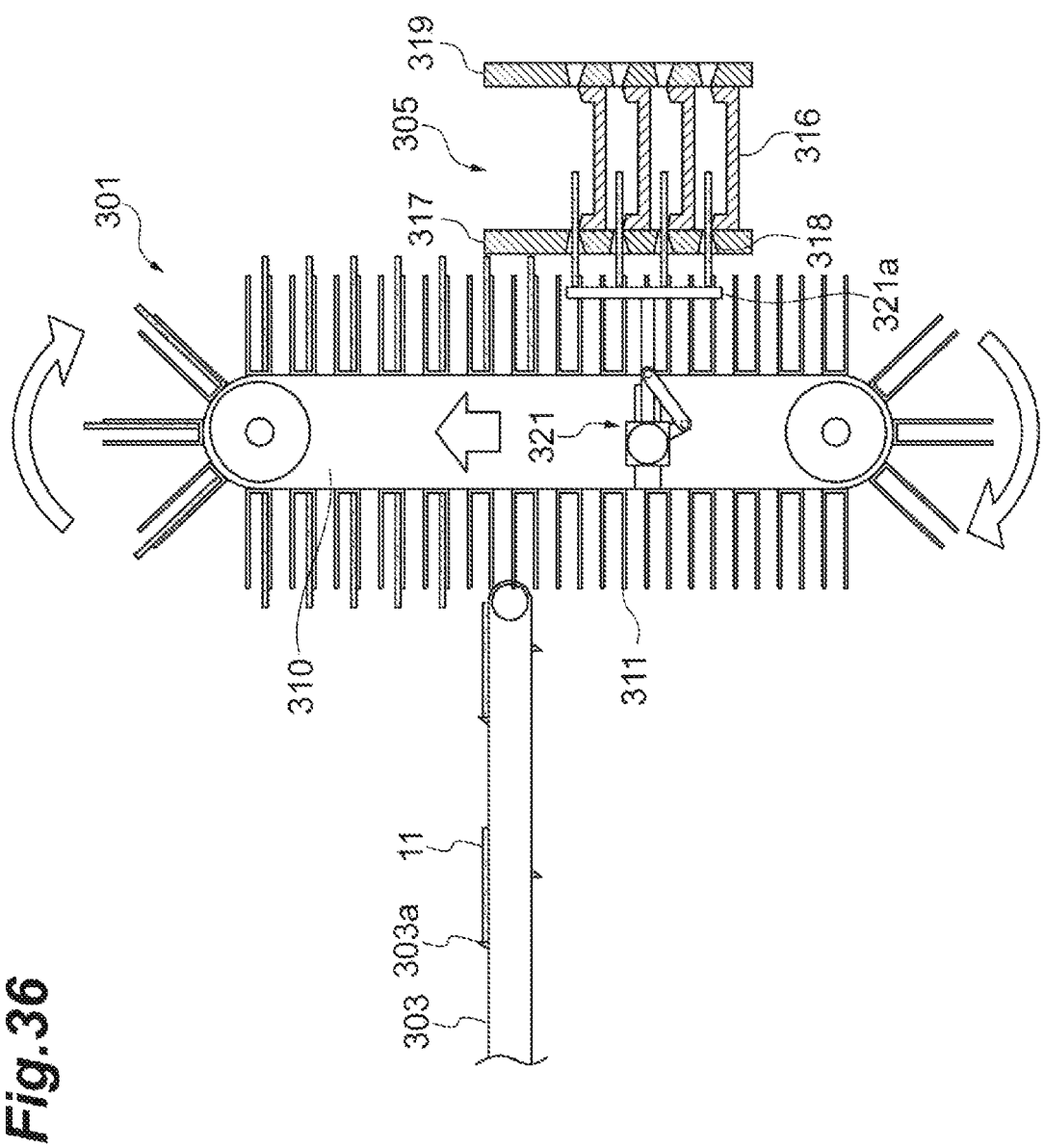
FIG. 36 is a partial side view illustrating an operation of the circulation member in a stacking operation.
Figure 37:
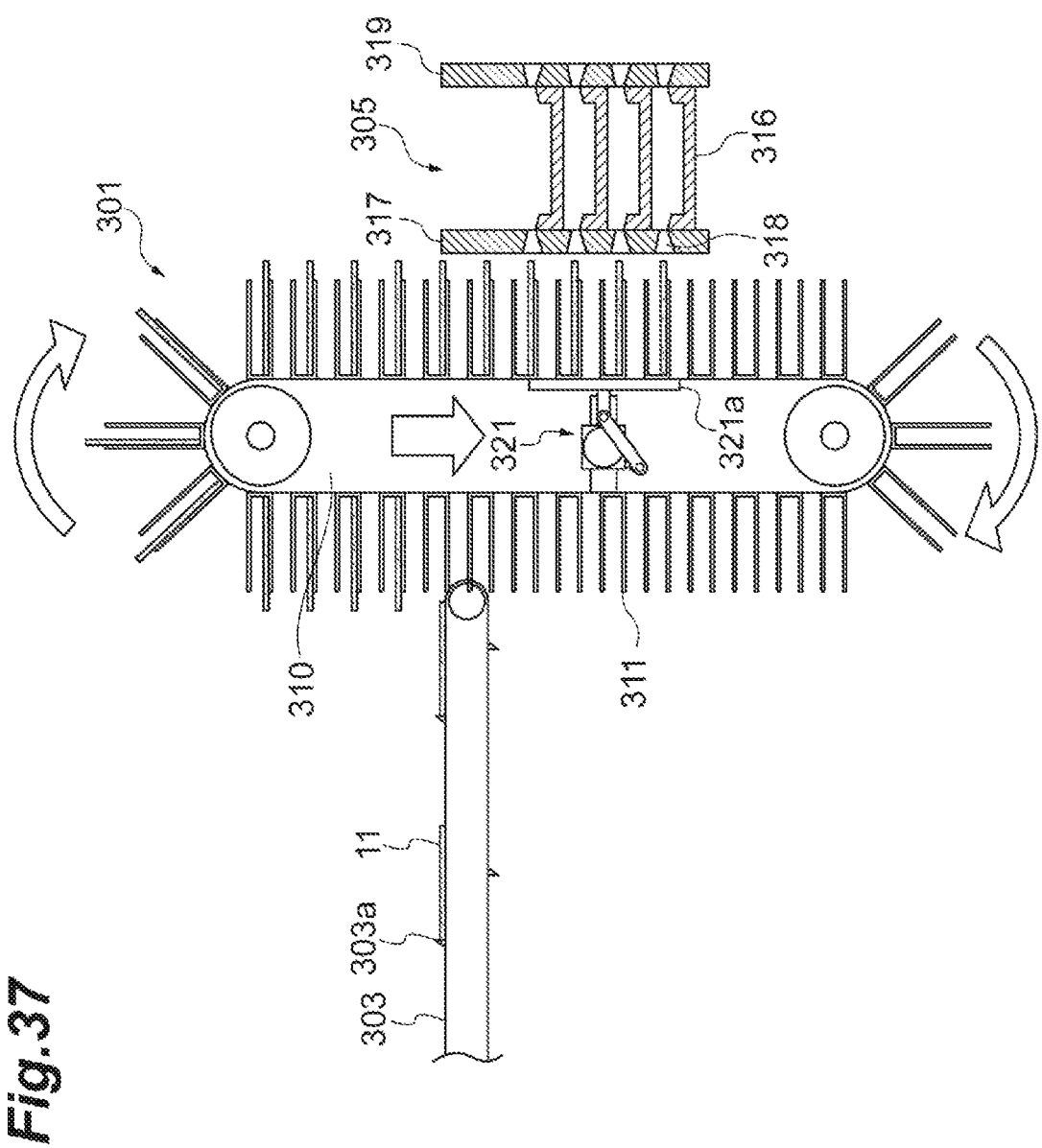
FIG. 37 is a partial side view illustrating an operation of the circulation member in a return operation.

First, description will be given of a control flow of a circulation member (here, the circulation member 310 as an example) with reference to FIG. 34 to FIG. 37. FIG. 34 is a flowchart illustrating a control flow that is common to the circulation member 310 and the circulation member 313. FIG. 35 is a partial side view illustrating an operation of the circulation member 310 in the preparatory operation (step S201 in FIG. 34). FIG. 36 is a partial side view illustrating an operation of the circulation member 310 in the stacking operation (step S203 in FIG. 34). FIG. 37 is a partial side view illustrating an operation of the circulation member 310 in the return operation (step S206 in FIG. 34). Furthermore, a control flow of the circulation member 313 of the negative electrode conveying unit 302 is the same as the control flow of the circulation member 310, and thus description thereof will be omitted.

In FIG. 34, when receiving an operation initiation trigger (for example, an input by an operator or the like) of a manufacturing line including the electrode stacking device 300, the controller 350 initiates the preparatory operation of the circulation member 310 (step S201).

The preparatory operation is an operation of changing an initial state in which the separator-equipped positive electrode 11 is not supported by any of the support sections 311 to a state in which the support sections 311 between a reception position of the separator-equipped positive electrode 11 and the stacking position respectively support the separator-equipped positive electrodes 11. Specifically, the preparatory operation is an operation of circulating the support sections 311 through only rotation (circulation) of the circulation member 310 (refer to FIG. 35). More specifically, when the amount of movement along a distance between the support sections 311 adjacent to each other in the circulation member 310 is set to "1", whenever confirming that the separator-equipped positive electrode 11 is supplied to the support section 311 that exists at the reception position of the separator-equipped positive electrode 11 in the circulation member 310, the controller 350 circulates the circulation member 310 in a clockwise direction when viewed from the front side of the paper surface in FIG. 32 (hereinafter, simply referred to as "clockwise direction") by the amount of movement of "1". Furthermore, in the following description, the amount of movement is described in such a manner that with regard to circulation of the circulation member 310, movement in a clockwise direction is set as a positive direction, and with regard to vertical movement of the circulation member 310, an upward direction is set as a positive direction.

During the preparatory operation, the controller 350 frequently makes a determination as to whether or not to have received the detection signal from the stacking position sensor 308 (that is, whether or not the support section 311 that supports the separator-equipped positive electrode 11 has reached the stacking position) (step S202). The controller 350 continues the preparatory operation of the circulation member 310 until receiving the detection signal from the stacking position sensor 308 (step S202: NO). On the other hand, when receiving the detection signal from the stacking position sensor 308 (that is, when detecting that the support section 311 that supports the separator-equipped positive electrode 11 has reached the stacking position), the controller 350 switches the circulation member 310 to the stacking operation (step S202: YES, step S203).

The stacking operation is an operation of stacking the separator-equipped positive electrode 11 on the stacking section 316. Specifically, the stacking operation is an operation of relatively fixing the height position of the support section 311 on the stacking unit 305 side with respect to the stacking section 316, and raising the support section 311 on the positive electrode supply conveyor 303 side by the amount of movement of "1" with respect to the positive electrode supply conveyor 303 whenever one sheet of the separator-equipped positive electrode 11 is supplied from the positive electrode supply conveyor 303. More specifically, the controller 350 circulates the circulation member 310 in a clockwise direction by the amount of movement of "0.5" for a time (hereinafter, referred to as "unit time") for which the subsequent separator-equipped positive electrode 11 is supplied after one sheet of the separator-equipped positive electrode 11 is supplied from the positive electrode supply conveyor 303, and raises the support section 311 by the amount of movement of "0.5" (refer to FIG. 36).

During the stacking operation, the controller 350 frequently determines whether or not simultaneous supply of four sheets of the separator-equipped positive electrodes 11 to four stages of the stacking sections 316 has been completed (step S204). Specifically, determination is made as to whether or not a push-out operation by the push-out unit 321 to be described later has been completed. For example, it is possible to detect completion of the push-out operation by detecting that the push member 321a returns to the original position (position before pushing out the separator-equipped positive electrode 11). The controller 350 continues the stacking operation of the circulation member 310 until detecting that the push-out operation by the push-out unit 321 has been completed (step S204: NO). On the other hand, when detecting the push-out operation by the push-out unit 321 has been completed (step S204: YES), the controller 350 determines whether or not to complete stacking of the separator-equipped positive electrode 11 on the stacking unit 305 (step S205).

Specifically, for example, the controller 350 can determine whether or not to complete stacking by detecting the number of sheets of the electrodes stacked on each of the stacking sections 316 by a sensor or the like and by determining whether or not the number of sheets of the electrodes stacked has reached a predetermined number of sheets. That is, the controller 350 can determine that stacking is to be completed in a case where the number of sheets of the electrodes which are stacked has reached the predetermined number of sheets, and stacking is not to be completed in a case where the number of sheets of the electrodes which are stacked has not reached the predetermined number of sheets.

In a case where it is determined that stacking is to be completed (step S205: YES), the controller 350 terminates the control of the circulation member 310. On the other hand, in a case where it is determined that stacking is not to be completed (step S205: NO), the controller 350 switches the circulation member 310 to the return operation (step S206). Furthermore, in a case where it is determined that stacking is to be completed (step S205: YES), the controller 350 may terminate the control of the circulation member 310 at once, and may restart the control of the circulation member 310 after replacement of the stacking section 316 is completed and a control initiation instruction is received from an operator or the like. In this case, the return operation (step S206) is initiated.

The return operation is an operation of returning (lowering) the circulation member 310, which is moved to a position raised from the original position (position before initiation of the stacking operation) in the stacking operation, to the original position. Specifically, the return operation is an operation of sliding the height position of a leading support section 311 that supports the separator-equipped positive electrode 11 on the stacking unit 305 side to the stacking position, and raising the support section 311 on the positive electrode supply conveyor 303 side by the amount of movement of "1". More specifically, the controller 350 circulates the circulation member 310 in a clockwise direction by the amount of movement of "2.5" and lowers the circulation member 310 by the amount of movement of "−1.5" (refer to FIG. 37) for the unit time.

According to this, for the unit time, the support section 311 is raised by one piece with respect to the positive electrode supply conveyor 303 on the positive electrode supply conveyor 303 side. On the other hand, on the stacking unit 305 side, the support section 311 is lowered by four pieces with respect to the stacking unit 305 on the stacking unit 305 side. According to this, it enters a state capable of executing a push-out operation of simultaneously pushing out four separator-equipped positive electrodes 11 by the push-out unit 321 while receiving the separator-equipped positive electrode 11 supplied from the positive electrode supply conveyor 303. Accordingly, the controller 350 switches the circulation member 310 to the stacking operation after completion of the return operation of the circulation member 310 (step S206→S203).

Figure 38:
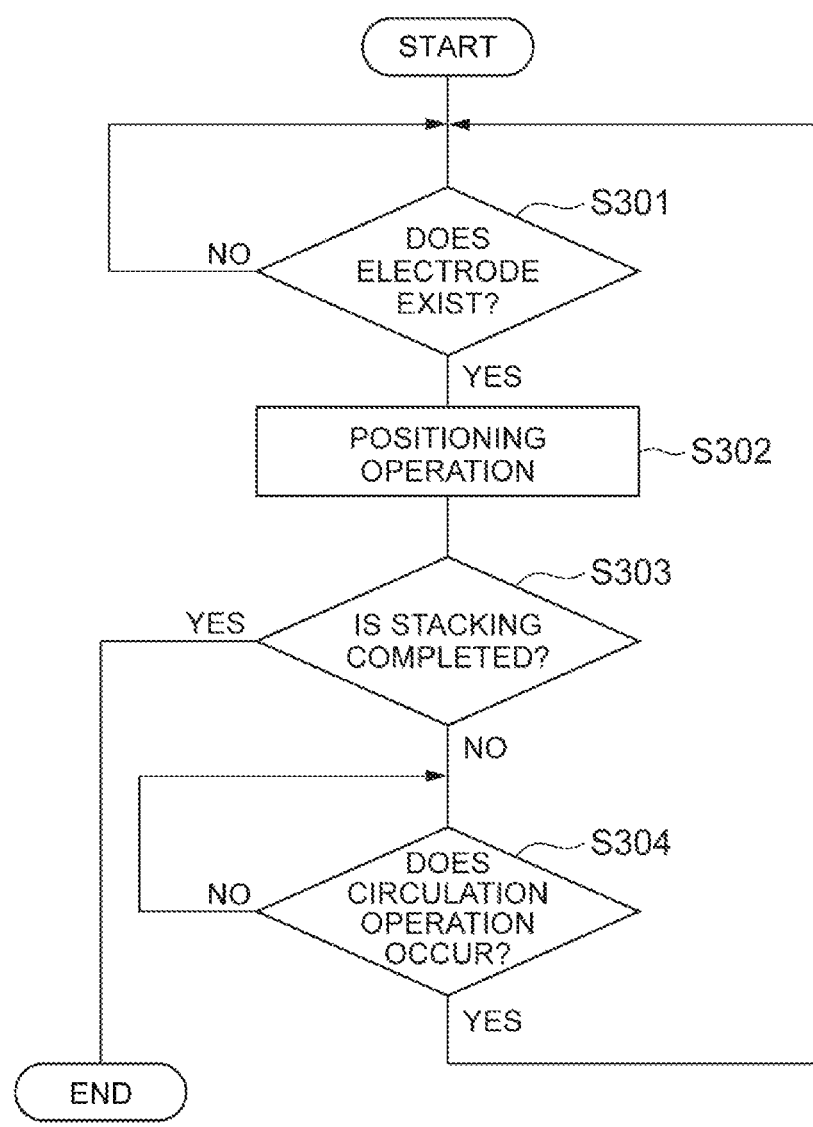
FIG. 38 is a flowchart illustrating a control flow of a positioning unit.

Next, description will be given of the control flow of the positioning units 47 and 48 with reference to FIG. 38. FIG. 38 is a flowchart illustrating a control flow that is common to the positioning unit 47 (refer to FIG. 4) of the positive electrode conveying unit 301 and the positioning unit 48 (refer to FIG. 4) of the negative electrode conveying unit 302. Here, as an example, description will be given of a control of the positioning unit 47. Furthermore, the control flow of the positioning unit 48 is the same as the control flow of the positioning unit 47, and thus description thereof will be omitted.

In FIG. 38, the controller 350 periodically checks presence or absence of reception of the detection signal from the stacking position sensor 308 and confirms whether or not an electrode (here, the separator-equipped positive electrode 11) exists at a position at which positioning by the positioning unit 47 can be performed (step S301). The controller 350 continues the check until receiving the detection signal from the stacking position sensor 308 (step S301: NO). When receiving the detection signal from the stacking position sensor 308 and detecting that the support section 311 that supports the separator-equipped positive electrode 11 has reached the stacking position (step S301: YES), the controller 350 allows the positioning unit 47 to execute a positioning operation (step S302). Specifically, as described in the first embodiment, the controller 350 performs a control to perform a press operation by the pressing section 54 of the positioning unit 47. This positioning operation is the same as in the first embodiment, and thus further detailed description thereof will be omitted.

Next, the controller 350 determines whether or not to complete stacking through the same determination as in step S205 in FIG. 34 (step S303). In a case where it is determined that stacking is to be completed (step S303: YES), the controller 350 terminates the control of the positioning unit 47. On the other hand, in a case where it is determined that stacking is not to be completed (step S303: NO), the controller 350 stops the operation of the positioning unit 47 until a circulation operation (that is, the return operation of the circulation member 310) in which the height position of the support section 311 on the stacking unit 305 side relatively varies with respect to the stacking unit 305 occurs (step S304: NO). When confirming occurrence of the circulation operation (that is, when the controller 350 switches the circulation member 310 to the return operation), the controller 350 returns to step S301 and continues the control of the positioning unit 47 (step S304: YES).

Furthermore, in the determination as to whether or not to allow the positioning unit 47 to execute the positioning operation, a determination standard other than the determination standard used in the above-described determination may be used. For example, stoppage of the push-out unit 321 may be added as the determination condition as to execution of the positioning operation in step S302.

Figure 39:
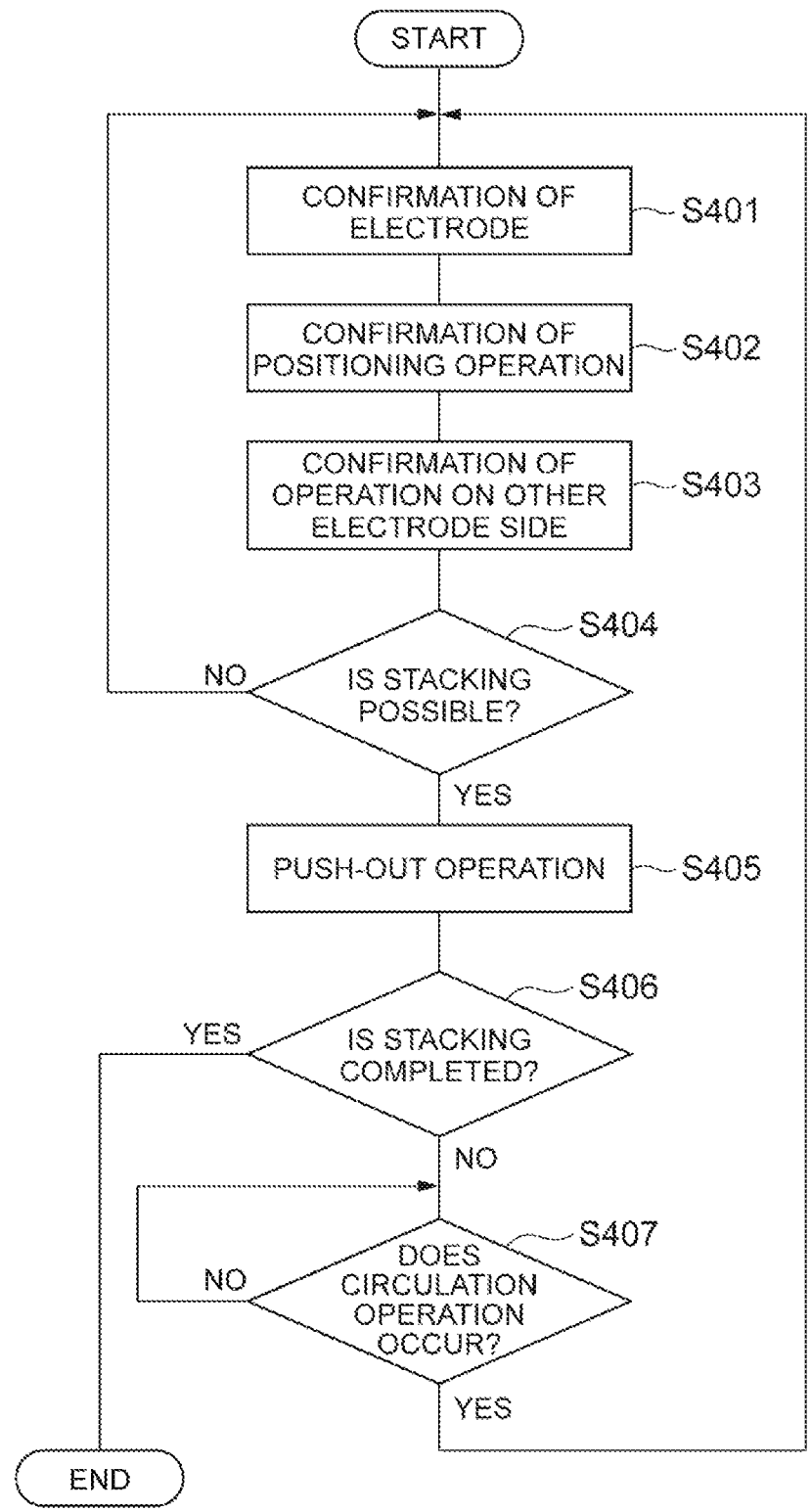
FIG. 39 is a flowchart illustrating a control flow of a push-out unit on a positive electrode supply side.

Next, description will be given of the control flow of the push-out unit 321 with reference to FIG. 39. FIG. 39 is a flowchart illustrating the control flow of the push-out unit 321.

In FIG. 39, the controller 350 confirms whether or not the support section 311 that supports the separator-equipped positive electrode 11 exists at the stacking position on the basis of a detection signal received from the stacking position sensor 308 (step S401). In addition, the controller 350 confirms whether or not the positioning operation (step S302 in FIG. 38) by the positioning unit 47 has been completed (step S402). For example, the controller 350 can confirm that the positioning operation of the positioning unit 47 has been completed by confirming that the pressing section 54 of the positioning unit 47 has returned to the original position (position before performing the press operation). In addition, the controller 350 confirms whether or not stacking (ejection to the stacking section 316) of the negative electrode 9 has been completed at the negative electrode conveying unit 302 on the other electrode side (here, a negative electrode 9 side) (step S403). For example, the controller 350 can confirm that stacking of the negative electrode 9 has been completed by confirming that the push-out operation of the push-out unit 322 of the negative electrode conveying unit 302 has been completed and the push member 322a has returned to the original position (position before performing the push-out operation).

The controller 350 determines whether or not stacking is possible (that is, whether or not the push-out operation by the push member 321a of the push-out unit 321 can be executed) on the basis of the confirmation results in steps S401 to S403 (step S404). Specifically, in the case of confirming that the support section 311 that supports the separator-equipped positive electrode 11 exists at the stacking position, the positioning operation by the positioning unit 47 has been completed, and stacking of the negative electrode 9 has been completed, the controller 350 determines that stacking is possible (step S404: YES). On the other hand, in a case where it is difficult to confirm a state of at least one among the above-described confirmation items, the controller 350 determines that stacking is not possible (step S404: NO), and returns to step S401.

Next, when it is determined that stacking is possible (step S404: YES), the controller 350 executes the push-out operation by the push-out unit 321 (step S405). Specifically, the controller 350 controls the drive section so that four separator-equipped positive electrodes 11 are simultaneously pushed out by the push member 321a toward four vertical stages of the stacking sections 316 in the push-out unit 321.

Next, the controller 350 determines whether or not to complete stacking through the same determination in step S205 in FIG. 34 (step S406). In a case where it is determined that stacking is to be completed (step S406: YES), the controller 350 terminates the control of the push-out unit 321. On the other hand, in a case where it is determined that stacking is not to be completed (step S406: NO), the controller 350 stops the operation of the push-out unit 321 until the circulation operation (that is, the return operation of the circulation member 310) in which the height position of the support section 311 on the stacking unit 305 side relatively varies with respect to the stacking unit 305 occurs (step S407: NO). When confirming occurrence of the circulation operation (that is, when the controller 350 switches the circulation member 310 to the return operation), the controller 350 returns to step S401, and continues the control of the push-out unit 321 (step S407: YES).

Figure 40:
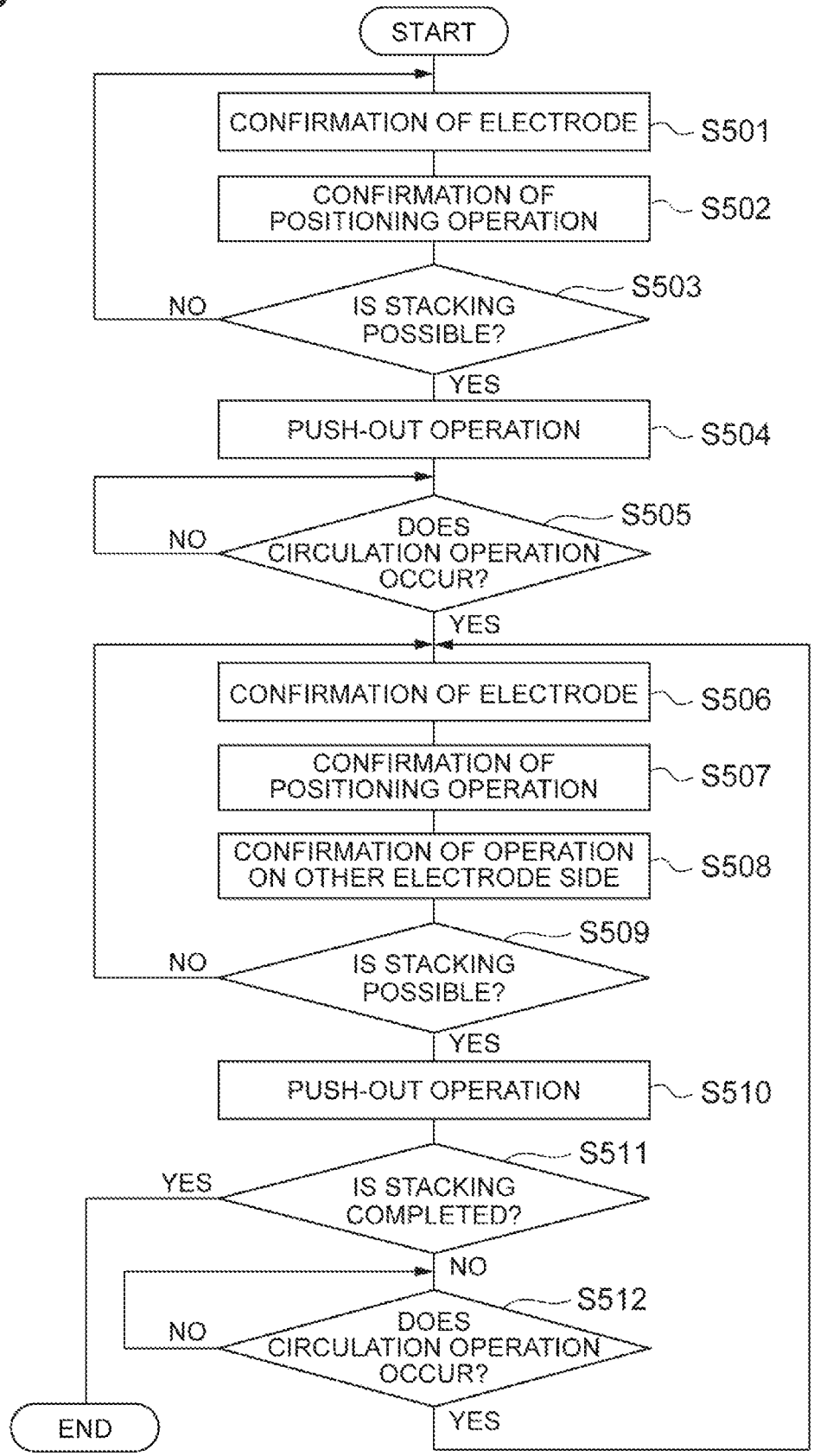
FIG. 40 is a flowchart illustrating a control flow of a push-out unit on a negative electrode supply side.

Next, description will be given of the control flow of the push-out unit 322 with reference to FIG. 40. FIG. 40 is a flowchart illustrating the control flow of the push-out unit 322. In this embodiment, as an example, the negative electrode 9 is determined to be stacked on the stacking section 316 for the first time. According to this, in the control flow of the push-out unit 322, a control flow in the case of stacking a first sheet of the negative electrode 9 on the stacking section 316 (steps S501 to S505) is partially different from a control flow in the case of stacking a second or later sheet of the negative electrode 9 on the stacking section 316 (step S506 to S512).

Specifically, the negative electrode 9 is stacked on the stacking section 316 for the first time, and thus in the case of stacking the first sheet of negative electrode 9 on the stacking section 316, it is not necessary to confirm an operation of the separator-equipped positive electrode 11 side. According to this, in the control flow (steps S501 to S505) in the case of stacking the first sheet of negative electrode 9 on the stacking section 316, operation confirmation of the other electrode side (step corresponding to step S403 in FIG. 3) is omitted. In addition, in a state in which only one sheet of the negative electrode 9 is stacked, stacking is not completed, and thus determination as to whether or not stacking is completed (step corresponding to step S406 in FIG. 39) is also omitted.

On the other hand, a control flow (step S506 to S512) in the case of stacking a second or later sheet of the negative electrode 9 on the stacking section 316 is the same as the control flow (steps S401 to S407 in FIG. 39) of the push-out unit 321.

Figure 41:
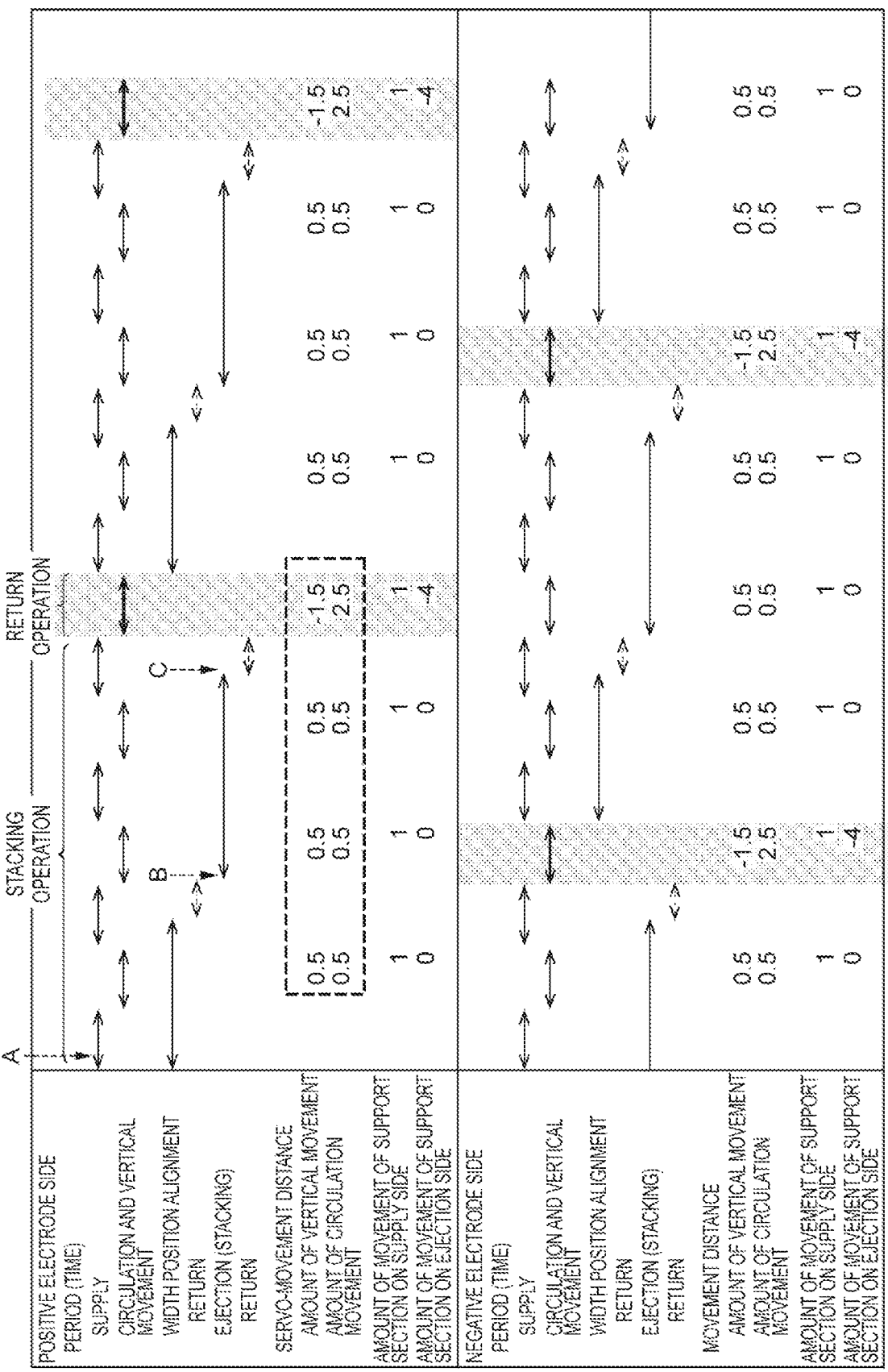
FIG. 41 is a table illustrating a normal operation state of the positive electrode conveying unit, the negative electrode conveying unit, and the stacking unit when stacking electrodes.
Figure 42:
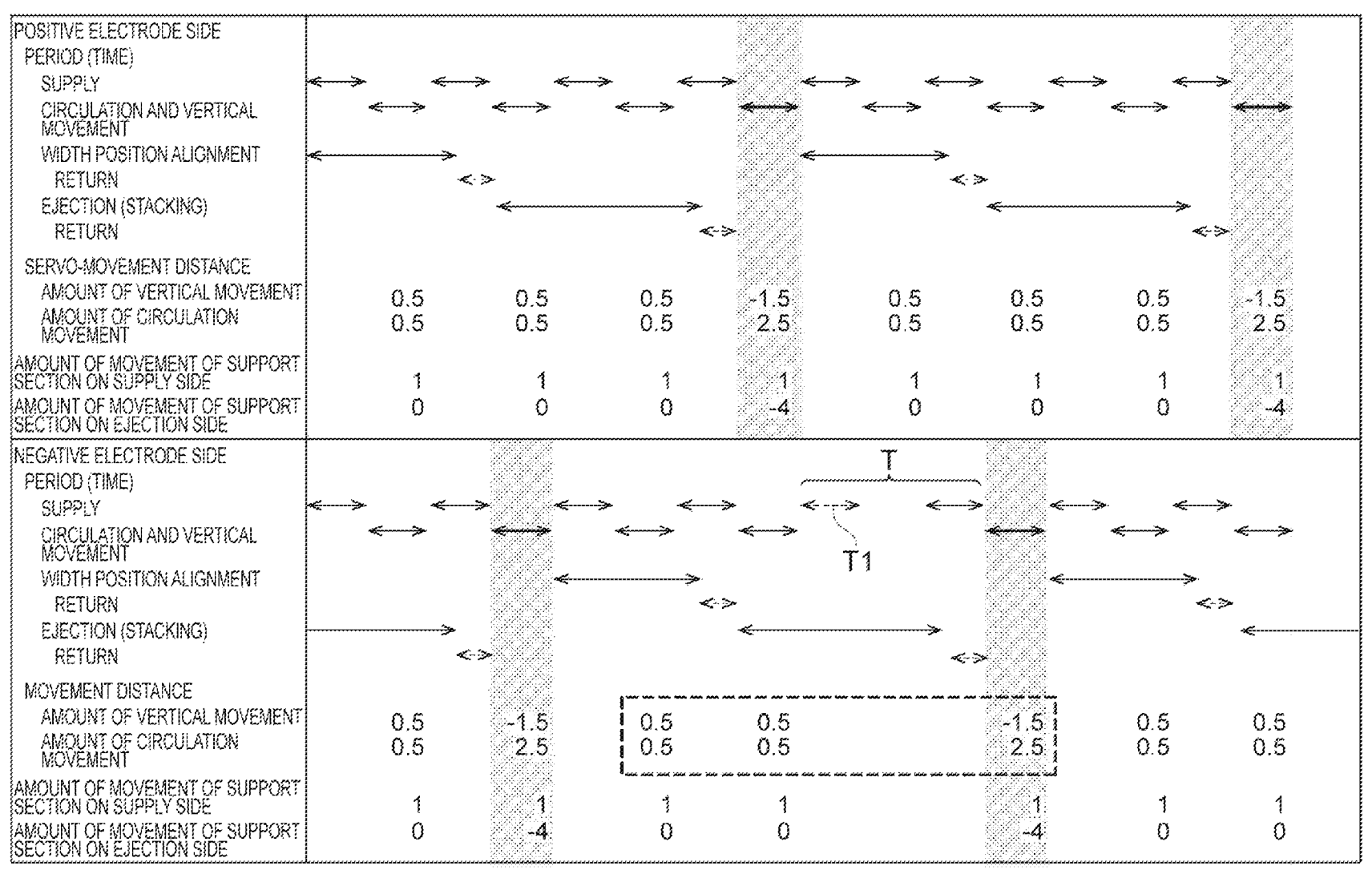
Figure 43:
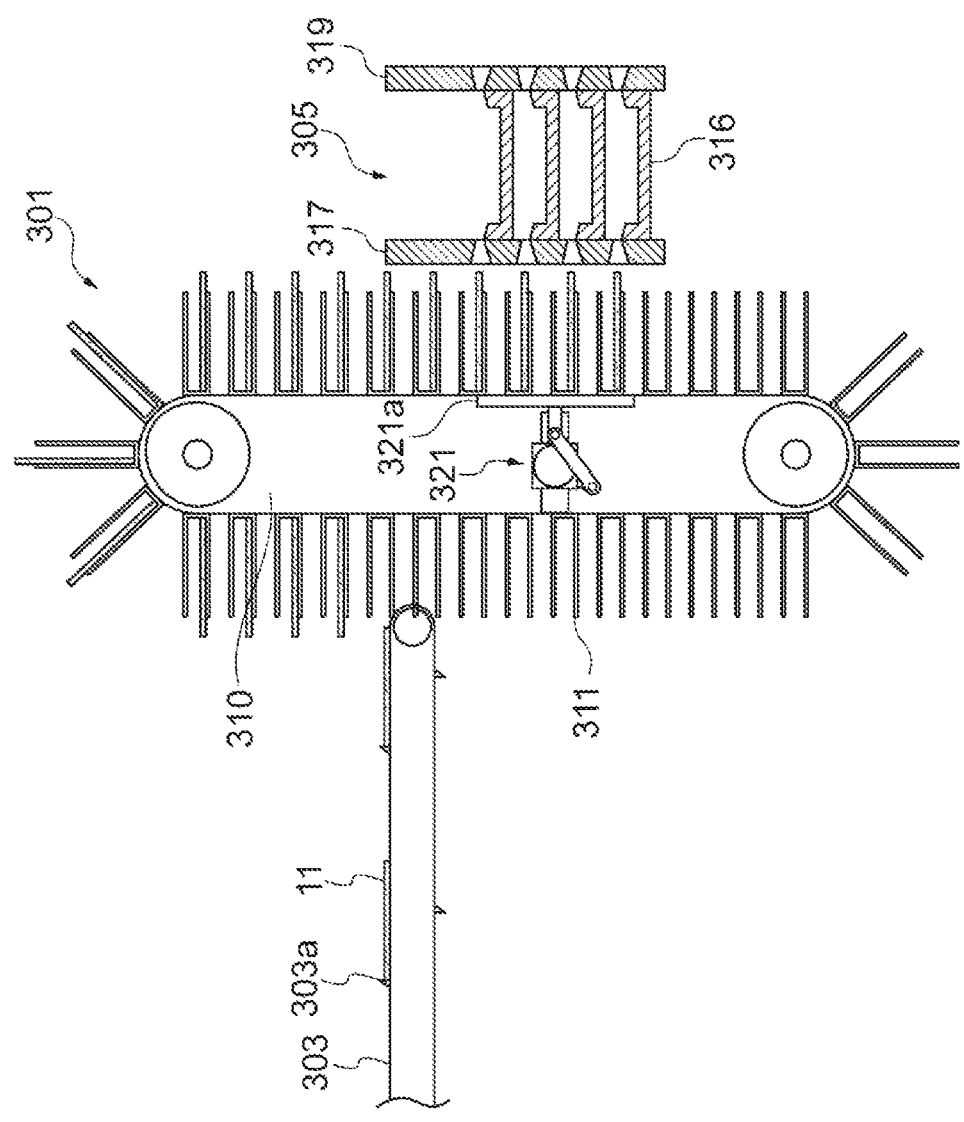
FIG. 43 is a view illustrating a state of the positive electrode conveying unit at a point of time A in FIG. 41.
Figure 44:
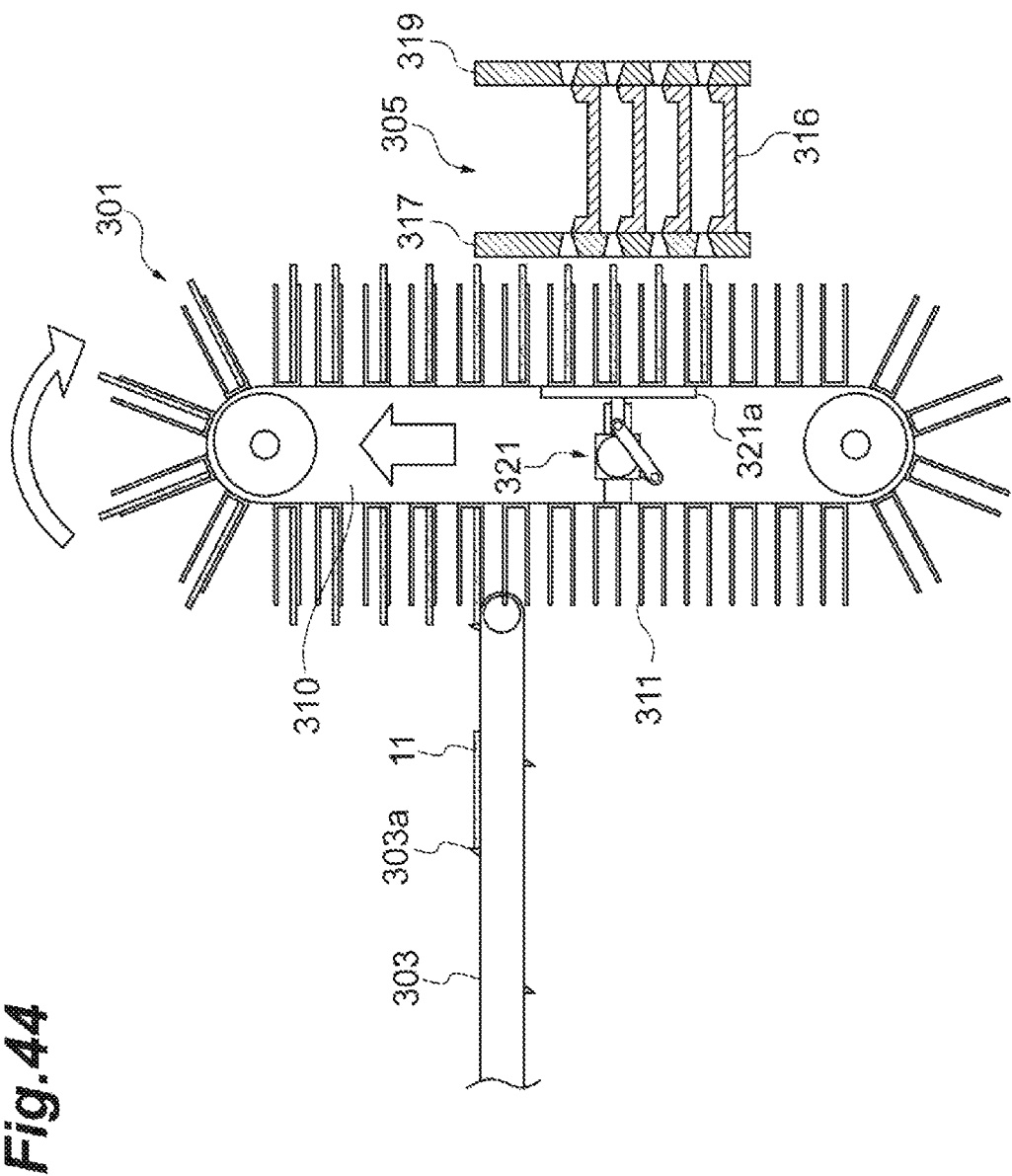
FIG. 44 is a view illustrating a state of the positive electrode conveying unit at a point of time B in FIG. 41.
Figure 45:
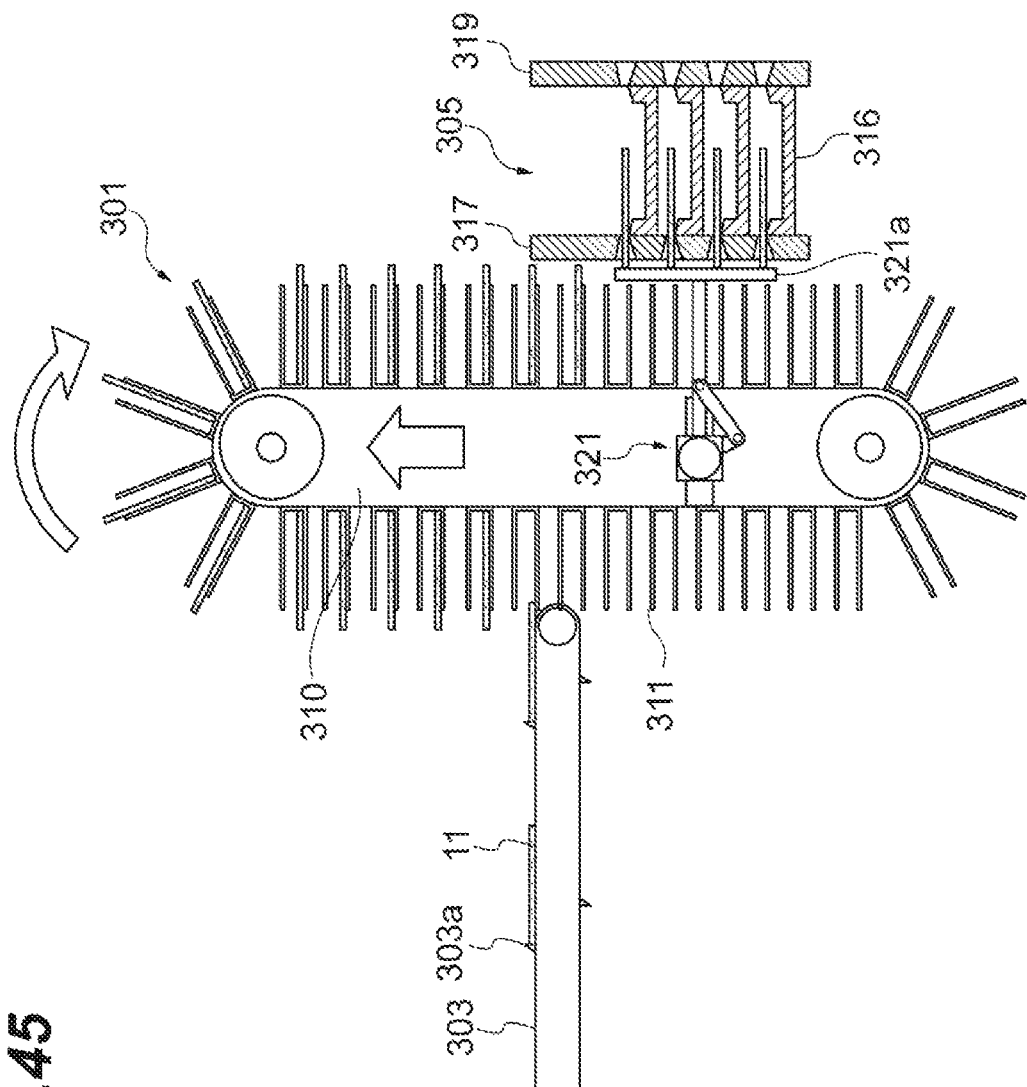
FIG. 45 is a view illustrating a state of the positive electrode conveying unit at a point of time C in FIG. 41.

Next, description will be given of a timing chart of operations of the circulation member, the positioning unit, and the push-out unit which are realized by the control by the controller 350 with reference to FIG. 41 to FIG. 45. FIG. 41 is a timing chart illustrating an operation in a normal state in which deficiency does not occur in the separator-equipped positive electrode 11 and the negative electrode 9 which are respectively supplied from the positive electrode supply conveyor 303 and the negative electrode supply conveyor 304. FIG. 42 is a timing chart illustrating an operation in a case where deficiency occurs in the negative electrode 9 that is supplied from the negative electrode supply conveyor 304 (in an abnormal state). FIG. 43 to FIG. 45 are views illustrating a state of the positive electrode conveying unit at points of time A to C in FIG. 41.

In tables on a positive electrode side in FIG. 41 and FIG. 42, "supply" represents a period in which the separator-equipped positive electrode 11 is supplied from the positive electrode supply conveyor 303 to the support section 311 of the positive electrode conveying unit 301. "Circulation and vertical movement" represents a period in which the circulation member 310 circulates or vertically moves. "Width position alignment" represents a period in which the positioning operation (press operation) with respect to the separator-equipped positive electrode 11 on the support section 311 is executed by the positioning unit 47. "Return" in the width position alignment represents a period in which an operation of returning the pressing section 50 of the positioning unit 47 to the original position is executed after completion of the positioning operation. "Ejection (stacking)" represents a period in which the push-out operation by the push-out unit 321 (push-out by the push member 321a) is executed. "Return" in the ejection (stacking) represents a period in which an operation of returning the push member 321a of the push-out unit 321 to the original position is executed after completion of the push-out operation. "Amount of vertical movement" and "amount of circulation movement" in "Servo-movement distance" represent the amount of movement in a period in which the circulation member 310 circulates or vertically moves. Here, the magnitude of the amount of movement is a value that is obtained by converting a movement distance of one support section 311 to a position of a support section 311 (support section that is located on a front side or a rear side of the one support section 311 in a circulation direction of the circulation member 310) adjacent to the one support section 311 into "1". The "amount of vertical movement" represents the amount of relative movement with respect to a ground plane of the positive electrode conveying unit 301 (or the positive electrode supply conveyor 303). Here, upward movement is described as positive movement, and downward movement is described as negative movement. In the "amount of circulation movement", a direction in which the separator-equipped positive electrode 11 is conveyed to the stacking unit 305 (clockwise direction when viewed from the front side of the paper surface in FIG. 32) is described as positive movement. "Amount of movement of support section on supply side" represents the amount of relative movement of the support section 311 with respect to an end (outlet) of the positive electrode supply conveyor 303 on the positive electrode conveying unit 301 side. A relationship of "amount of movement of support section on supply side=amount of vertical movement+amount of circulation movement" is established. "Amount of movement of support section on ejection side" represents the amount of relative movement of the support section 311 with respect to the slit 318. A relationship of "amount of movement of support section on ejection side=amount of vertical movement −amount of circulation movement" is established.

Similarly, in tables on a negative electrode side in FIG. 41 and FIG. 42, "supply" represents a period in which the negative electrode 9 is supplied from the negative electrode supply conveyor 304 to the support section 314 of the negative electrode conveying unit 302. "Circulation and vertical movement" represents a period in which the circulation member 313 circulates or vertically moves. "Width position alignment" represents a period in which the positioning operation (press operation) with respect to the negative electrode 9 on the support section 314 is executed by the positioning unit 48.

"Return" in the width position alignment represents a period in which an operation of returning the pressing section 54 of the positioning unit 48 to the original position is executed after completion of the positioning operation. "Ejection (stacking)" represents a period in which the push-out operation by the push-out unit 322 (push-out by the push member 322a) is executed. "Return" in the ejection (stacking) represents a period in which an operation of returning the push member 322a of the push-out unit 322 to the original position is executed after completion of the push-out operation. "Amount of vertical movement" and "amount of circulation movement" in "Servo-movement distance" represent the amount of movement in a period in which the circulation member 313 circulates or vertically moves. Here, the magnitude of the amount of movement is a value that is obtained by converting a movement distance of one support section 314 to a position of a support section 314 (support section that is located on a front side or a rear side of the one support section 314 in a circulation direction of the circulation member 313) adjacent to the one support section 314 into "1". The "amount of vertical movement" represents the amount of relative movement with respect to a ground plane of the negative electrode conveying unit 302 (or the negative electrode supply conveyor 304). Here, upward movement is described as positive movement, and downward movement is described as negative movement. In the "amount of circulation movement", a direction in which the negative electrode 9 is conveyed to the stacking unit 305 (counter-clockwise direction when viewed from the front side of the paper surface in FIG. 32) is described as positive movement. "Amount of movement of support section on supply side" represents the amount of relative movement of the support section 314 with respect to an end (outlet) of the negative electrode supply conveyor 304 on the negative electrode conveying unit 302 side. A relationship of "amount of movement of support section on supply side=amount of vertical movement+amount of circulation movement" is established. "Amount of movement of support section on ejection side" represents the amount of relative movement of the support section 314 with respect to the slit 320. A relationship of "amount of movement of support section on ejection side=amount of vertical movement−amount of circulation movement" is established.

As illustrated in "supply" and "circulation and vertical movement" in FIG. 41 and FIG. 42, the circulation member 310 or the circulation member 313 is stopped when the separator-equipped positive electrode 11 or the negative electrode 9 is transferred to the support section 311 or the support section 314. In addition, electrode supply timing is adjusted so that supply of the separator-equipped positive electrode 11 and supply of the negative electrode 9 to the stacking section 316 of the stacking unit 305 are alternatively performed.

At a point of time A in FIG. 41, the separator-equipped positive electrode 11 reaches the stacking position (refer to FIG. 43), and the positioning operation by the positioning unit 47 is initiated. At a point of time B in FIG. 41, the push-out operation by the push-out unit 321 is initiated after confirming that the positioning operation by the positioning unit 47 has been completed, and the pressing section 50 has returned to the original position (refer to FIG. 44). Although the separator-equipped positive electrode 11 is also supplied from the positive electrode supply conveyor 303 to the positive electrode conveying unit 301 during the push-out operation, the push-out operation and reception of the separator-equipped positive electrode 11 are made to be compatible with each other due to circulation and rising of the circulation member 310. At a point of time C in FIG. 41, the push-out operation by the push-out unit 321 is completed (refer to FIG. 45). Then, the return operation by the circulation member 310 is executed after reception of the separator-equipped positive electrode 11 from the positive electrode supply conveyor 303 has been completed, and the push member 321a of the push-out unit 321 has returned to the original position.

As illustrated in a portion surrounded by a broken line in FIG. 41, when a pair of the stacking operation and the return operation is set as one cycle, in the normal operation in which deficiency does not occur in the separator-equipped positive electrode 11 supplied from the positive electrode supply conveyor 303, before and after the cycle, the amount of vertical movement of the circulation member 310 becomes 0 (=0.5+0.5+0.5−1.5), and the amount of circulation movement of the circulation member 310 becomes 4 (=0.5+0.5+0.5+2.5). Since the cycle is repeated until stacking is completed, the height position of the circulation member 310 is maintained to a constant height. That is, circulation member 310 is lowered in the return operation by a distance corresponding to a distance that is raised in the stacking operation.

On the other hand, as illustrated in FIG. 42, in a period T1, in a case where deficiency occurs in the negative electrode 9 supplied from the negative electrode supply conveyor 304 (that is, in a case where the negative electrode 9 to be supplied is not supplied), in a period T including the period T1, the circulation member 313 is stopped. Furthermore, the controller 350 can grasp occurrence or non-occurrence of deficiency of the electrode on the basis of a detection signal transmitted from the electrode supply sensors 306 and 307, and can control the operation of the circulation member 313 in accordance with occurrence or non-occurrence of deficiency of the electrode. In this case, as illustrated in a portion surrounded by a broken line in FIG. 42, before and after the one cycle, the amount of vertical movement of the circulation member 313 becomes 0.5 (=0.5+0.5−1.5), and the amount of circulation movement of the circulation member 313 becomes 3.5 (=0.5+0.5+2.5). Accordingly, at a cycle after the cycle at which deficiency of the negative electrode 9 occurs, the circulation member 313 continues an operation thereof in a state in which a height position, which is lowered from an initial height position (height position before the stacking operation) by the amount of movement of 0.5, is set as a new reference position.

Next, description will be given of another example of a mechanism that realizes driving (vertical movement and circulation) of the conveying member with reference to FIG. 46 to FIG. 50. Here, description will be given of a support structure and a drive mechanism of the positive electrode conveying unit 301. It is also possible to employ the same support structure and drive mechanism with respect to the negative electrode conveying unit 302.

Figure 46:
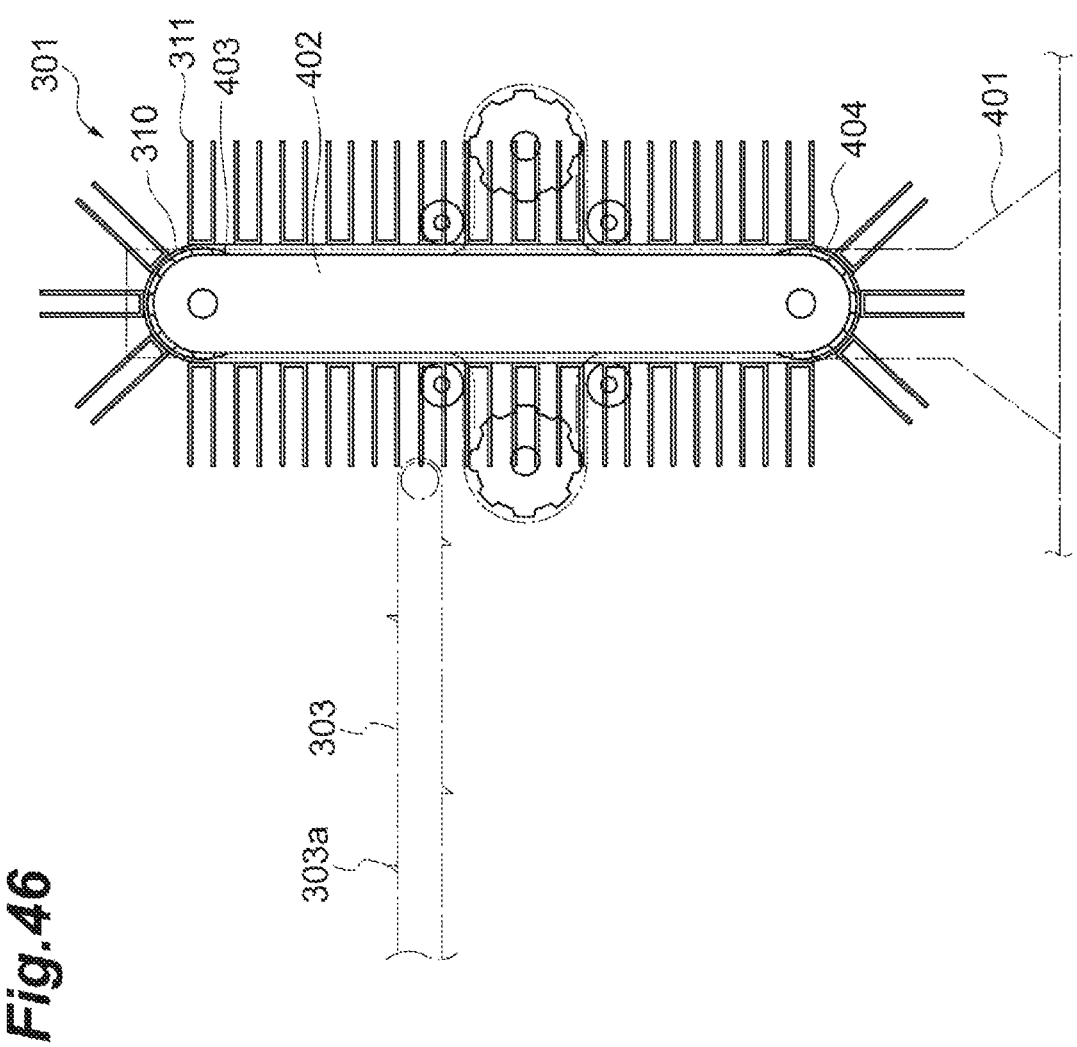
FIG. 46 is a view illustrating a configuration example of a support structure and a drive mechanism of the circulation member of the positive electrode conveying unit.
Figure 47:
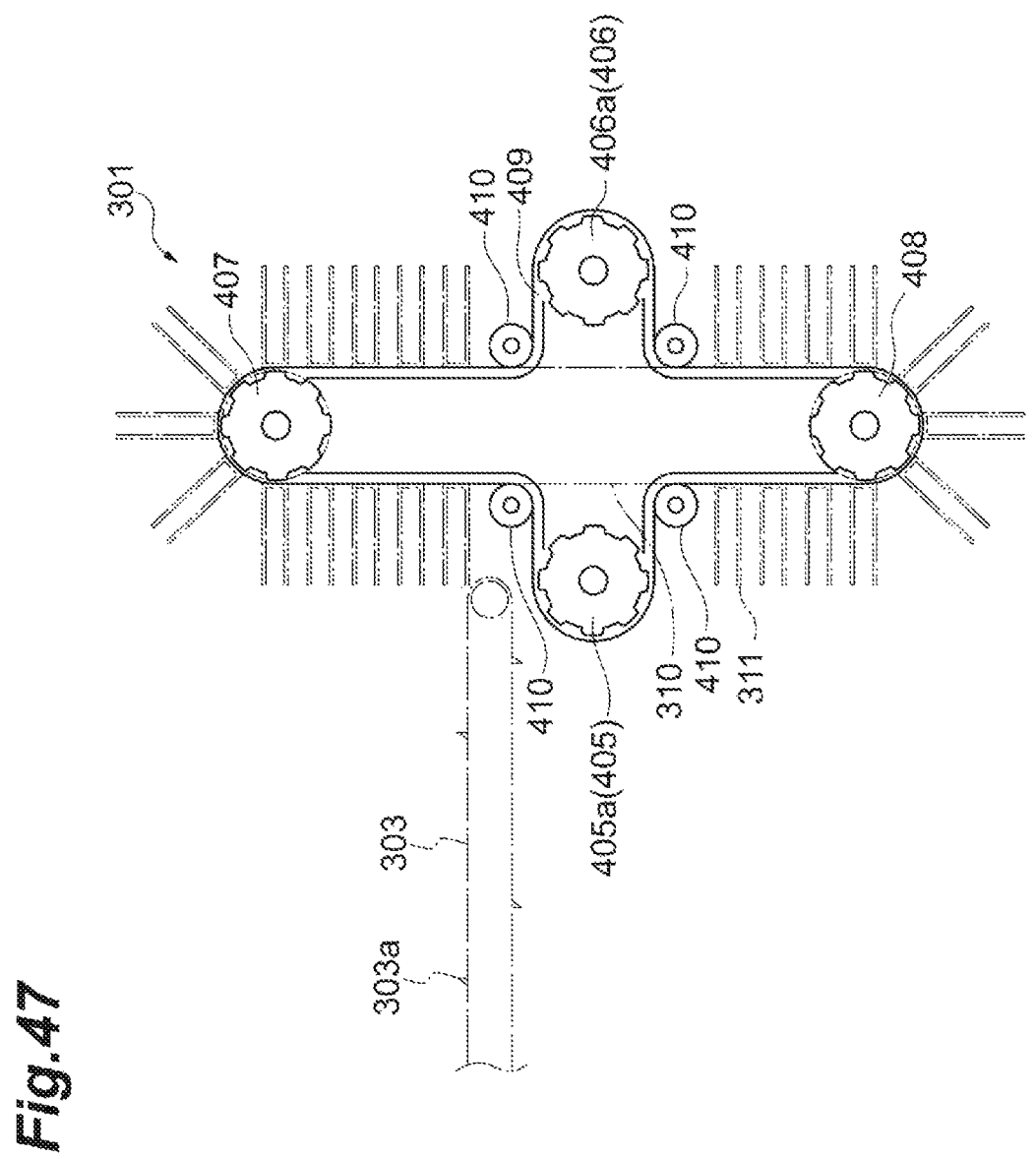
FIG. 47 is a view illustrating the configuration example of the support structure and the drive mechanism of the circulation member of the positive electrode conveying unit.

FIG. 46 and FIG. 47 are view with focus given to configurations necessary for description of the support structure and the drive mechanism of the positive electrode conveying unit 301, and description of the other configurations appropriately omitted. As illustrated in FIG. 46, the positive electrode conveying unit 301 includes a support frame 401 that is provided on a floor surface, and a circulation frame 402 that is supported to the support frame 401 in a vertically movable manner. A pair of sprockets 403 and 404 (members corresponding to the rollers 26a in the first embodiment) disposed to be spaced away from each other in the vertical direction by a predetermined distance is rotatably supported to the circulation frame 402. The circulation member 310, in which a plurality of the support sections 311 are disposed on the outer peripheral surface thereof, is wound around the sprockets 403 and 404.

In addition, as illustrated in FIG. 47, the positive electrode conveying unit 301 includes motors 405 and 406 which are fixed to the support frame 401 or the floor surface. Drive gears 405a and 406a are respectively fixed to drive shafts of the motors 405 and 406. The sprockets 403 and 404 respectively include drive gears 407 and 408 at one end of a rotation axis thereof. A timing belt 409 is wound around the drive gears 405a, 406a, 407, and 408. A circulation route of the timing belt 409 has an approximately cross shape that extends in a vertical direction and a right and left direction due to guide rollers 410 (four guide rollers 410 in an example illustrated in FIG. 47) which are supported to the support frame 401 in addition to the drive gears 405a, 406a, 407, and 408.

Figure 48:
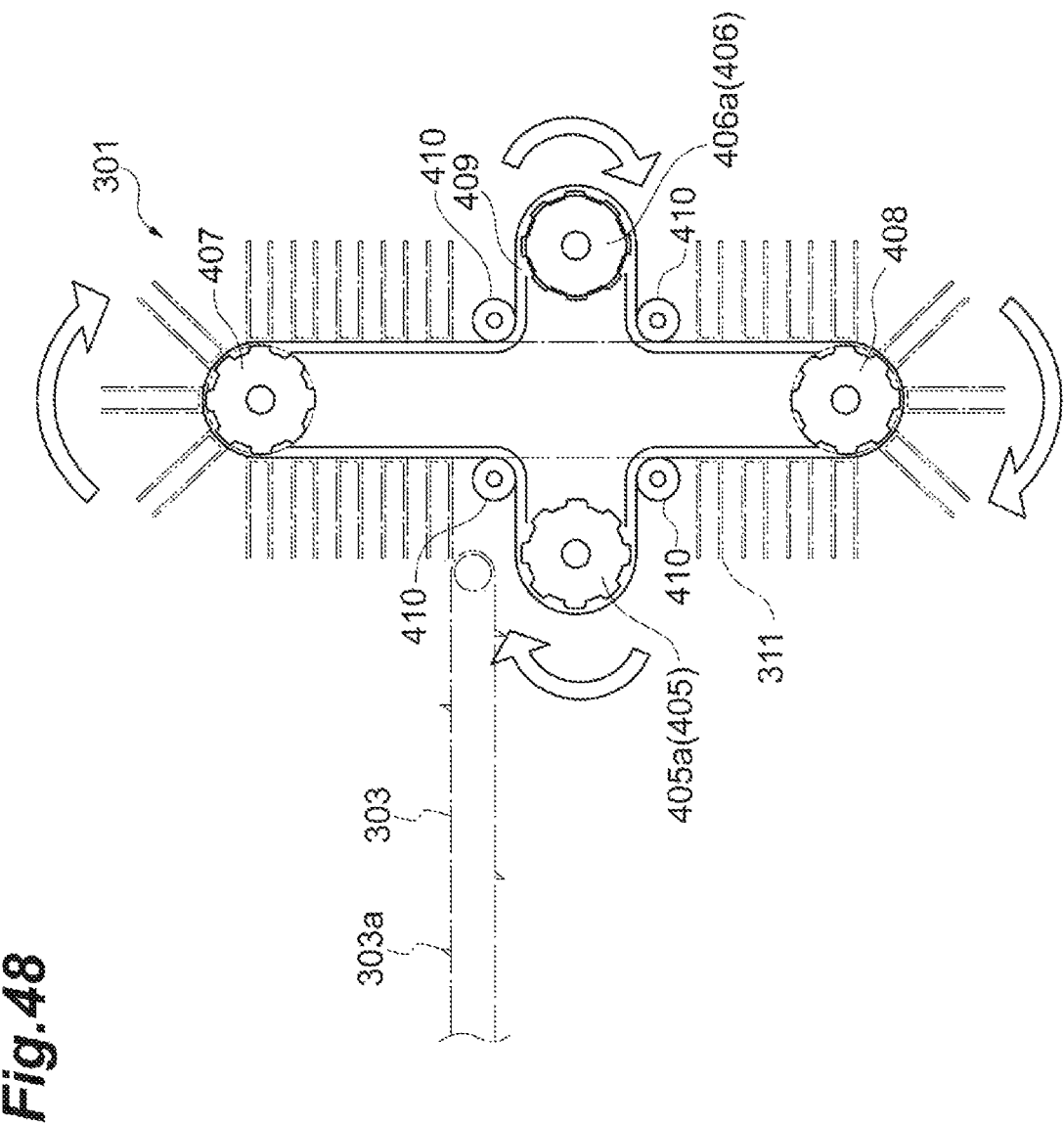
FIG. 48 is a view illustrating a first operation example of the circulation member.

As illustrated in FIG. 48, when the drive gears 405a and 406a are rotated at an equal speed, the entirety of the circulation frame 402 and the circulation member 310 do not vertically move with respect to the support frame 401 or the floor surface, and the circulation member 310 and the timing belt 409 perform a circulation operation.

Figure 49:
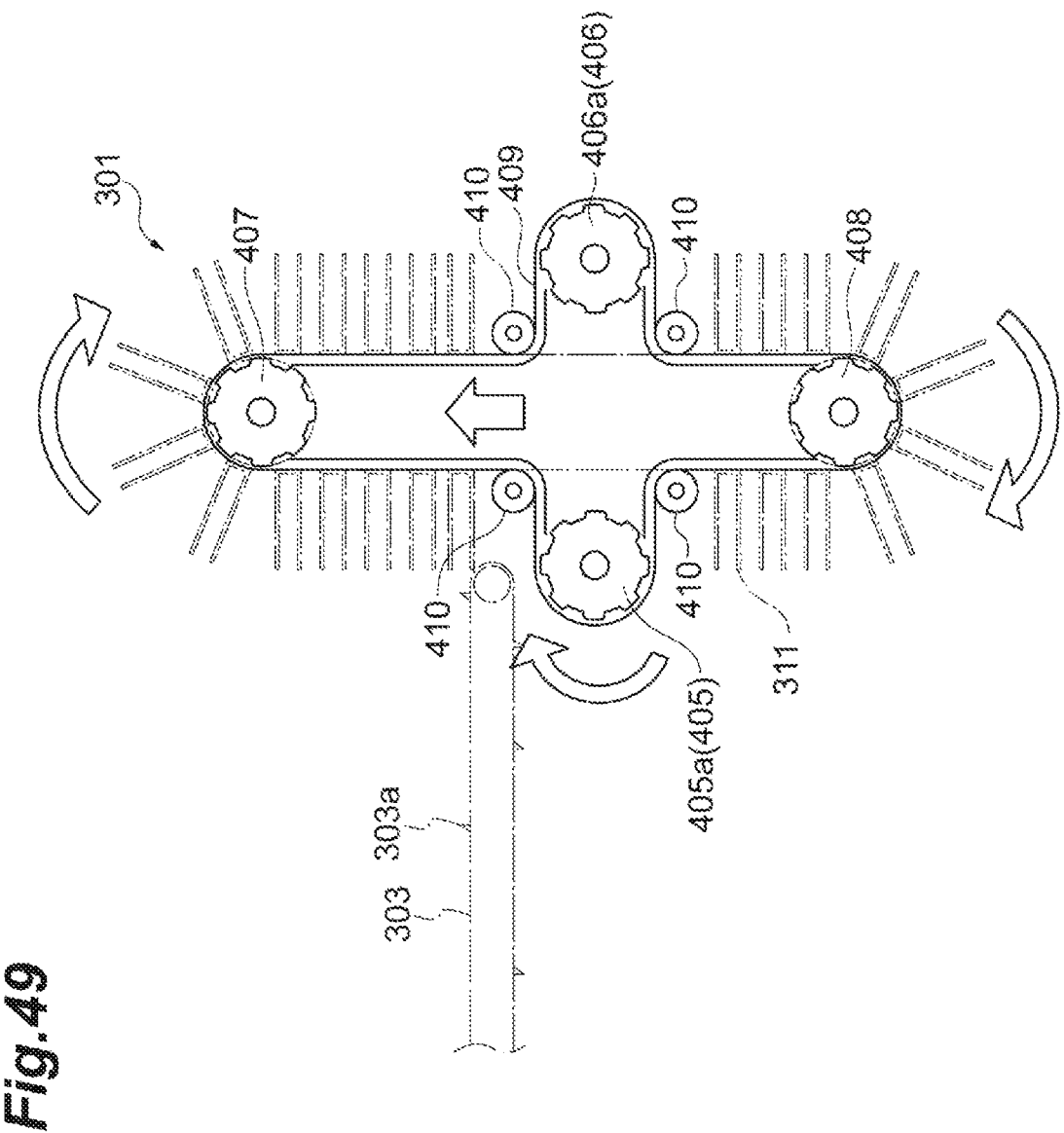
FIG. 49 is a view illustrating a second operation example of the circulation member.
Figure 50:
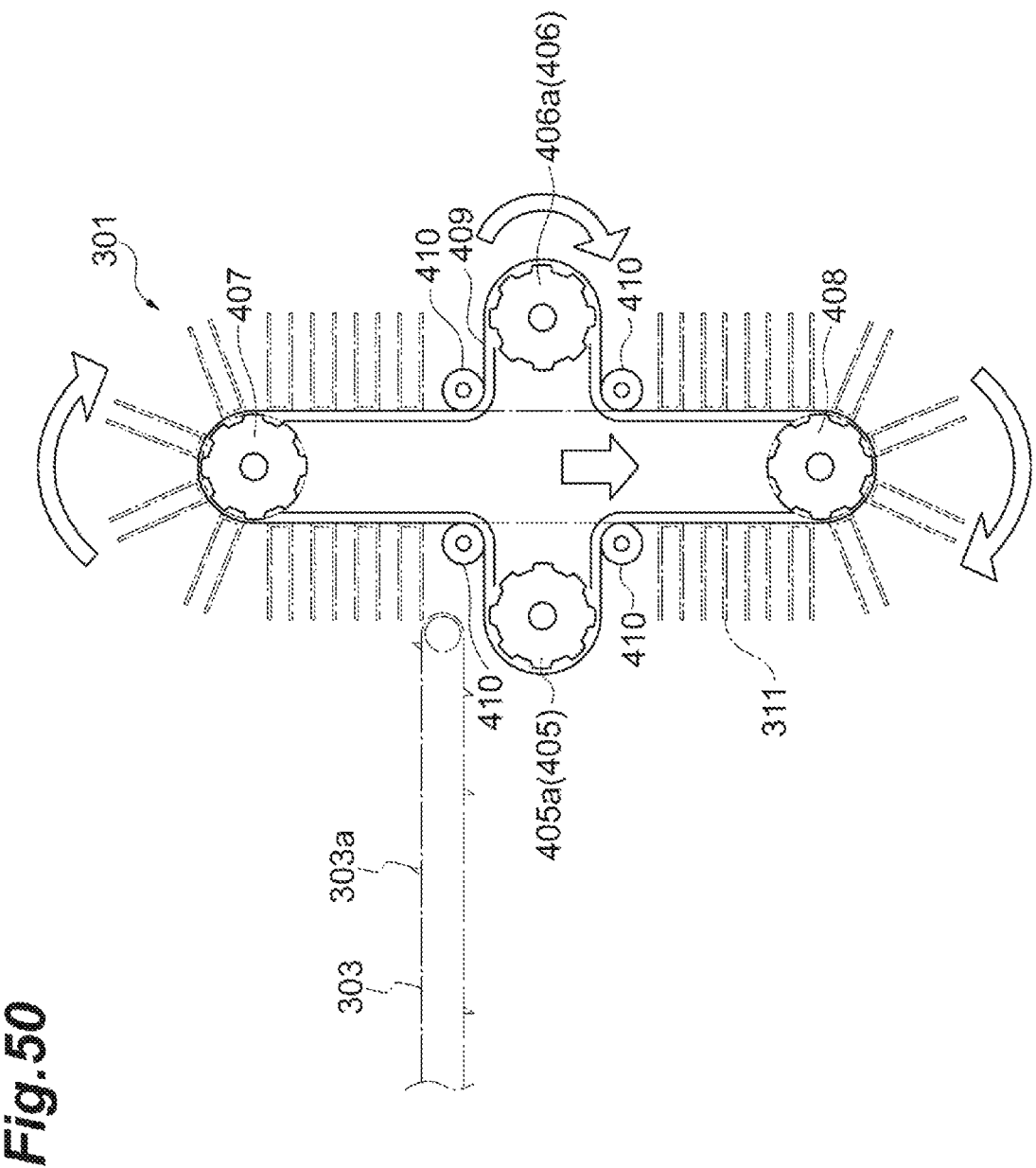
FIG. 50 is a view illustrating a third operation example of the circulation member.

On the other hand, as illustrated in FIG. 49, in a case where only the drive gear 405a is rotated, the circulation member 310 on the positive electrode supply conveyor 303 side circulates in clockwise direction on the positive electrode supply conveyor 303 side, and the circulation member 310 is stopped on the stacking section 316 side. Accordingly, in the timing belt 409, only a portion on the positive electrode supply conveyor 303 side is raised. In accordance with the operation of the timing belt 409, the circulation frame 402 is raised with respect to the support frame 401 or the floor surface. In accordance with the movement, a reference height position (for example, the central position of the circulation member 310 in the vertical direction) of the circulation member 310, which is supported to the circulation frame 402 through the sprockets 403 and 404, is also raised. In addition, as illustrated in FIG. 50, in a case where only the drive gear 406a is rotated, the circulation member 310 on the stacking section 316 side circulates in a clockwise direction, and the circulation member 310 on the positive electrode supply conveyor 303 side is stopped. Accordingly, in the timing belt 409, only a portion on the stacking unit 305 side (a portion on a right side in FIG. 50) is lowered. In accordance with the operation of the timing belt 409, the circulation frame 402 is lowered with respect to the support frame 401 or the floor surface. In accordance with the movement, the reference height position of the circulation member 310 is also lowered. In addition, in a case where both of the drive gears 405a and 406a are rotated in a state in which a rotation speed of the drive gear 405a and a rotation speed of the drive gear 406a are set to be different from each other, the circulation frame 402 is raised or lowered in accordance with a difference in the rotation speed. As a result, it is possible to raise or lower the reference height position of the circulation member 310. Accordingly, it is possible to realize the preparatory operation, the stacking operation, and the return operation by adjusting the rotation speed of the drive gears 405a and 406a. That is, the controller 350 (refer to FIG. 32) can realize the preparatory operation, the stacking operation, and the return operation by adjusting the rotation speed of the drive gears 405a and 406a in accordance with an operation type of the circulation member 310 that is desired to execute.

The above-described electrode stacking device 300 is a device that stacks electrodes (the separator-equipped positive electrode 11 and the negative electrode 9) which are supplied by the positive electrode supply conveyor 303 (conveying device) and the negative electrode supply conveyor 304 (conveying device) to form a stacked body (an electrode stacked body that is formed on each of the stacking sections 316). The electrode stacking device 300 includes the support sections 311 and 314 (electrode support sections), the circulation members 310 and 313, the stacking unit 305, the push-out units 321 and 322, and the controller 350 (control unit). The support sections 311 and 314 respectively receive the separator-equipped positive electrode 11 and the negative electrode 9 which are respectively supplied by the positive electrode supply conveyor 303 and the negative electrode supply conveyor 304, and respectively support the separator-equipped positive electrode 11 and the negative electrode 9. The circulation members 310 and 313 have a loop shape that extends in the vertical direction, and the support sections 311 and 314 are respectively formed on the outer peripheral surfaces of the circulation members 310 and 313. The stacking unit 305 is disposed on a side opposite to the positive electrode supply conveyor 303 with the circulation member 310 interposed therebetween, and is disposed on a side opposite to the negative electrode supply conveyor 304 with the circulation member 313 interposed therebetween. The stacking unit 305 includes a plurality of stages of the stacking sections 316 on which the separator-equipped positive electrode 11 and the negative electrode 9 are stacked. The push-out unit 321 simultaneously pushes out the separator-equipped positive electrodes 11 supported by the plurality of support sections 311 toward the plurality of stages of stacking sections 316. The push-out unit 322 simultaneously pushes out the negative electrodes 9 supported by the plurality of support sections 314 toward the plurality of stages of stacking sections 316. The controller 350 controls circulation and elevation of the circulation members 310 and 313, and the operation of the push-out units 321 and 322 (that is, the operation of the push members 321a and 321b). The controller 350 controls the operation of the push-out unit 321 to push out the separator-equipped positive electrode 11 toward the stacking sections 316 at a speed that is slower than the conveying speed of the separator-equipped positive electrode 11 that is conveyed by the positive electrode supply conveyor 303. In addition, the controller 350 controls the operation of the push-out unit 322 to push out the negative electrode 9 toward the stacking sections 316 at a speed that is slower than the conveying speed of the negative electrode 9 that is conveyed by the negative electrode supply conveyor 304.

In the above-described electrode stacking device 300, the electrodes (the separator-equipped positive electrodes 11 or the negative electrodes 9) which are sequentially supplied to the support section 311 or 314 are simultaneously pushed out to the stacking sections 316 different from each other, and are stacked thereon. As described above, electrodes in a number greater than an electrode that is sequentially supplied are simultaneously pushed out and are stacked. Accordingly, an ejection speed when pushing out the electrodes to the stacking sections 316 can be set to be slower than the conveying speed (supply speed) of the electrode by the conveying device (the positive electrode supply conveyor 303 or the negative electrode supply conveyor 304). According to this, it is possible to suppress a positional deviation of the electrodes when stacking the electrodes while preventing an electrode stacking speed from being lowered. As a result, according to the electrode stacking devices 300, it is possible to accomplish speeding-up of the stacking speed while suppressing an increase in size of the device.

In addition, the electrode conveying speed by the conveying device (the positive electrode supply conveyor 303 or the negative electrode supply conveyor 304) becomes faster than the electrode ejection speed. Accordingly, when the electrodes conveyed at a high speed are stopped on the support sections 311 or 314, a positional deviation occurs. When a plurality of the electrodes are stacked in a state in which positions thereof deviate, it is difficult to realign the electrodes after the stacking due to friction on a surface of the negative electrode active material layer and the like. However, the electrodes on the support sections 311 or 314 are in an individual piece state before the plurality of electrodes are stacked on the stacking sections 316, and thus positions thereof are easily corrected through inversion by the circulation member 310 or 313, and an operation of the positioning unit 47.

Hereinbefore, several embodiments of the invention have been described, but the invention is not limited to the above-described embodiments.

For example, in the embodiments, the separator-equipped positive electrode 11 in which the positive electrode 8 is enveloped by the bag-shaped separator 10, and the negative electrode 9 are alternately stacked on the stacking section, but there is no particular limitation to the aspect. A positive electrode and a separator-equipped negative electrode in which a negative electrode is enveloped by a bag-shaped separator may be alternately stacked on the stacking section.

In addition, in the embodiments, the electrical storage device 1 is a lithium ion rechargeable battery, but the invention is also applicable to stacking of electrodes in other rechargeable batteries such as a nickel hydrogen battery, and an electrical storage device such as an electrical double layer capacitor and a lithium ion capacitor without particular limitation to the lithium ion rechargeable battery.

In addition, even in the electrode stacking devices (the electrode stacking devices 20, 80, 90, and 200) in the first to third embodiments, and the fifth embodiment, and modification examples thereof, it is also possible to employ the control (FIG. 34, and FIGS. 38 to 40) in the electrode stacking device 300 according to the sixth embodiment. In this case, the control in the electrode stacking device 300 according to the sixth embodiment can be appropriately changed in accordance with configurations of the electrode stacking devices of the respective embodiments, and modification examples thereof.

For example, in the electrode stacking device 80 according to the second embodiment, positioning of electrodes is performed by the guide plates 83A and 83B of the positioning units 81 and 82, and thus the control (FIG. 38, and steps S402, S502, and S507) relating to the positioning among the controls of the electrode stacking device 300 according to the sixth embodiment may be omitted.

In addition, in the electrode stacking device 200 according to the fifth embodiment, one piece of conveying unit is used, and thus a control of one conveying unit among the controls of the electrode stacking device 300 according to the sixth embodiment can be used. For example, as a control of the push-out unit, the control in FIG. 39 can be used. In this case, step S403 is omitted.

In addition, in the first to fourth, and sixth embodiments, description has been given of an aspect in which electrodes (the separator-equipped positive electrodes 11 or the negative electrodes 9) are conveyed sheet by sheet (that is an aspect in which one sheet of electrode is set as a conveying unit), but electrode unit including a plurality of electrodes may be set as one conveying unit. That is, electrodes, which are supplied by a conveying device such as a belt conveyor, may be supplied sheet by sheet, or may be supplied in a state in which a plurality of sheets are collectively unitized in advance. For example, in the first embodiment, the positive electrode supply conveyor 23 may be configured to convey an electrode unit having a configuration in which one sheet of the separator-equipped positive electrode 11 is interposed between two sheets of the negative electrodes 9 as one conveying unit. In addition, the negative electrode supply conveyor 24 may be configured to convey an electrode unit having a configuration in which one sheet of the negative electrode 9 is interposed between two sheets of the separator-equipped positive electrodes 11 as one conveying unit. In this case, three sheets of electrodes are stacked on one piece of the stacking section 33 by a stacking operation that is performed once (push-out operation that is performed once by the push-out unit 41 or the push-out unit 42). In this manner, in a case where the electrode unit including a plurality of electrodes is set as a conveying unit, it is possible to improve stacking efficiency in comparison to a case where one sheet of electrode is set as the conveying unit. Furthermore, in this case, slits, through which both the tab 14*b* of the separator-equipped positive electrode 11 and the tab 16*b* of the negative electrode 9 pass, may be provided in each of the pressing plates 51 and 55 of the positioning units 47 and 48.

REFERENCE SIGNS LIST

9: negative electrode (electrode), 11: separator-equipped positive electrode (electrode), 14: metal foil (positive electrode current collector), 15: positive electrode active material layer, 16: metal foil (negative electrode current collector), 17: negative electrode active material layer, 20, 80, 90, 100, 200, 300: electrode stacking device, 21: positive electrode conveying unit (first conveying unit), 22: negative electrode conveying unit (second conveying unit), 23, 110, 303: positive electrode supply conveyor (conveying device), 24, 120, 304: negative electrode supply conveyor (conveying device), 25: stacking unit, 26: circulation member (first circulation member), 27: support section (first support section), 28: drive section (first drive section), 29: circulation member (second circulation member), 30: support section (second support section), 31: drive section (second drive section), 33: stacking section, 34: drive section (third drive section), 36: wall portion (first wall portion), 37: slit (first slit), 38: wall portion (second wall portion), 39: slit (second slit), 40: tapered portion, 41: push-out unit (first push-out unit), 42: push-out unit (second push-out unit), 47, 48: positioning unit, 49: receiving section, 50: pressing section, 53: receiving section, 54: pressing section, 61: conveying control unit, 62: stacking control unit, 77: stacking section, 78: base, 79: side wall, 81, 82: positioning unit, 83A, 83B: guide plate, 86: tapered portion, 95: stacking section, 97*a*: base, 97*b*: side wall, 99A, 99B: support section, 99*d*: buffering material (impact mitigation section), 101: controller (control unit), 130: positive electrode reception section, 132, 142: support section (electrode support section), 133, 143: shutter (impact mitigation section), 140: negative electrode reception section, 150, 160: rotary plate (electrode distribution section), 170, 180: push member (push-out section), 190: stacking unit, 191: stacking section, 310, 313: circulation member, 311, 314: support section (electrode support section), 305: stacking unit, 316: stacking section, 321*a*, 322*a*: push member (push-out section), 350: controller.

The invention claimed is:

1. An electrode stacking device that stacks electrodes supplied by a conveying device and forms an electrode stacked body, the electrode stacking device comprising:
a plurality of electrode support sections respectively configured to receive the electrodes supplied by the conveying device and support the electrodes;
a circulation member having a loop shape that extends in a vertical direction, and in which the electrode support sections are formed on an outer peripheral surface;
a stacking unit that is disposed on a side opposite to the conveying device with the circulation member interposed therebetween, and includes a plurality of stages of stacking sections on which the electrodes are stacked;
a plurality of push-out sections configured to simultaneously push out the electrodes, which are respectively supported on the plurality of the electrode support sections, toward the plurality of stages of stacking sections; and
a control unit configured to control circulation and elevation of the circulation member, and an operation of the push-out sections,
wherein the control unit is configured to control the operation of the push-out sections to push out the electrodes toward the stacking sections at a speed slower than a conveying speed of the electrodes conveyed by the conveying device.

2. The electrode stacking device according to claim 1, further comprising:
a positioning unit configured to align positions of edges of the electrodes in a direction that intersects a conveying direction of the electrodes conveyed by the conveying device.

3. The electrode stacking device according to claim 1,
wherein each of the electrode support sections includes an impact mitigation section configured to mitigate impact to each of the electrodes when receiving the electrode.

4. An electrode stacking device that stacks a plurality of positive electrodes in which a positive electrode active material layer is formed on a surface of a positive electrode current collector, and a plurality of negative electrodes in which a negative electrode active material layer is formed on a surface of a negative electrode current collector, the electrode stacking device comprising:
a first conveying unit conveying the plurality of positive electrodes and including a loop-shaped first circulation member that extends in a vertical direction, a plurality of first support sections which are formed on an outer peripheral surface of the first circulation member and support the plurality of positive electrodes, and a first drive section configured to rotate the first circulation member and move the first circulation member in the vertical direction;

a second conveying unit conveying the plurality of negative electrodes and including a loop-shaped second circulation member that extends in the vertical direction, a plurality of second support sections which are formed on an outer peripheral surface of the second circulation member and support the plurality of negative electrodes, and a second drive section configured to rotate the second circulation member and move the second circulation member in the vertical direction;

a stacking unit that is disposed between the first conveying unit and the second conveying unit, and includes a plurality of stages of stacking sections on which the positive electrodes and the negative electrodes are alternately stacked;

a conveying control unit configured to control the first drive section to hold the plurality of positive electrodes conveyed by the first conveying unit at height positions corresponding to the plurality of stages of stacking sections, and control the second drive section to hold the plurality of negative electrodes conveyed by the second conveying unit at height positions corresponding to the plurality of stages of stacking sections;

a first push-out unit configured to simultaneously push out the plurality of positive electrodes toward the plurality of stages of stacking sections; and a second push-out unit configured to simultaneously push out the plurality of negative electrodes toward the plurality of stages of stacking sections.

5. The electrode stacking device according to claim 4, further comprising:

a first wall portion that is disposed between the stacking unit and the first conveying unit, and includes a plurality of first slits through which the plurality of positive electrodes pushed out by the first push-out unit pass; and a second wall portion that is disposed between the stacking unit and the second conveying unit, and includes a plurality of second slits through which the plurality of negative electrodes pushed out by the second push-out unit pass, wherein the conveying control unit is configured to control the first drive section to hold the plurality of positive electrodes at height positions of the plurality of first slits, and control the second drive section to hold the plurality of negative electrodes at height positions of the plurality of second slits.

6. The electrode stacking device according to claim 5, wherein the height positions of the first slits are same as the height positions of the second slits, and a tapered portion is formed at a portion of an inner surface of the first wall portion on a lower side of each of the first slits and at a portion of an inner surface of the second wall portion on a lower side of each of the second slits so that a distance between the first wall portion and the second wall portion gradually increases toward an upward side.

7. The electrode stacking device according to claim 6, further comprising:

a third drive section configured to move the plurality of stages of stacking sections in the vertical direction; and a stacking control unit configured to control the third drive section so that stacking height positions of the positive electrodes become constant with respect to the first slits, and stacking height positions of the negative electrodes become constant with respect to the second slits.

8. The electrode stacking device according to claim 6, wherein the stacking section includes a base on which each of the positive electrodes and each of the negative electrodes are placed, and a side wall that is provided to be erected from the base and aligns positions of edges of the positive electrode and the negative electrode.

9. The electrode stacking device according to claim 5, further comprising:

a third drive section configured to move the plurality of stages of stacking sections in the vertical direction; and a stacking control unit configured to control the third drive section so that stacking height positions of the positive electrodes become constant with respect to the first slits, and stacking height positions of the negative electrodes become constant with respect to the second slits, wherein the height positions of the first slits and the height positions of the second slits alternatively deviate from each other.

10. The electrode stacking device according to claim 4, further comprising:

a positioning unit configured to align a position of an edge of each of the positive electrodes or a position of an edge of each of the negative electrodes.

11. The electrode stacking device according to claim 10, wherein the positioning unit includes a receiving section configured to come into contact with the edge of each of the positive electrodes or the negative electrodes, and a pressing section configured to press each of the positive electrodes electrode or the negative electrodes to the receiving section.

12. The electrode stacking device according to claim 10, wherein the positioning unit includes a pair of guide plates configured to guide the positive electrodes or the negative electrodes to a downward side, and each of the pair of guide plates includes a tapered portion that makes a gap between the pair of guide plates be gradually narrowed toward a downward side.

* * * * *